(12) United States Patent
Nobukata

(10) Patent No.: US 8,350,574 B2
(45) Date of Patent: Jan. 8, 2013

(54) CIRCUIT FOR DETECTING MALFUNCTION GENERATION ATTACK AND INTEGRATED CIRCUIT USING THE SAME

(75) Inventor: Hiromi Nobukata, Kanagawa (JP)

(73) Assignee: Sony Corporation, Tokyo (JP)

( * ) Notice: Subject to any disclaimer, the term of this patent is extended or adjusted under 35 U.S.C. 154(b) by 415 days.

(21) Appl. No.: 12/786,612

(22) Filed: May 25, 2010

(65) Prior Publication Data

US 2010/0301873 A1 Dec. 2, 2010

(30) Foreign Application Priority Data

Jun. 1, 2009 (JP) ................. P2009-132544

(51) Int. Cl.
*G01R 31/02* (2006.01)
*G01R 31/08* (2006.01)
*H04K 1/00* (2006.01)
(52) U.S. Cl. .............. 324/537; 324/522; 380/2
(58) Field of Classification Search .................. 324/537, 324/522; 380/2
See application file for complete search history.

(56) References Cited

U.S. PATENT DOCUMENTS

| | | | |
|---|---|---|---|
| 6,108,419 A | 8/2000 | Lamacchia et al. | |
| 7,450,716 B2* | 11/2008 | Fischer et al. | 380/2 |
| 2005/0021990 A1 | 1/2005 | Liardet et al. | |
| 2006/0104438 A1 | 5/2006 | Giraud | |

FOREIGN PATENT DOCUMENTS

| | | |
|---|---|---|
| JP | 10 154976 | 6/1998 |
| JP | 2002 261751 | 9/2002 |
| JP | 2005 503069 | 1/2005 |
| JP | 2005 522912 | 7/2005 |
| JP | 2008 289086 | 11/2008 |
| WO | WO 2009 031057 | 3/2009 |

OTHER PUBLICATIONS

Rankl et al: "How to defend against smartcard attacks—or the amazing number of different ways to check a PIN securely" Information Security Technical Report, Elsevier Advanced Technology, vol. 14, No. 2, May 1, 2009, pp. 79-86, XP 026459274 ISSN: 1363-4127 [retrieved on Jul. 3, 2009].

* cited by examiner

*Primary Examiner* — Amy He
(74) *Attorney, Agent, or Firm* — Frommer Lawrence & Haug LLP; William S. Frommer

(57) ABSTRACT

An embodiment of the invention provides a circuit for detecting a malfunction generation attack, including: at least one sensor circuit adapted to detect a radiation of a light; and a detection circuit for detecting an intermediate voltage between a voltage corresponding to a High level and a voltage corresponding to a Low level in accordance with an output from the at least one sensor circuit, and outputting a detection signal. At least one sensor circuit has an output node a level at which is changed in accordance with the radiation of the light, and outputs a signal corresponding to the level at the output node which is changed in accordance with the radiation of the light. The detection circuit outputs the detection signal when a level of the output signal from the at least one sensor circuit reaches a level previously set.

13 Claims, 39 Drawing Sheets n-TYPE SEMICONDUCTOR

WHICH OF OPERATIONS IS JUDGED IS
MADE IN CIRCUIT SUBSEQUENT TO INVERTER

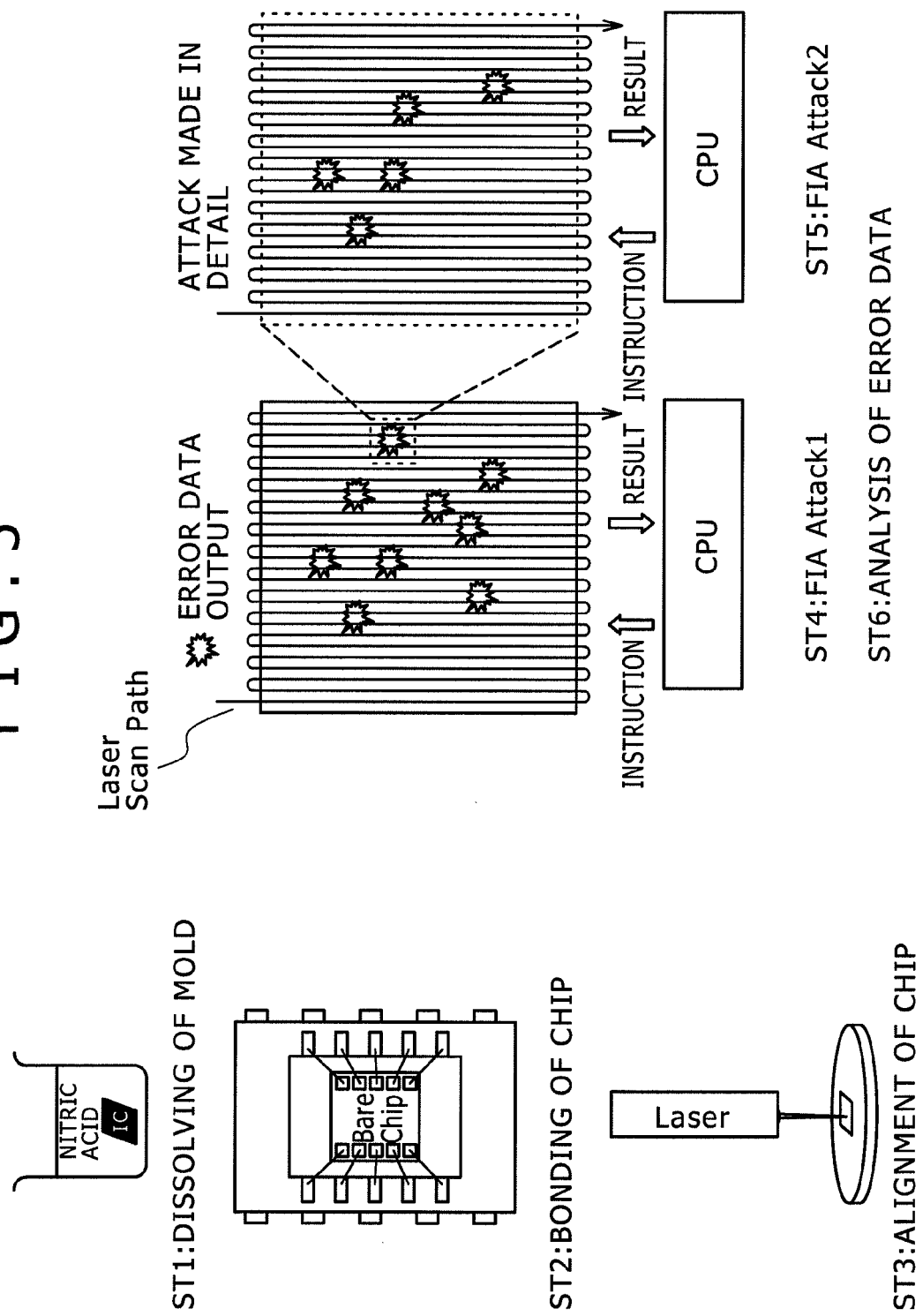

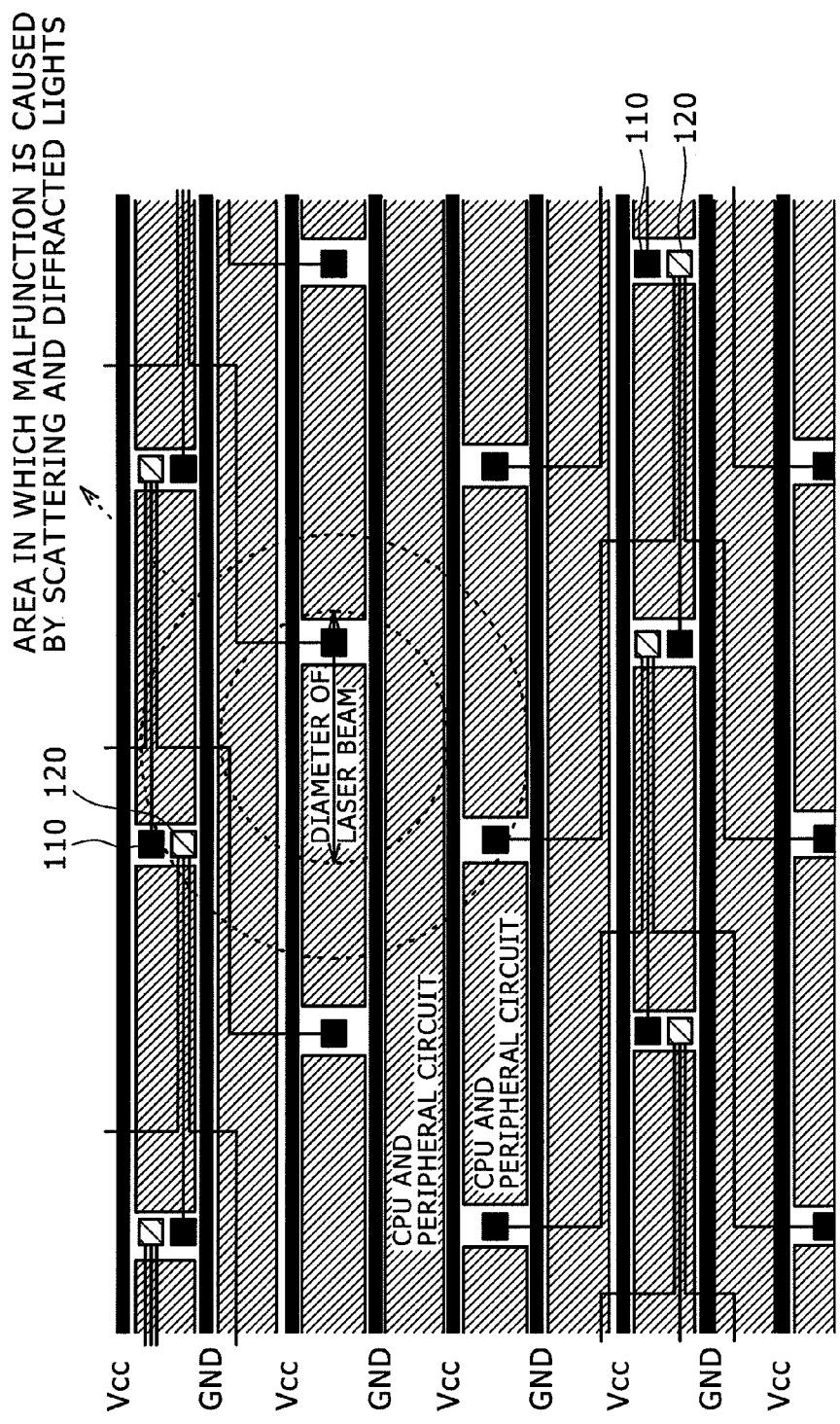

CIRCUIT FOR DETECTING MALFUNCTION GENERATION ATTACK AND INTEGRATED CIRCUIT USING THE SAME

BACKGROUND OF THE INVENTION

1. Field of the Invention

The present invention relates to a circuit for detecting a malfunction generation attack which serves to avoid a Fault Induction Attack (FIA) attack or the like, and an integrated circuit using the same.

2. Description of the Related Art

In an integrated circuit (IC) card, for the purpose of preventing a problem from being caused even when confidential information stored in the IC card is leaked in the process of exchange of data between a host computer and the IC card, encryption data is used as data for the exchange.

With regard to a method for encryption, a Data Encryption Standard (DES) is concurrently most commonly used. In the DES, for the encryption of data, a possessor of the IC card, and the host computer possess the same key, the data encrypted with the key is transmitted from a transmission side of the data to a receiver for the data, and the receiver for the data decrypts the encrypted data with the same key to fetch a message from the decrypted data.

Even when a malicious third party wiretaps the data in the process of the communication, he/she hardly fetches the message from the encrypted data by decrypting the encrypted data unless he/she possesses the key.

In addition, the key which is used in the phase of the encryption or decryption is stored in a non-volatile memory, such as an EEPROM, provided within the IC card. Also, in the phase of the encryption or decryption, the key is directly transferred to an encryption engine provided within the IC card without through a CPU.

The configuration with which even the possessor of the IC card, and a development engineer for the IC card can not fetch the key data in accordance with such control is adopted, thereby holding the security for the IC card.

However, P. Kocher et al. reported an attack method (Differential Power Analysis: DPA) of measuring a consumption current of an IC card, and subjecting the data on the consumption current to statistical processing, thereby fetching a key.

This attack method is a very strong attack method that an encryption key can be acquired in accordance with the statistical processing for a waveform of the consumption current. In order to take measures to cope with this attack method, various kinds of defense methods have been proposed.

Also, a Differential Fault Analysis (DFA) is known as an attack method with which the measures are required to be taken to cope, along with the DPA attack method.

With this attack method, a radiation of a laser beam or the like is carried out for a chip obtained by removing a mold while an encryption arithmetic operation is carried out, thereby causing an output change in a logic circuit, bit inversion in a register, and the like.

Also, with this attack method, a mal-arithmetic operation result about an output statement is compared with a proper arithmetic operation result to carry out an analysis about the comparison result, thereby acquiring the key data.

An attack method of carrying out this attack on the CPU to acquire the confidential information is called a Fault Induction Attack (FIA), and also becomes a threat.

With the FIA, while the CPU executes an instruction, a laser beam is radiated to a program counter, a register and a logic circuit which are provided within a CPU block, thereby changing values in the program counter, the register and the logic circuit within the CPU block. As a result, an execution of a false instruction, creation of a false processing result, and the like are caused, and secrete data is fetched by using the execution of the false instruction, the creation of the false processing result, and the like.

Here, a description will be given with respect to a mechanism in which the output from the logic circuit, and the value stored in the register are changed by the radiation of the laser beam.

[Generation of Free Electron Due to Radiation of Laser Beam and Internal Photoelectric Effect]

At the present time, a material which is most commonly used as a semiconductor is silicon (Si). A silicon atom has four bonding hands, and forms a covalent bond with adjacent four silicon atoms.

In an n-type semiconductor, for example, as shown in FIG. 1A, a small amount of impurity belonging to a group V in a periodic table and having five bonding hands, for example, phosphorus (P) is added to an intrinsic semiconductor. At this time, one electron not contributing to the covalent band remains in an atom of phosphorous, and goes around the phosphorus atom. At this time, when a light having a certain energy or more is radiated to the electron, this electron gets the energy of the light thus radiated to become "a free electron" which can break free from the chains of the phosphorous atom to freely move. This phenomenon is referred to as "an internal photoelectric effect."

The internal photoelectric effect will now be described in relation to an energy band diagram shown in FIG. 1B.

Energy levels of the electrons chained down by the atomic nuclei of phosphorous are collectively called a valence band. On the other hand, energy levels of the electrons which get some sorts of energies to break free from the chains of the atomic nuclei of phosphorous, thereby being able to freely move, are collectively called a conduction band. Also, a band between the valence band and the conduction band is called a forbidden band, and also an energy difference between the valence band and the conduction band is called a band gap (Eg). In order that the electron in the valence band may transit from the valence band to the conduction band by radiating the light to the electron in the valence band, it is necessary to radiate the light having the energy equal to or higher than the band gap (about 1.1 eV) of silicon to the electron in the valence band.

A wavelength, $\lambda$(m), of the light meeting the condition described above is expressed by Expression (1):

$$Eg < h\nu = hc/\lambda \qquad (1)$$

where $\nu$ is a frequency (Hz) of the light, c is a speed (m/s) of the light, and h is a Plank constant (J·s).

Expression (1) is transformed into Expression (2) when numerical values are substituted into Expression (1):

$$\lambda < hc/Eg = 6.63 \times 10^{-34} \times 3.0 \times 10^{8} / (1.1 \times 1.6 \times 10^{-19}) \qquad (2)$$

$$\approx 1130 \times 10^{-9} \text{ (m)} = 1130 \text{ (nm)}$$

Since the wavelength of the visible light is in the range of 780 nm (red) to 380 nm (violet), all the visible lights meet Expression (2).

A laser beam is a beam having a uniform phase, and thus has a high energy. On the other hand, in a semiconductor chip, for example, five-level metallic wiring layers are disposed, and transistors are disposed below the five-level metallic wiring layers.

As shown in FIG. 2, the laser beam impinges on a metallic wiring layer (MT) to be reflected.

The laser beam which has passed through a gap defined between the adjacent metallic wiring layers travels in a straight line, is diffracted, and is reflected between the metals of the lower layers. Finally, a part of the reflected laser beam reaches a transistor Tr through a complicated path, so that the malfunction is caused in the semiconductor chip by the free electrons generated in accordance with the internal photoelectric effect.

A designer is conscious of the DFA/FIA attack, and thus disposed a dummy metal pattern for light blocking in an area in which each of layers has no signal wiring, thereby defending that the part of the reflected laser beam reaches the transistor layer as much as possible. However, the designer may not perfectly defend that the part of the reflected laser beam reaches the transistor layer.

In addition, although in the case of the radiation of the laser beam from a back surface of the semiconductor chip, a given rate of laser beam is reflected by the back surface of the semiconductor chip, a part of the laser beam reaches the transistor layer to cause the malfunction in the semiconductor chip. The device for the wiring layer can not cope with the attack from the back side.

[Principles of Output Change in Logic Circuit by Radiation of Laser Beam]

The following phenomenon is caused when, for example, as shown in FIG. 3A, the light meeting Expression (2) is made incident to an inverter INV in which an input level is a Low level, and an output level is a High level.

The free electrons generated in an NMOS transistor NT of the inverter INV in accordance with the internal photoelectric effect appear at an output terminal of the inverter INV, and serves to reduce an output voltage developed at the output terminal.

On the other hand, since the input level of the inverter INV is the Low level, a PMOS transistor is held in an ON state. Thus, when the voltage developed at the output terminal drops, the PMOS transistor supplies a current through a power source terminal. As a result, an output from the inverter INV is held at a voltage depending on these two operations. This output voltage returns back to the High level in accordance with an ON current of the PMOS transistor PT because the supply of the free electrons due to the internal photoelectric effect is stopped when the radiation of the laser beam is completed.

The malfunction is caused when for a period of time for which the laser beam is radiated, in a circuit to which the output signal is inputted from the inverter INV, this input signal is recognized as the signal at the Low level by mistake, and the data is taken in a register circuit disposed in the subsequent signal path during the radiation of the laser beam.

That is to say, the error data is taken in the register circuit and thus the register circuit outputs the faulty arithmetic operation result, and carries out the faulty control.

[Principles of Register Bit Inversion by Radiation of Laser Beam]

A register circuit, for example, has a configuration as shown in FIG. 4A. This register circuit is composed of inverters INV1 to INV7, and transfer gates TM1 to TM4.

It is noted that a description of data inversion will now be given in relation to the simplest configuration of a register circuit shown in FIG. 4B.

This register circuit adopts a configuration which is composed of two inverters INV1 and INV2, and in which an output terminal of the inverter INV1 is connected to an input terminal of the inverter INV2, and an output terminal of the inverter INV2 is connected to an input terminal of the inverter INV1.

When an output from the inverter INV1 becomes a High level, an NMOS transistor NT2 of the inverter INV2 is turned ON, an output from the inverter INV2 becomes a Low level, and the output from the inverter INV2 at the Low level is inputted to a gate of the inverter INV1.

Also, in the inverter INV1, a PMOS transistor PT1 is turned ON, and thus the inverter INV1 outputs an output at the High level. As a result, the output from the inverter INV1 is stably held at the High level, and the output from the inverter INV2 is stably held at the Low level.

In the case where a laser beam is radiated to this register circuit, normally, the two inverters INV1 and INV2 are disposed adjacent to each other, and thus a reaching range of the radiation of the laser beam for which a beam diameter, scattering and diffraction of the laser beam are taken into consideration is sufficiently larger than the disposition distance between the two inverters INV1 and INV2.

For this reason, the laser beam is radiated to either the inverters INV1 and INV2, or none of the inverters INV1 and INV2. Also, when the laser beam is radiated to both the inverters INV1 and INV2, the free electrons are generated in both the NMOS transistors NT1 and NT2 in accordance with the internal photoelectric effect, and are then supplied to the output terminal.

The same operation as that described in the output change in the logic circuit described above is caused in the output from the inverter INV1, in which the input is held at the Low level, and the output is held at the High level, of the two inverters INV1 and INV2. As a result, that output from the inverter INV1 becomes an intermediate potential which is supplied in turn to the input terminal of the other inverter INV2.

In the inverter INV2, the input thereof becomes the intermediate potential, whereby both the transistors PT2 and NT2 are turned ON. Moreover, the free electrons are supplied from the NMOS transistor NT2 in accordance with the internal photoelectric effect, and thus the voltage at the output terminal gets settled into a voltage at which both the operations are balanced.

Also, the intermediate potential at that output terminal is supplied to the input terminal of the inverter INV1 to turn ON the NMOS transistor NT1 as well. Thus, the voltage at the output terminal gets settled into a voltage at which a through current, and the supply of the free electrons generated in the NMOS transistor NT1 in accordance with the internal photoelectric effect are balanced.

As a result, each of the input and output voltages of both the inverters INV1 and INV2 becomes the intermediate potential irrespective of the stored data before the radiation of the laser beam.

The stop of the radiation of the laser beam results in that the generation of the free electrons in the NMOS transistor caused by the internal photoelectric effect is also stopped. Also, each of the input and output voltages of both the inverters INV1 and INV2 becomes the intermediate potential. However, the positive feedback acts on the delicate potential difference between the input and output voltages of both the inverters INV1 and INV2, so that one of them gets settled into the High level, and the other gets settled into the Low level. Also, in the case of the values different from those before the radiation of the laser beam, it is recognized that the DFA attack has been carried out, and the processing to cope with this situation is executed. On the other hand, in the case of the values identical to those before the radiation of the laser beam, it is recognized that no DFA attack has been carried out, and the normal processing is executed.

On the other hand, even in the outside of the area corresponding to the beam diameter of the laser beam, the laser beam reaches up to a measure of area by the scattering and the diffraction.

However, in an area located at a distance several times as long as the beam diameter away from the laser beam, the intensity of the laser beam becomes weak. Thus, even when the laser beam reaches the NMOS transistor of the inverter composing the register circuit to generate the free electrons in the NMOS transistor in accordance with the internal photodiode effect, the ON current of the PMOS transistor becomes larger than the ON current of the NMOS transistor. As a result, the voltage at the output terminal of the inverter circuit converges into a voltage near the Low level. Even when the laser beam reaches this area, no inversion of the data stored in the register is caused because the intensity of the laser beam is weak.

In the intermediate area, the state changes as a function of a distance from the center of the laser beam.

Next, a description will now be given with respect to an attack method of fetching secure information such as a key of an encryption circuit by utilizing this malfunction.

The attack, for example, is carried out in accordance with a procedure shown in FIG. 5.

In Step ST1, a semiconductor chip is put in a nitric acid to dissolve a mold, thereby taking out the semiconductor chip from the nitric acid.

In Step ST2, the semiconductor chip, for example, is bonded to a ceramic package.

In Step ST3, the semiconductor chip is set in a laser beam radiating device in such a way that a portion radiated by a laser beam becomes a start point of an attack.

In Step ST4, the laser beam is scanned for the semiconductor chip through the radiation to successively fetch outputs while signals are supplied from a CPU to the chip.

Also, a portion in which error data is generated is picked up.

In Step ST5, the portion in which the malfunction is caused in Step ST4 is attacked in detail while a timing is also taken into consideration, thereby fetching the output.

Also, any suitable one, of the attack results, which can be analyzed is selected and analyzed.

For example, when bit inversion or the like is generated in data arithmetically operated by the radiation of the laser beam during the arithmetic operation for Data Encryption Standard (DES) cipher as one of common key ciphers, an incorrect arithmetic operation result is outputted. The resulting incorrect arithmetic operation result is compared with a result obtained through a normal arithmetic operation carried out for a plain text, and the key is taken out based on a difference between those results (refer to FIG. 6).

When 1 bit in an R register is inverted, the resulting error data is inputted to an F function, so that the bit number of error data increases. Also, the bit number of error data increases every round.

On the other hand, the less number of error bits is preferable in terms of the analysis using the DFA attack, and a small number of bits is desirably inverted for the final attack.

Ideally, when as shown in FIG. 6, only the data in the R register is inverted in a final round, the key of Sub Sbox corresponding to the error bit can be reliably specified. Although actually, the possibility that the attack result shows such a situation is very low, it is the threat of the DFA attack that when such a situation occurs even one time in a multiple number of attacks, the corresponding key is obtained from such a situation.

In addition, it is assumed that as shown in FIG. 7A, an IC circuit 10 is composed of a CPU 11, a Mask ROM 12, an EEPROM 13, a RAM 14, an encryption circuit 15, and an input/output circuit 16. In addition, it is assumed that a subroutine for encryption execution instructions as shown in FIG. 7B is stored from an A000H address in the Mask ROM 12.

This operation is such that the CPU 11 sets an encryption key "Key" stored in the EEPROM 13, and a plain text "Message" stored in the RAM 14 in a register provided in the encryption circuit 15 through internal registers Reg A and Reg B, respectively, thereby carrying out an encryption arithmetic operation. Also, after completion of the encryption arithmetic operation, an encrypted text is fetched and is then outputted to the outside through the register Reg A.

It is assumed in this program that when a program counter P.C. becomes an A002 address, the bit inversion is caused in a bit b2 of the program counter P.C. by the radiation of the laser beam, so that the program counter P.C. is changed from the A002 address to an A006 address.

An instruction in the A006 address is to output the data stored in the register Reg A to the outside, and thus the output of the encrypted text is essentially supposed therein. However, when the instruction in the A006 address is executed after execution of the instruction in the A001 address, the encryption key as the data stored in the register Reg A is outputted to the outside in accordance with the execution of the instruction in the A006 address.

This is a program example for explaining the FIA attack. If the FIA attack succeeds at the timing described above in accordance with such a program, an attacker gets the encryption key. Since actually, the program is described while the attack is taken into consideration, such a program is not thought. However, although if this program is described, the probability that this attack is carried out is very low, it is the threat of the FIA attack that when this attack succeeds even once in a multiple number of attacks, the key is taken out.

The techniques described in Japanese Patent Laid-Open Nos. Hei 10-154976 and 2002-261751 (referred to as Patent Document 1 and 2 hereinafter), and JP-T-2005-503069 and JP-T-2005-522912 (referred to as Patent Document 3 and 4 hereinafter), respectively, are proposed as measures to cope with the DFA attack on the encryption of the attacks each using the principles described above.

With the technique described in Patent Document 1, two encryption circuits are disposed, and presence or absence of the attack is detected by comparing both the arithmetic operation results with each other after completion of the arithmetic operations in the two encryption circuits. Also, the same arithmetic operation is carried out twice to compare the two arithmetic operation results with each other, thereby detecting presence or absence of the attack.

With the technique described in Patent Document 2, a decryption arithmetic operation is carried out after completion of the encryption arithmetic operation, the arithmetic operation result is compared with a plain text, thereby detecting presence or absence of the attack.

With the technique described in Patent Document 3, an intermediate value of the encryption arithmetic operation is held, and decryption is carried out halfway after completion of the encryption arithmetic operation to be compared with the intermediate value, thereby detecting presence or absence of the attack.

With the technique described in Patent Document 4, an intermediate value of the encryption arithmetic operation is held, the encryption arithmetic operation is carried out again from the intermediate value after completion of the encryption arithmetic operation, and the results of the two encryption arithmetic operations are compared with each other, thereby detecting presence or absence of the attack.

SUMMARY OF THE INVENTION

However, those measures cause demerits that each of the circuit scale and operating current of the encryption circuit is doubled, the arithmetic operation time becomes long, and so on. In addition, some sort of measures needs to be taken to cope with the FIA as well as the attack on the circuit, such as the CPU, other than the encryption circuit.

The present invention has been made in order to solve the problems described above, and it is therefore desirable to provide a circuit for detecting a malfunction generation attack, and an integrated circuit using the same each of which is capable of reliably detecting a radiation of a laser beam before a malfunction is caused in circuits, such as an encryption circuit and a CPU, of constituent elements of a security LSI, thereby avoiding a DFA attack and an FIA attack.

In order to attain the desire described above, according to an embodiment of the present invention, there is provided a circuit for detecting a malfunction generation attack including: at least one sensor circuit adapted to detect a radiation of a light; and a detection circuit for detecting an intermediate voltage between a voltage corresponding to a High level and a voltage corresponding to a Low level in accordance with an output from the at least one sensor circuit, and outputting a detection signal. At least one sensor circuit has an output node a level at which is changed in accordance with the radiation of the light, and outputs a signal corresponding to the level at the output node which is changed in accordance with the radiation of the light. The detection circuit outputs the detection signal when a level of the output signal from the at least one sensor circuit reaches a level previously set.

According to another embodiment of the present invention, there is provided an integrated circuit including at least: a control system; and a malfunction generation attack detecting circuit for detecting a malfunction generation attack, the control system and the malfunction generation attack detecting circuit for detecting a malfunction generation attack being integrated in the integrated circuit. The malfunction generation attack detecting circuit for detecting a malfunction generation attack includes: at least one sensor circuit adapted to detect a radiation of a light; and a detection circuit for detecting an intermediate voltage between a voltage corresponding to a High level and a voltage corresponding to a Low level in accordance with an output from the at least one sensor circuit, and outputting a detection signal. At least one sensor circuit has an output node a level at which is changed in accordance with the radiation of the light, and outputs a signal corresponding to the level at the output node which is changed in accordance with the radiation of the light. The detection circuit outputs the detection signal to the control system when a level of the output signal from the at least one sensor circuit reaches a level previously set.

As set forth hereinabove, according to the present embodiments, the radiation of the light is reliably detected before the malfunction is caused in the constituent elements such as the encryption circuit and the CPU of the security LSI by the radiation of the light, thereby making it possible to avoid the DFA attack and the FIA attack.

BRIEF DESCRIPTION OF THE DRAWINGS

FIG. 5 is a schematic view explaining a procedure of a DFA/FIA attack;

FIG. 9C is a diagram showing still another disposition of the sensor circuits and the detection circuits in the FIA detecting circuit shown in FIG. 8;

DETAILED DESCRIPTION OF THE PREFERRED EMBODIMENTS

Figure 1A:
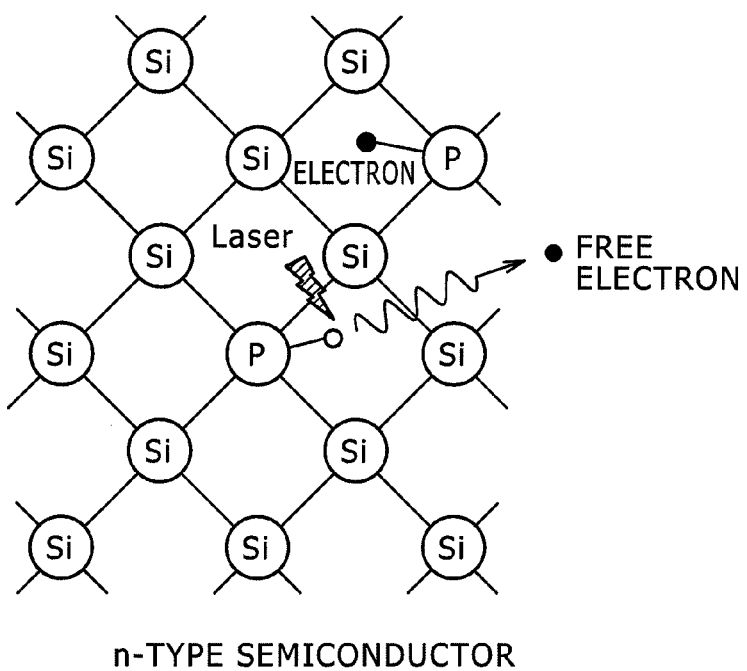
FIGS. 1A and 1B are respectively a diagram and an energy band diagram each explaining a photoelectric effect and a free electron.
Figure 1B:
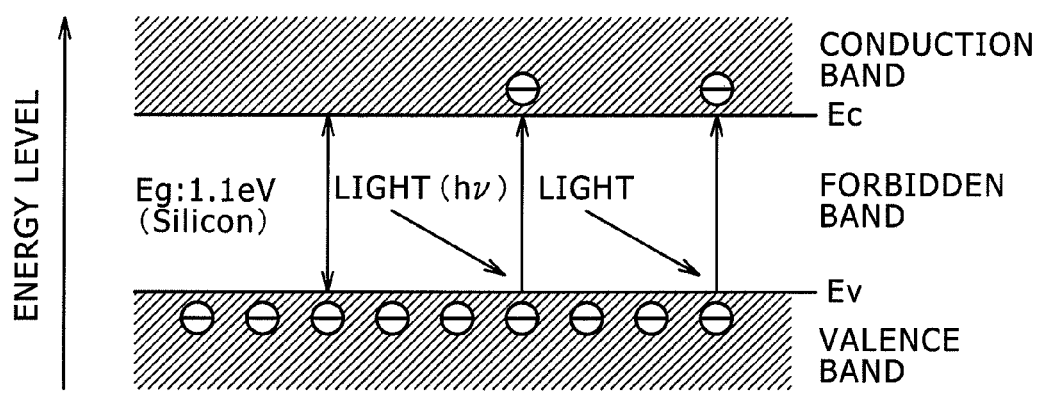
Figure 2:
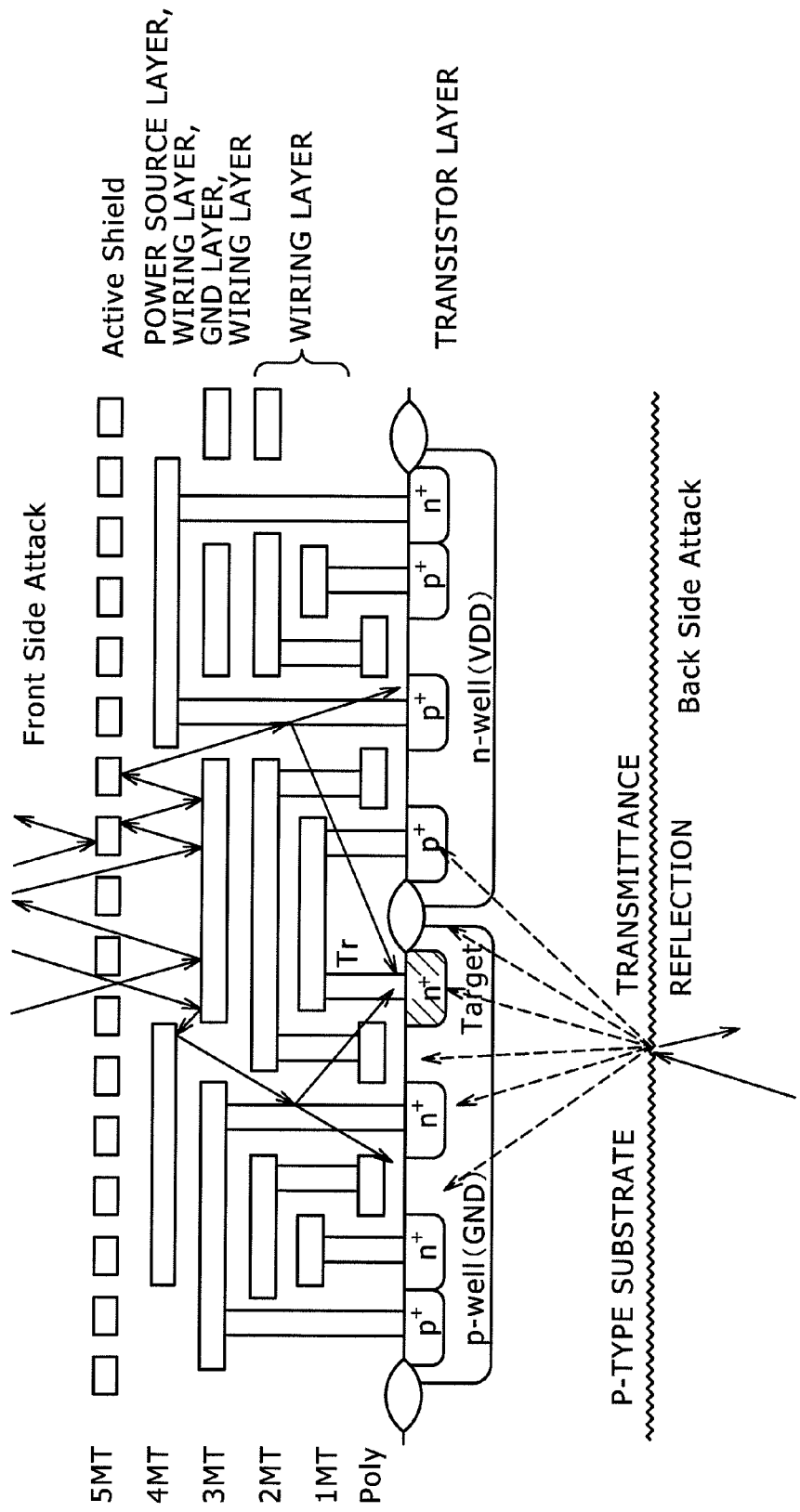
FIG. 2 is a schematic cross sectional view showing an example of a path along which a laser beam reaches a semiconductor.
Figure 3A:
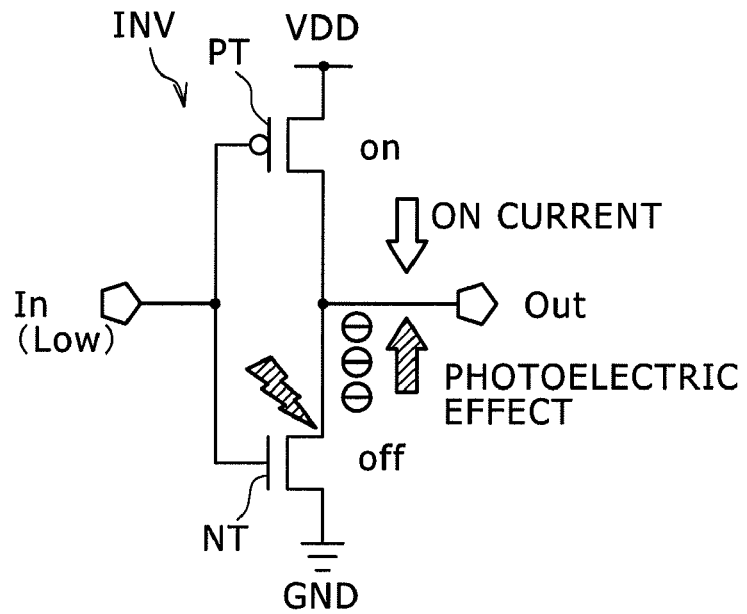
FIGS. 3A and 3B are respectively a circuit diagram and a waveform chart each explaining a radiation of a laser beam to an inverter.
Figure 3B:
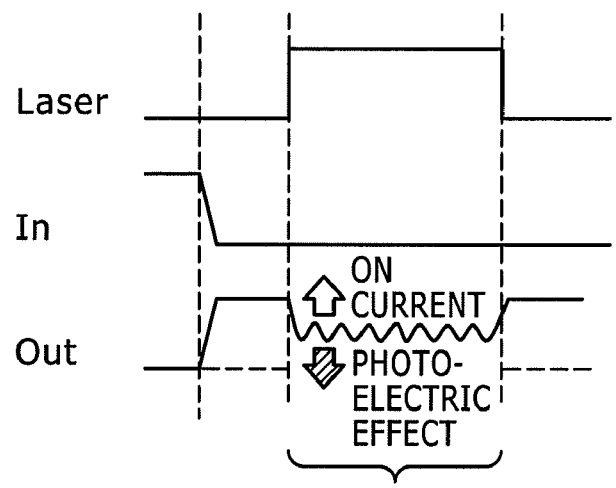
Figure 4A:
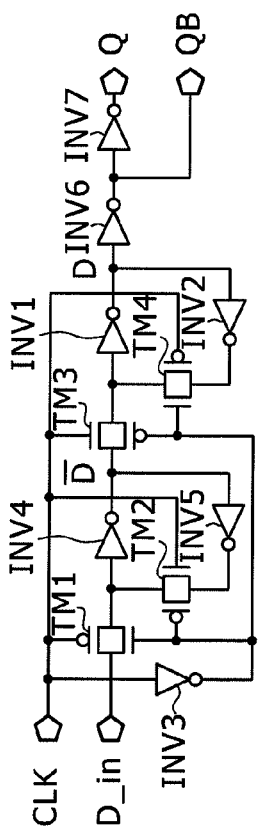
FIGS. 4A, 4B and 4C are respectively circuit diagrams, and a waveform chart each explaining the radiation of the laser beam to a register.
Figure 4C:
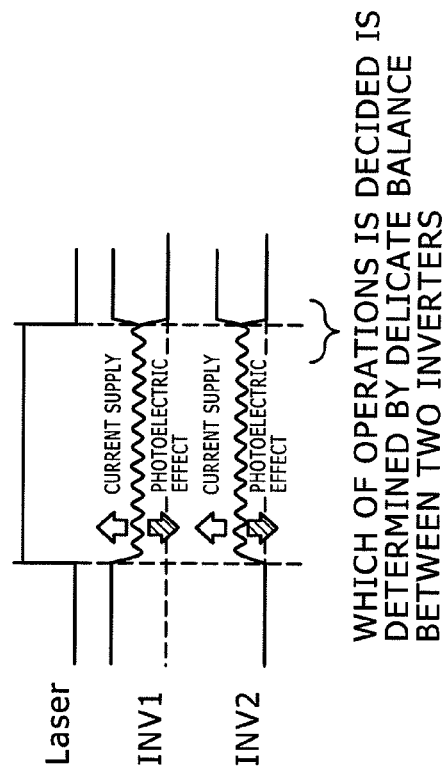
Figure 4B:
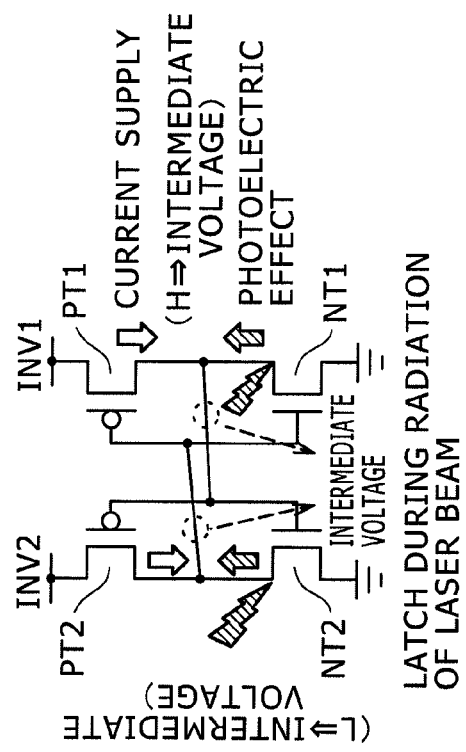
Figure 6:
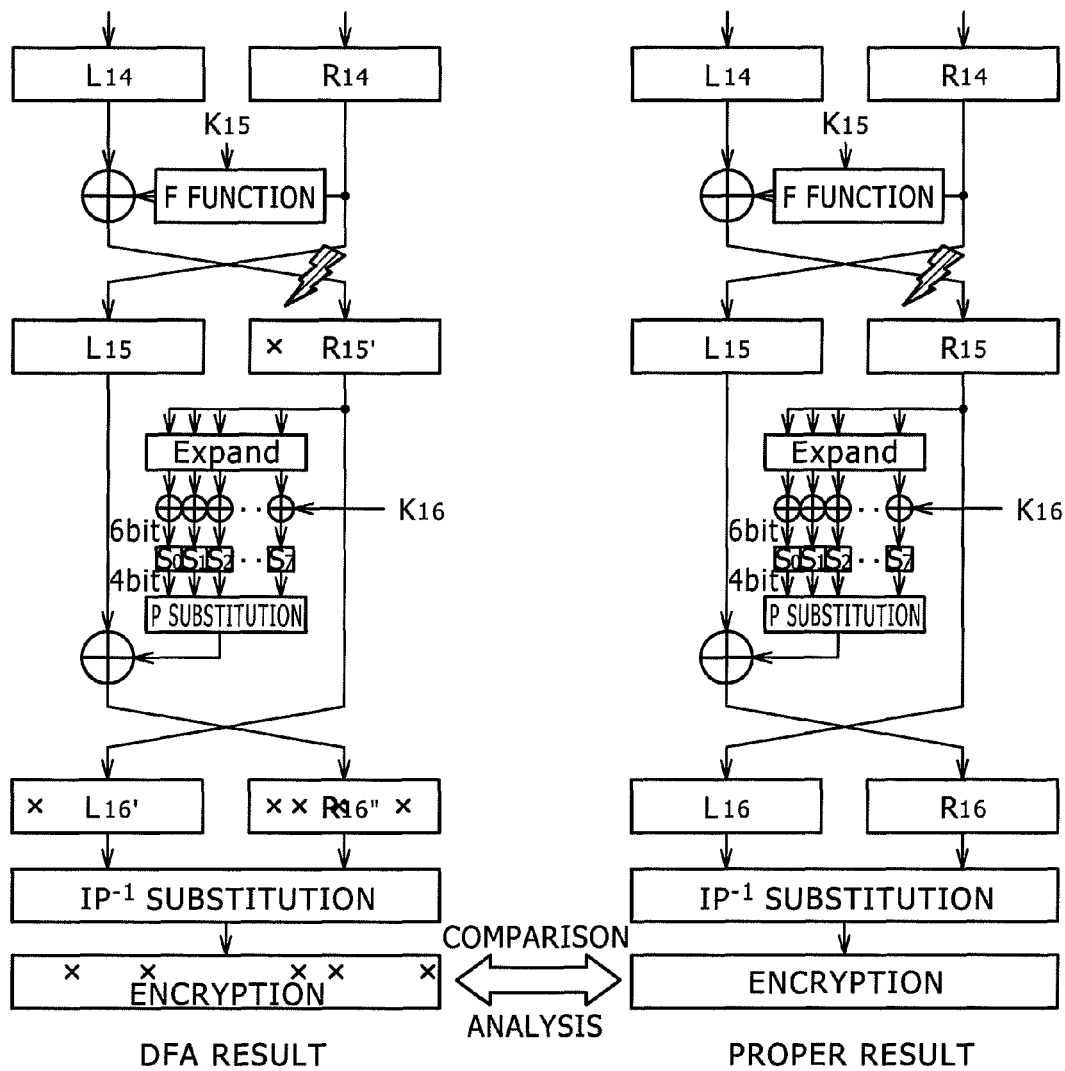
FIG. 6 is a block diagram explaining the DFA attack.

The preferred embodiments of the present invention will be described in detail hereinafter with reference to the accompanying drawings.

It is noted that the description will be given below in accordance with the following order.

1. First Embodiment
2. Second Embodiment

A circuit for detecting a malfunction generation attack (FIA or DFA detecting circuit) according to any of the first and second embodiments of the present invention is basically configured so as to have the features which will be shown below.

Dedicated circuits each composed of a sensor circuit and an intermediate voltage detecting circuit which serve to detect a DFA/FIA are disposed at predetermined intervals. Also, both the sensor circuit and the intermediate voltage detecting circuit paired with each other are disposed separately at a distance along which they are not influenced at the same time by one shot of a laser beam from each other.

A logic circuit and a register circuit are disposed as a DFA/FIA sensor at a predetermined interval.

The contents of the register circuit are set in a predetermined value in a phase of activation of a power source. When an output from the register circuit is changed, predetermined processing is executed.

There is adopted such a configuration that an output from the logic circuit an input to which is fixed so as to output a signal at a High level is inputted to a circuit for detecting an intermediate voltage. Also, when the intermediate voltage is detected based on the output, predetermined processing is executed.

Here, the intermediate voltage means a voltage between a voltage corresponding to the High level, for example, a power source voltage, and a voltage corresponding to a Low level, for example, a reference potential (for example, the ground potential).

There is adopted such a configuration that a power source portion of the logic circuit the input to which is fixed so as to output the signal at the High level is connected to a power source terminal through a resistor. Also, there is adopted such a configuration that an output at either a connection portion or an output portion of the register circuit is inputted to the intermediate voltage detecting circuit for detecting the intermediate voltage.

Also, when the intermediate voltage is detected based on the output signal, predetermined processing is executed.

There is adopted such a configuration that the output from the register circuit is inputted to the intermediate voltage detecting circuit for detecting the intermediate voltage. The contents of the register circuit are set in a predetermined value in the phase of the activation of the power source. Also, when the intermediate voltage is detected based on the output signal, predetermined processing is executed.

There is adopted such a configuration that the power source portion of the register circuit is connected to the power source terminal through the resistor, and there is also adopted such a configuration that the output signal at either the connection portion or the output portion of the register circuit is inputted to the intermediate voltage detecting circuit for detecting the intermediate voltage. The contents of the register circuit are set in a predetermined value in the phase of activation of the power source. Also, when the intermediate voltage due to a through current is detected based on the output signal, predetermined processing is executed.

There is adopted such a configuration that outputs from a plurality of sensor circuits are connected to one another, and the resulting output signal is inputted to one intermediate voltage detecting circuit for detecting the intermediate voltage.

A photosensor is composed of a photodiode (PD) as a photoelectric conversion element composed of an $n^+$-type diffusion region and a p-type well region (or a P-type substrate), and several transistors. Such photosensors are disposed at predetermined intervals.

A cathode of the photodiode is charged with electricity at predetermined time intervals to have a positive voltage in consideration of a reverse leakage current of the photodiode.

An output voltage from the sensor circuit composed of the photodiode is compared with a reference voltage. When the output voltage from the sensor circuit is lower than the reference voltage, it is judged that an attack by the radiation of the laser beam has been carried out, and predetermined processing is executed.

In a prior evaluation, a voltage, which the photosensor circuit composed of the photodiode necessarily firstly detects when the laser beam is radiated to the photosensor circuit composed of a register and a photodiode, is selected as the reference voltage.

When an output signal from the sensor circuit composed of the photodiode is pulled down, and the resulting voltage is set at the High level, it is judged that an attack by the radiation of the laser beam has been carried out, and predetermined processing is executed.

Outputs of the sensor circuits composed of a plurality of photodiodes are connected to one another, and the pull-down is carried out at the same time. When the output voltage is set at the High level, it is judged that an attack by the radiation of the laser beam has been carried out, and predetermined processing is executed.

A flag bit is disposed within an LSI, and the CPU checks the flag in the phase of activation of the power source. In this case, there is adopted such a specification that when no flag is set, the CPU carries out a normal operation, while when the flag is set, the CPU carries out system reset. Also, there is adopted such a specification that when the FIA detecting circuit detects the attack, the CPU executes predetermined processing after the flag is set.

A bit specified within a non-volatile memory is used as the flag bit.

Also, an in-fuse is used as the flag bit.

The above sensor circuit using the photodiode is used as the FIA detecting circuit.

The first and second embodiments each adopting the configuration described above will be described in detail hereinafter.

1. First Embodiment

Figure 8:
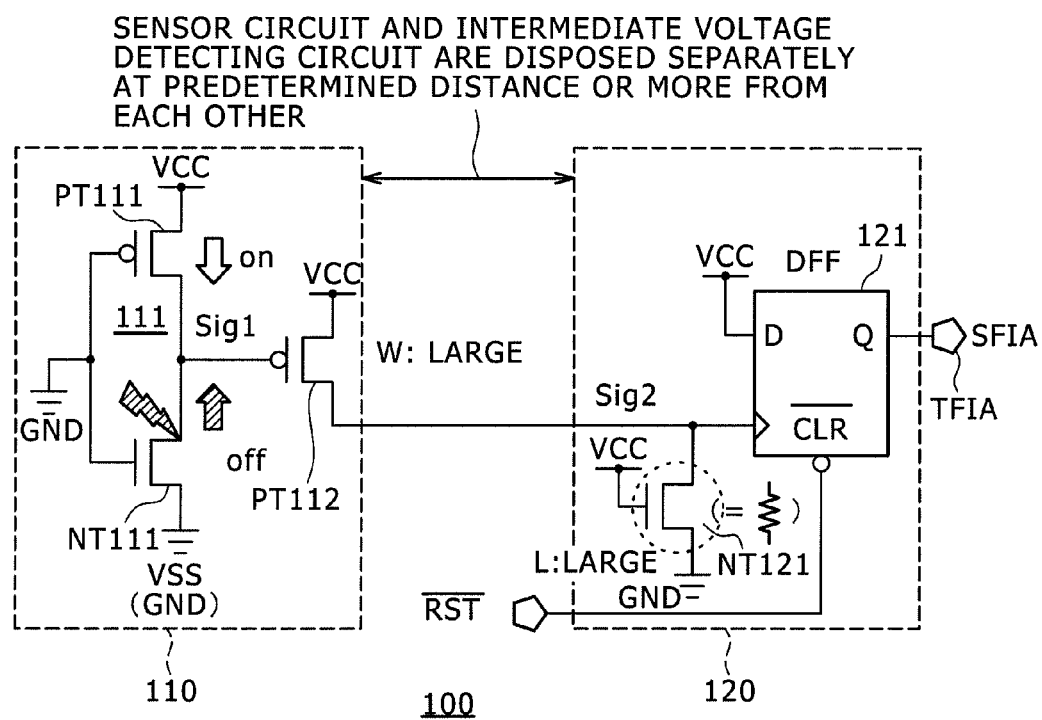
FIG. 8 is a circuit diagram showing a configuration of an FIA detecting circuit according to a first embodiment of the present invention.

FIG. 8 is a circuit diagram showing a configuration of the FIA detecting circuit as the circuit for detecting a malfunction generation attack according to the first embodiment of the present invention.

Figure 9A:
FIGS. 9A and 9B are respectively diagrams showing one and another dispositions of sensor circuits and detection circuits in the FIA detecting circuit shown in FIG. 8.
Figure 9B:
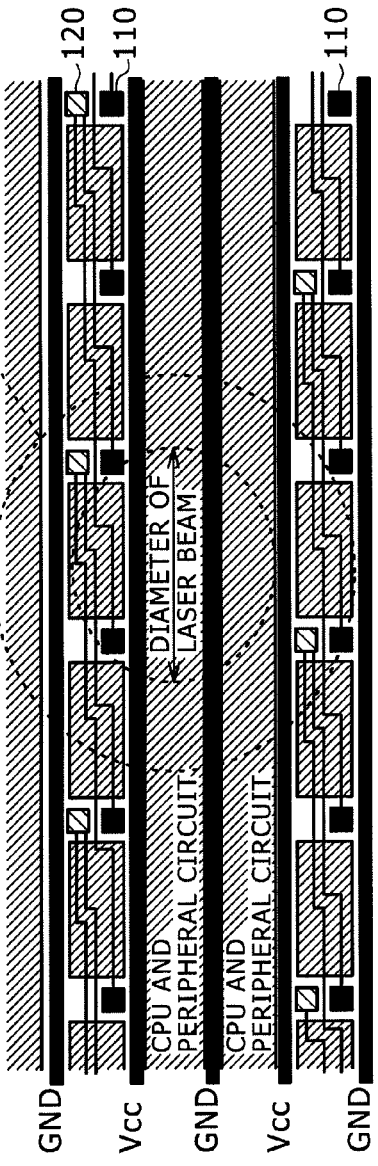

FIGS. 9A to 9C are respectively diagrams showing one and another dispositions of sensor circuits and detection circuits of the FIA detecting circuit.

The FIA detecting circuit 100 of the first embodiment includes the sensor circuits 110 and the intermediate voltage detecting circuits (simply referred to as "the detection circuits" in some cases) 120.

As shown in FIGS. 9A, 9B and 9C, the FIA detecting circuit 100 for detecting the FIA attack is divided into the sensor circuits 110 and the intermediate voltage detecting circuits 120. In this case, the sensor circuit 110 and the intermediate voltage detecting circuit 120 are disposed separately at a distance equal to or larger than a diameter of an area which is reached by one shot of a laser beam radiation from each other.

As has been described, the FIA detecting circuit 100 is divided into the sensor circuits 110 and the detection circuits 120, and the sensor circuit 110 and the detection circuit 120 are disposed so that both the sensor circuit 110 and the detection circuit 120 are not contained in the laser beam diameter of one shot of the laser beam at the same time.

Any of methods as shown in FIGS. 9A, 9B, and 9C can be adopted as a connection method for the sensor circuits 110 and the detection circuits 120.

In the case of the connection method shown in FIG. 9A, one sensor circuit 110 is connected to one intermediate voltage detecting circuit 120.

In the case of the connection method shown in FIG. 9B, two sensor circuits 110 are connected to one intermediate voltage detecting circuit 120.

Also, in the case of the connection method shown in FIG. 9C, three sensor circuits 110 are connected to one intermediate voltage detecting circuit 120.

Although not illustrated, it is also possible to adopt such a configuration that four or more sensor circuits 110 are connected to one intermediate voltage detecting circuit 120.

As a result, when the sensor circuit 110 reaches a detection level by the radiation of the laser beam, the intermediate voltage detecting circuit 120 does not malfunction. Thus, the radiation of the laser beam can be reliably detected, and predetermined processing when the attack by the radiation of the laser beam is received can be executed.

The sensor circuit 110 includes an inverter 111 and an open-drain type PMOS transistor PT112. In this case, in the inverter 111, a PMOS transistor PT111 and an NMOS transistor NT111 are connected in series between a power source VCC and a reference potential VSS.

The inverter 111 forms a logic circuit. In addition, the reference potential VSS, for example, is a potential of the ground GND.

Gates of the PMOS transistor PT111 and the NMOS transistor NT111 are each connected to the ground GND having the reference potential.

As a result, the inverter 111 forming the logic circuit is configured so as to output a signal at a High level through an output node.

In addition, a channel width, W, of the PMOS transistor PT112 is set so as to become larger than that of a normal PMOS transistor.

The intermediate voltage detecting circuit 120 includes a D-type flip flop (DFF) circuit 121, and an NMOS transistor NT121 having a long channel length L.

A D-input of the DFF circuit 121 is connected to a power source VCC, and a clock terminal of the DFF circuit 121 is connected to a drain side of the PMOS transistor PT112 in the intermediate voltage detecting circuit 120.

Thus, the intermediate voltage detecting circuit 120 has such a configuration that the inverter 111 having an input at a Low level is used, and an output from the inverter 111 is inputted to a gate of the open-drain type PMOS transistor PT112.

Also, the intermediate voltage detecting circuit 120 adopts such a configuration that the DFF circuit 121, and the NMOS transistor NT121, for example, having the long channel length L and used as a pull-down resistor are both connected to an input line.

Figure 10:
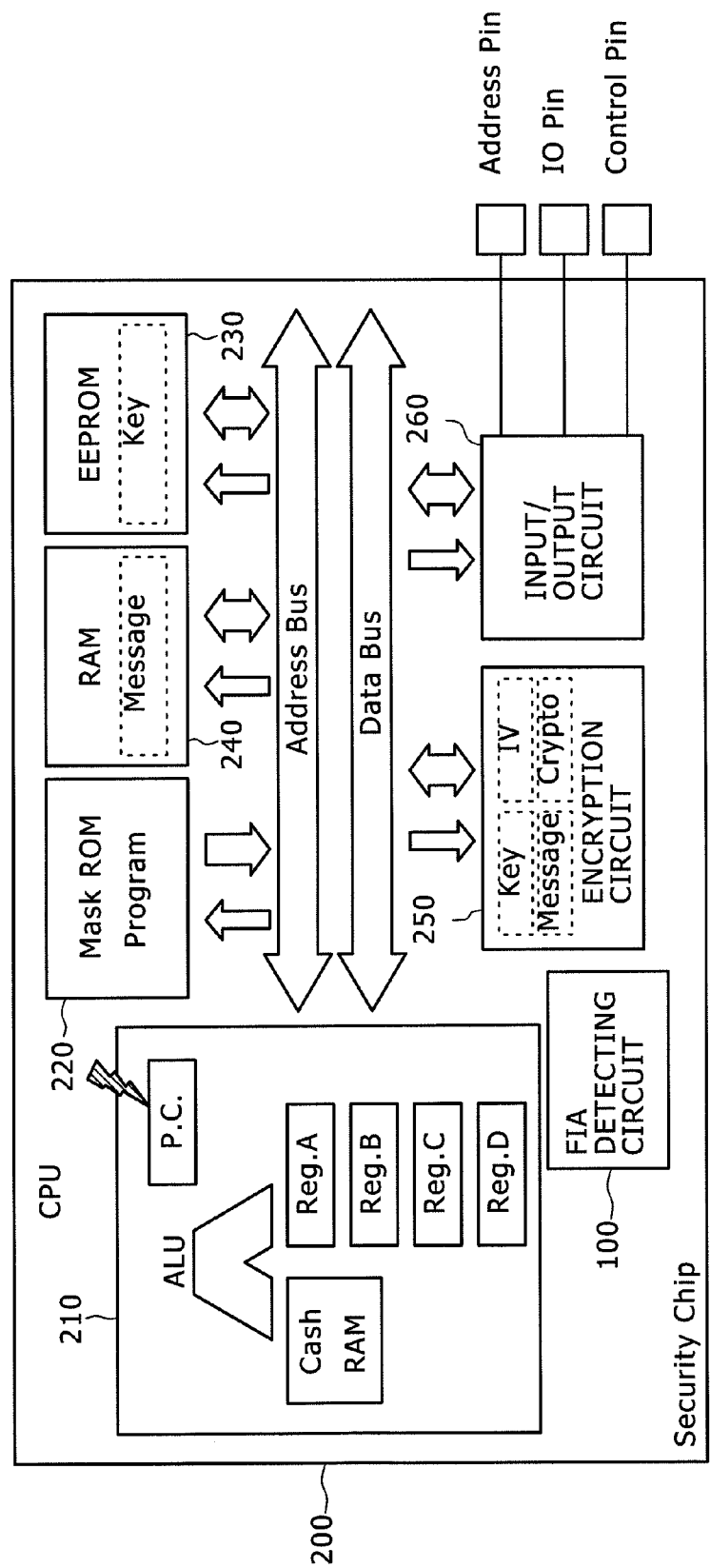
FIG. 10 is a block diagram showing a configuration of an integrated circuit (IC circuit) adopting the FIA detecting circuit according to the first embodiment of the present invention.

FIG. 10 is a block diagram showing a configuration of an integrated circuit (IC circuit) adopting the FIA detecting circuit 100 of the first embodiment.

The IC circuit 200 includes the FIA detecting circuit 100, a CPU 210 serving as a control system, a Mask ROM 220, an EEPROM 230, a RAM 240, an encryption circuit 250, and an input/output circuit 260.

Figure 7:
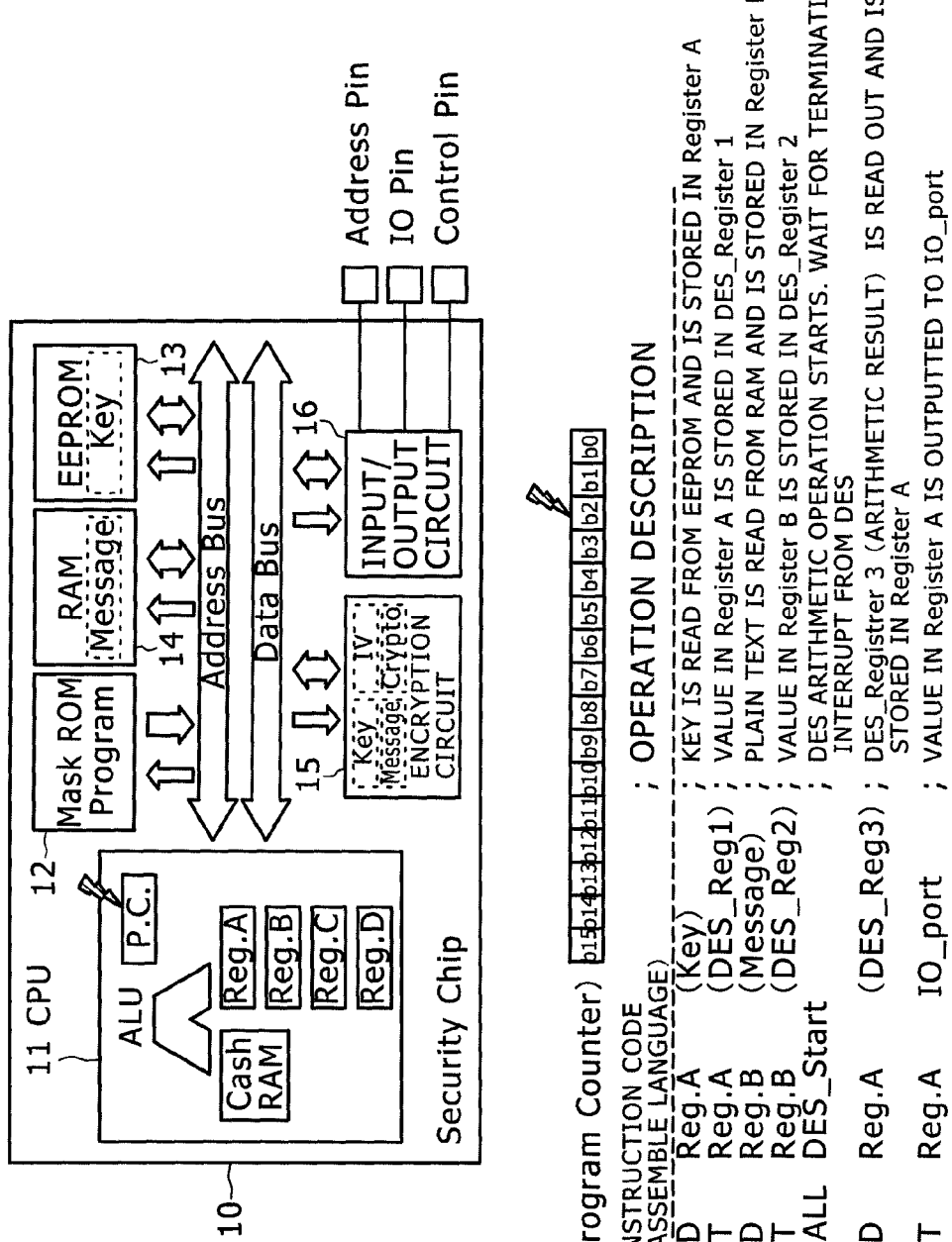
FIGS. 7A and 7B are respectively a circuit diagram and a statement each explaining the FIA attack.

The basic configuration and function of the IC circuit 200 are the same as those of the IC circuit 10 shown in FIG. 7A except for provision of the FIA detecting circuit 100. Therefore, the details thereof are omitted here for the sake of simplicity.

Figure 11:
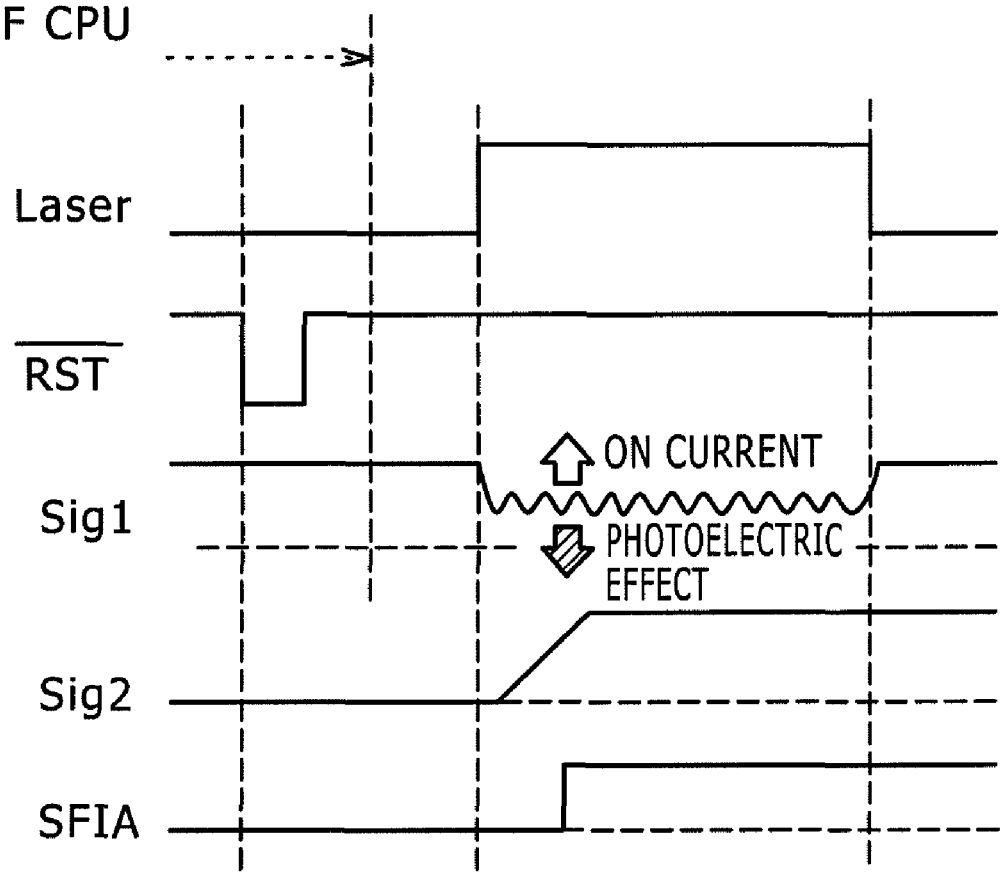
FIG. 11 is a timing chart showing an operation timing of the FIA detecting circuit shown in FIG. 8.

FIG. 11 is a timing chart showing an operation timing of the FIA detecting circuit 100 shown in FIG. 8.

With regard to the operation of the FIA detecting circuit 100, firstly, for example, the DFF circuit 121 is cleared in a phase of initialization of the CPU 210.

As a result, an output signal SFIA from the intermediate voltage detecting circuit 120 becomes a Low level.

On the other hand, in the sensor circuit 110, the inverter 111 outputs a signal at a High level. The PMOS transistor PT112 to the gate of which the signal at the High level is inputted is held in an OFF state, and an output of the PMOS transistor PT112 is held in a high impedance state.

A clock input signal Sig2 to the DFF circuit 121 is held at a Low level by the pull-down NMOS transistor NT121 of the intermediate voltage detecting circuit 120.

When in this state, the laser beam is radiated to the converter 111 of the sensor circuit 110 and the voltage level at the signal line Sig1 is reduced by the free electrons generated in the drain terminal of the NMOS transistor NT111 in accordance with the internal photoelectric effect, the following operation is executed.

In the case where a threshold value of the PMOS transistor PT111 is taken to be Vthp, when that voltage level at the signal line Sig1 is reduced to become equal to or lower than (VCC–Vthp), the PMOS transistor PT112 disposed on the output side of the sensor circuit 110 is turned ON, and the voltage of the clock input signal Sig2 rises.

Also, the voltage of the clock input signal Sig2 rises to become higher than a threshold value of the clock input of the DFF circuit 121, a "D" input of the DFF circuit 121, that is, the signal at the power source VCC level is taken in the DFF circuit 121.

As a result, the output signal SFIA is changed from the Low level to the High level, thereby informing the CPU 210 of the FIA attack.

When the number of free electrons generated in accordance with the internal photoelectric effect is small, either the PMOS transistor PT112 disposed on the output side of the sensor circuit 110 is not turned ON, or even when the PMOS transistor PT112 is turned ON, the ON current is small.

Therefore, the clock input signal Sig2 does not rise to become higher than the threshold value of the clock input of the DFF circuit 121, and thus the output signal SFIA is held at the Low level and is not changed.

In the case where the laser beam is radiated to the intermediate voltage detecting circuit 120, even when the output signal SFIA is inverted from the Low level to the High level within the DFF circuit 121 in accordance with the internal photoelectric effect, thereby informing the CPU 210 of the FIA attack, there is no problem because this operation is the same as that of the general photosensor.

In addition, it is supposed that the sensor 110 connected to another intermediate voltage detecting circuit 120 is disposed adjacent to the intermediate voltage detecting circuit 120.

For this reason, even the radiation of the laser beam in this case is not recognized by the intermediate voltage detecting circuit 120, the attack is recognized by another intermediate voltage detecting circuit 120 connected to the sensor circuit 110 disposed adjacent to the intermediate voltage detecting circuit 120.

Next, a description will be given with respect to a configuration of an FIA area detecting circuit in which a plurality of sensor circuits 110 are disposed, and the outputs of the plurality of sensor circuits 110 are connected to one another, thereby obtaining the clock input signal Sig2 to the DFF circuit 121.

Figure 12:
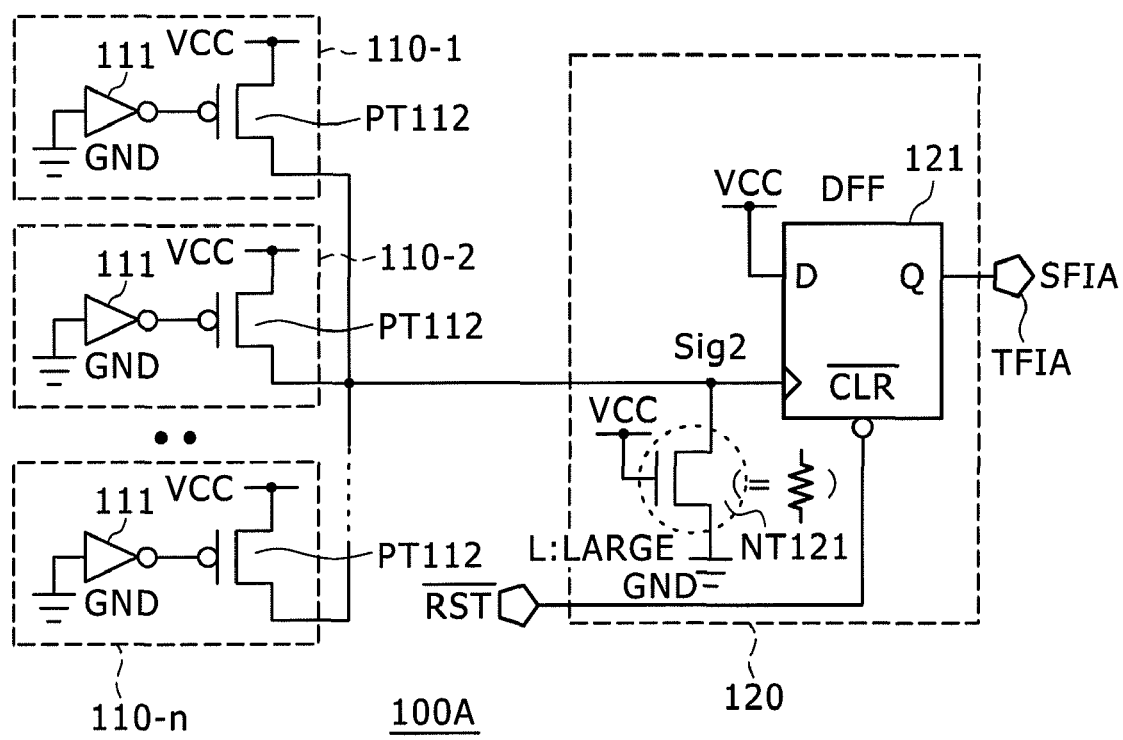
FIG. 12 is a circuit diagram showing a configuration of an FIA area detecting circuit including the FIA detecting circuit according to the first embodiment of the present invention.

FIG. 12 is a circuit diagram showing a configuration of the FIA area detecting circuit adopting the FIA detecting circuit of the first embodiment.

FIG. 12 shows the case where the FIA area detecting circuit includes n sensor circuits 110-1, 110-2, ..., 110-n as an example.

Figure 13:
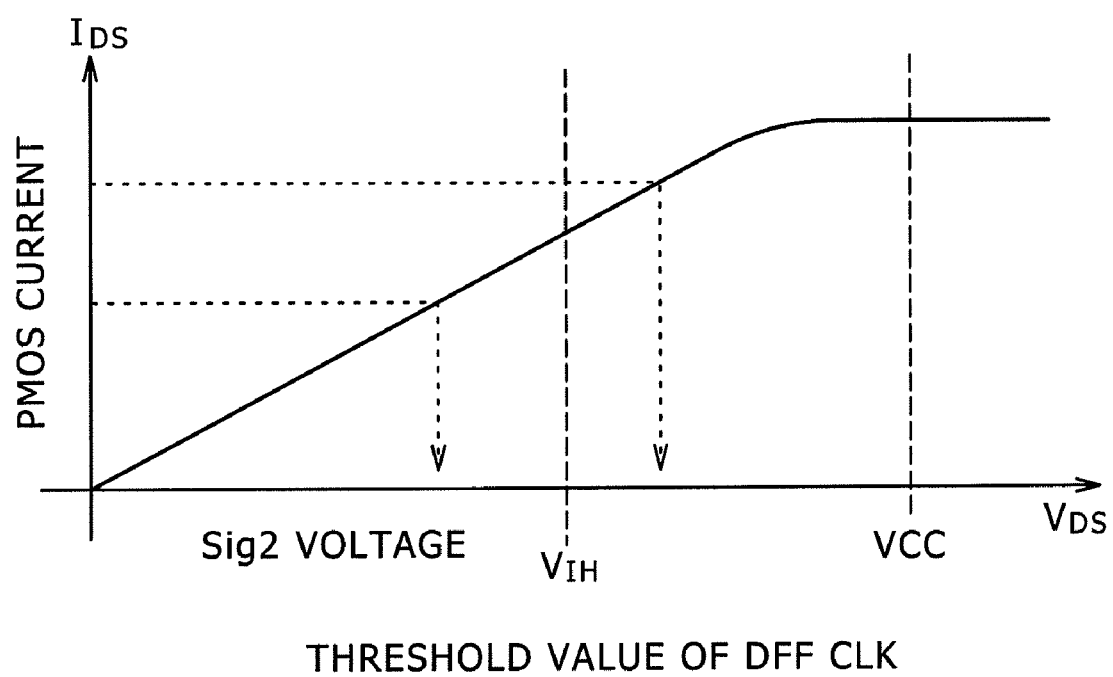
FIG. 13 is a graphical representation showing static characteristics of a pull-down transistor.

FIG. 13 is a graphical representation showing static characteristics of a pull-down transistor.

In this case, a current caused to flow through the NMOS transistor NT121 used as the pull-down resistor becomes a sum of currents caused to flow through the sensor circuits 111-1 to 111-n, respectively, connected to one another. Also, the voltage of the clock signal Sig2 increases in proportion to the sum of the currents caused to flow through the sensor circuits 111-1 to 111-n, respectively.

Even if the level of the current caused to flow through one sensor circuit is so small as not to exceed the threshold value of the clock input signal to the DFF circuit 121, when a plurality of sensor circuits are radiated at the same time by one shot of the laser beam, and are also connected to the same detection circuit, the operation may be carried out as follows.

That is to say, there is the possibility that as shown in FIG. 13, the voltage level of the clock input signal Sig2 increases in proportion to the total current, thereby allowing the DFF circuit 121 to be set.

In this case, this operation becomes equivalent to that in which the sensitivity for the FIA is enhanced.

Figure 14A:
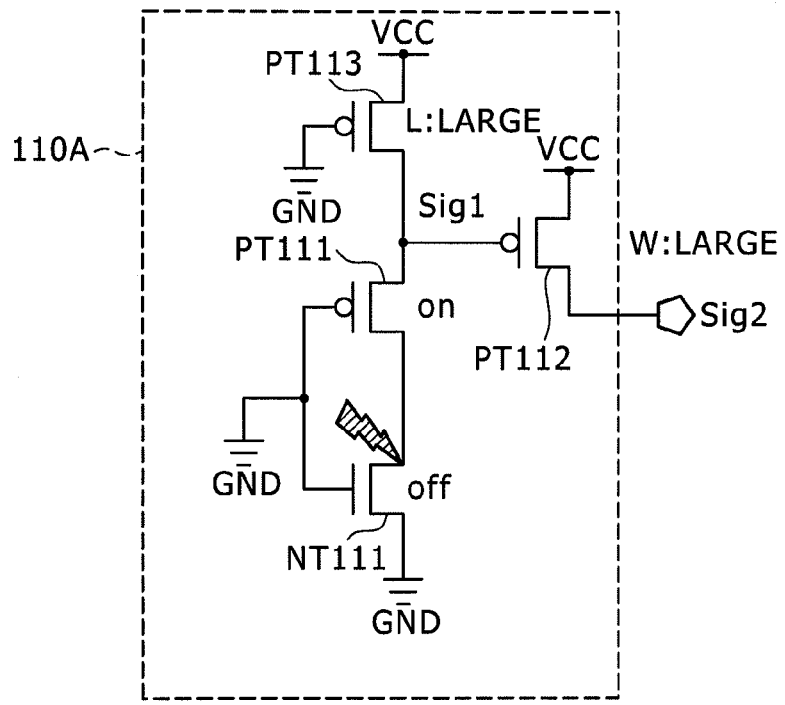
FIGS. 14A and 14B are respectively circuit diagrams showing configurations of the sensor circuit in the FIA detecting circuit of the first embodiment.
Figure 14B:
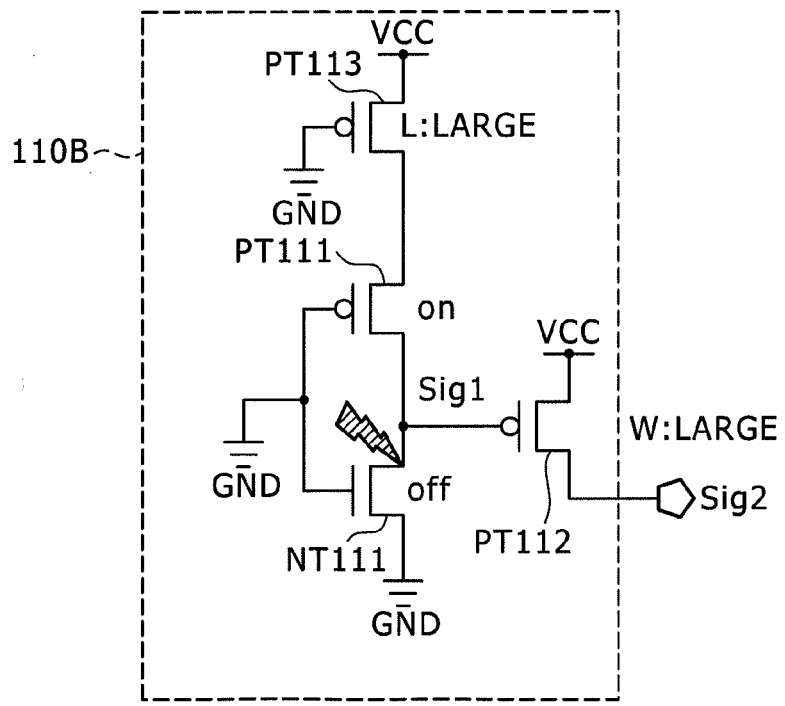

FIGS. 14A and 14B are respectively circuit diagrams showing other configurations of the sensor circuit in the FIA detecting circuit of the first embodiment.

A method of using any of the configurations as shown in FIGS. 14A and 14B in the sensor circuits, respectively, can be adopted as another method of enhancing the sensitivity.

Each of the sensor circuits 110A and 110B shown in FIGS. 14A and 14B, respectively, has such a configuration that a PMOS transistor PT113 having a gate grounded to the power source side, a long channel length L, and a large channel resistance is inserted into the sensor circuit 110 shown in FIG. 8.

A gate of the PMOS transistor PT112 disposed on the output side of the sensor circuit 110A shown in FIG. 14A is connected to a connection point between a drain of the PMOS transistor PT113 thus added, and a source of the PMOS transistor PT111.

In the sensor circuit 110B shown in FIG. 14B, the gate of the PMOS transistor PT112 disposed on the output side thereof is connected to an output node of the inverter 111 as a connection point between a drain of the PMOS transistor PT111, and a drain of the NMOS transistor NT111.

In this case, since an output to the sensor circuit 110A, 110B is held at the Low level, each of the two PMOS transistors PT111 and PT113 is held in the ON state, and the NMOS transistor NT111 is held in an OFF state.

Since in the phase of the normal operation, no current is caused to flow from the PMOS transistor PT112 disposed on the output side, the level at each of the output nodes becomes the level of the power source VCC. Thus, there is no problem because the PMOS transistor PT112 to the gate of which the signal Sig1 is inputted is turned OFF.

When the laser beam is radiated to the sensor circuit 110A, the free electrons generated in accordance with the internal photoelectric effect are caused to flow through the sensor circuit 110A, and the voltage level of the signal Sig1 drops. Also, when the voltage level of the signal Sig1 thus dropped is reduced to become lower than the threshold value Vthp of the open-drain type PMOS transistor PT112 on the output side, the open-drain type PMOS transistor PT112 on the output side is turned ON.

Figure 15:
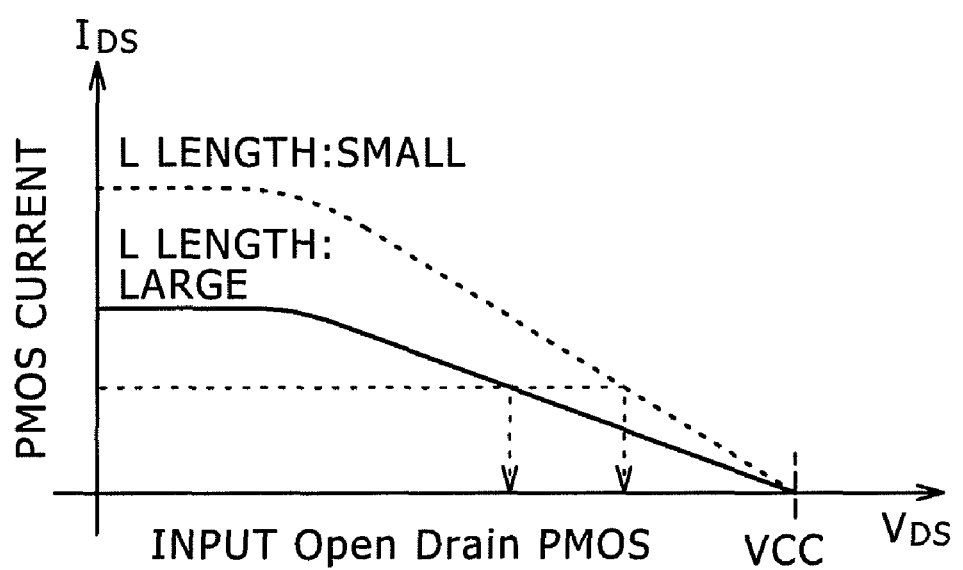
FIG. 15 is a graphical representation showing static characteristics of a PMOS transistor.

When the channel length, L, of the PMOS transistor PT113 thus added is sufficiently long, as shown in FIG. 15, the voltage of the signal Sig1 becomes lower than that of the signal Sig1 shown in FIG. 8, and the current of the PMOS transistor PT112 on the output side becomes large.

As a result, the drain voltage of the NMOS transistor NT121 of the intermediate voltage detecting circuit 120 becomes higher than that in the case of FIG. 8, which results in an increase in detection sensitivity.

Figure 16:
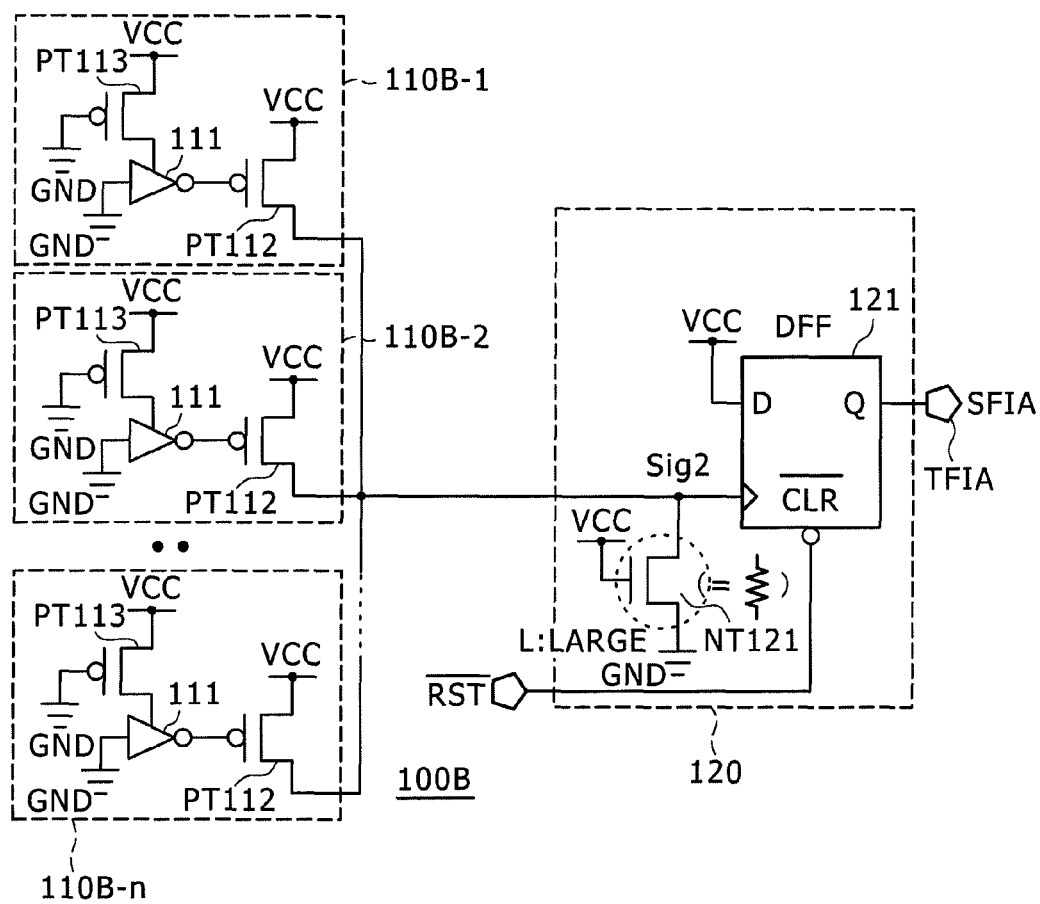
FIG. 16 is a circuit diagram showing a configuration of an FIA area detecting circuit adopting the sensor circuit shown in FIG. 14B.

FIG. 16 is a circuit diagram showing a configuration of an FIA area detecting circuit adopting the sensor circuit 110B shown in FIG. 14B.

The FIA area detecting circuit 100B adopts the sensor circuit 110B shown in FIG. 14B, and thus the sensitivity is further enhanced as compared with the case of the configuration of the FIA area detecting circuit 100A shown in FIG. 12.

Figure 17:
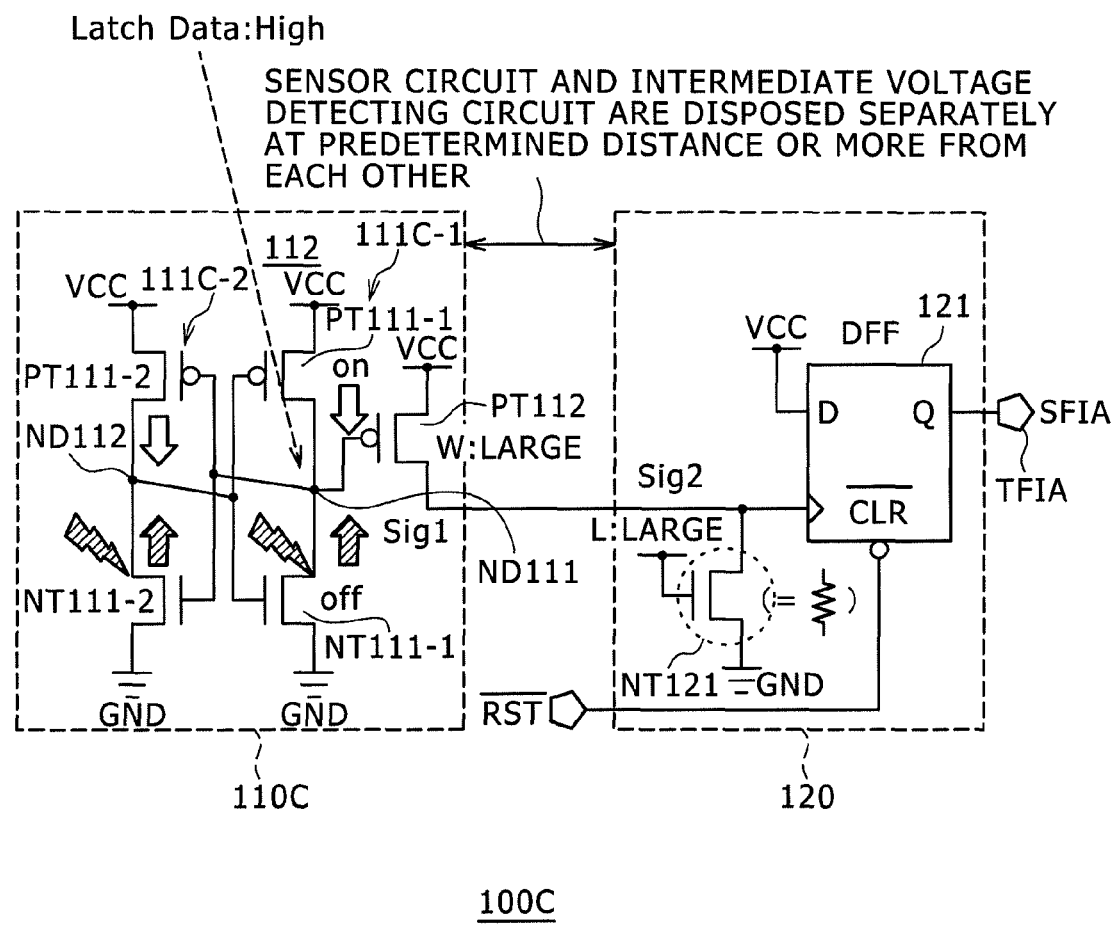
FIG. 17 is a circuit diagram showing a configuration of a modification of the FIA detecting circuit according to the first embodiment of the present invention.

FIG. 17 is a circuit diagram showing a configuration of a change of the FIA detecting circuit according to the first embodiment of the present invention.

Figure 18:
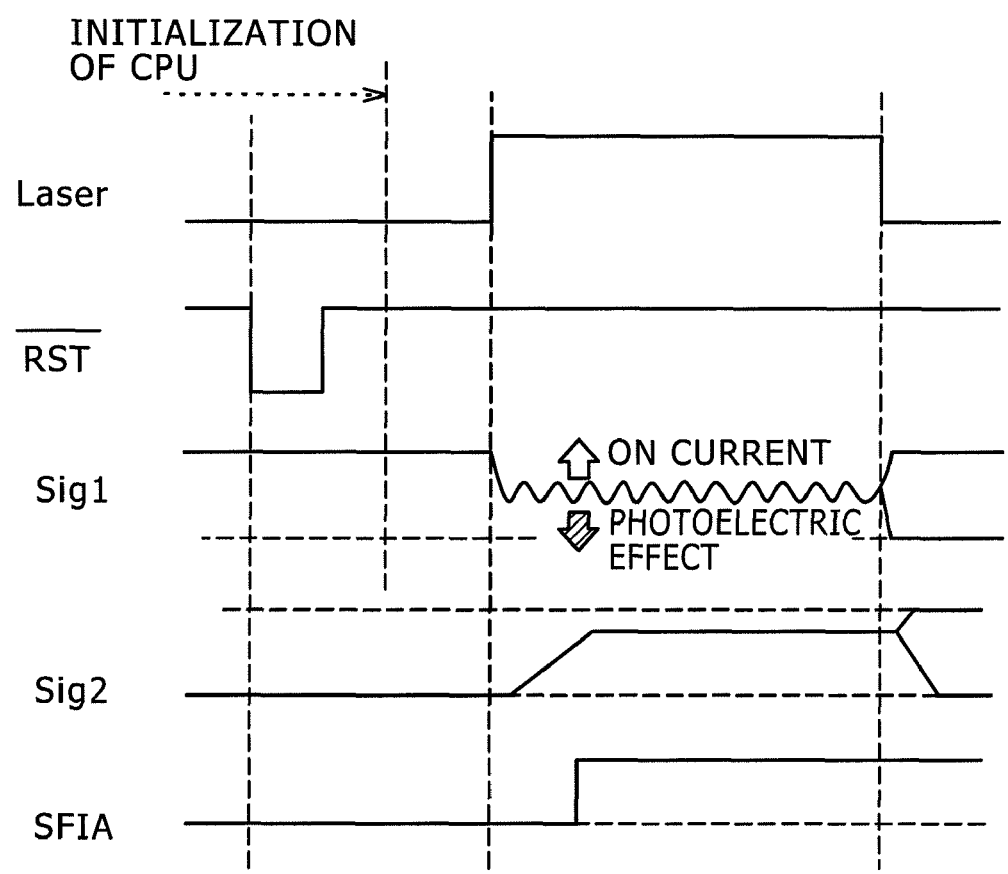
FIG. 18 is a timing chart showing an operation timing in the FIA detecting circuit shown in FIG. 17.

FIG. 18 is a timing chart showing an operation timing in the operation of the FIA detecting circuit shown in FIG. 17.

The FIA detecting circuit 100C shown in FIG. 17 is different in configuration from the FIA detecting circuit 100 shown in FIG. 8 in the following points.

In the FIA detecting circuit 100C shown in FIG. 17, in a sensor circuit 100C, the inverter 111 serving as the logic circuit is replaced with a register (latch) 112.

The register 112 is configured by cross-connecting inputs and outputs of two CMOS inverters 111C-1 and 111C-2.

In the inverter 111C-1, a PMOS transistor PT111-1 and an NMOS transistor NT111-1 are connected in series between the power source VCC and the reference potential VSS, and an output node ND111 is formed by a connection point between drains of the PMOS transistor PT111-1 and the NMOS transistor NT111-1.

In the inverter 111C-2, a PMOS transistor PT111-2 and an NMOS transistor NT111-2 are connected in series between the power source VCC and the reference potential VSS, and an output node ND112 is formed by a connection point between drains of the PMOS transistor PT111-2 and the NMOS transistor NT111-2.

The output node ND111 of the inverter 111C-1 is connected to each of gates of the PMOS transistor PT111-2 and the NMOS transistor NT111-2 as an input of the inverter 111C-2, and a gate of the PMOS transistor PT112 on the output side.

The output node ND112 of the inverter 111C-2 is connected to each of gates of the PMOS transistor PT111-1 and the NMOS transistor NT111-1 as an input of the inverter 111C-1.

When the register is used as the sensor in such a manner, the inverter 111 shown in FIG. 8 is replaced with the register 112, and thus "1" is set in a value stored in the register 112 in the phase of the initialization of the CPU 210.

Thus, in the phase of the normal use, the VCC level is supplied as the output signal Sig1 from the register 112 to the gate of the open-drain type PMOS transistor PT112 on the output side to turn OFF the open-drain type PMOS transistor PT112. As a result, on the side of the intermediate voltage detecting circuit 120, the clock input to the DFF circuit 121 is held at the Low level by the pull-down NMOS transistor NT121.

When the laser beam is radiated to the sensor circuit 110C, the current is caused to flow through the inverter 111C-1 by the presence of the free electrons generated in the NMOS transistor NT111-1 of the inverter 111C-1 in accordance with the internal photoelectric effect.

As a result, the voltage of the signal Sig1 at the output node ND111 drops to become an intermediate voltage.

The intermediate voltage at the output node ND111 is applied to the input of the inverter 111C-2.

In the inverter 111C-2, in addition to the generation of the free electrons according to the internal photoelectric effect, both the PMOS transistor PT111-2 and the NMOS transistor NT111-2 are turned ON to generate an intermediate voltage at the output node ND112.

Also, the resulting intermediate voltage is applied to the input of the inverter 111C-1. Thus, in the inverter 111-1 as well, in addition to the generation of the free electrons according to the internal photoelectric effect, both the PMOS transistor PT111-1 and the NMOS transistor NT111-1 are turned ON.

In this state, the outputs from both the inverters 111C-1 and 111C-2 become approximately the same intermediate potential irrespective of the data held therein before the radiation of the laser beam.

The intermediate voltage of the output from the inverter 111C-1 becomes lower than that in the case of FIG. 8 not using the register, but using the inverter 111 all the more because the input to the inverter 111C-1 becomes the intermediate potential.

As a result, the current of the open-drain type PMOS transistor PT112 increases, and thus a drain-to-source voltage Vds of the NMOS transistor NT121 of the intermediate voltage detecting circuit 120 becomes large, so that the level of the signal Sig2 becomes high.

Also, when the voltage of the signal Sig2 is larger than the threshold value of the clock input to the DFF circuit 121, the output signal SFIA is changed from the Low level to the High level.

Figure 19:
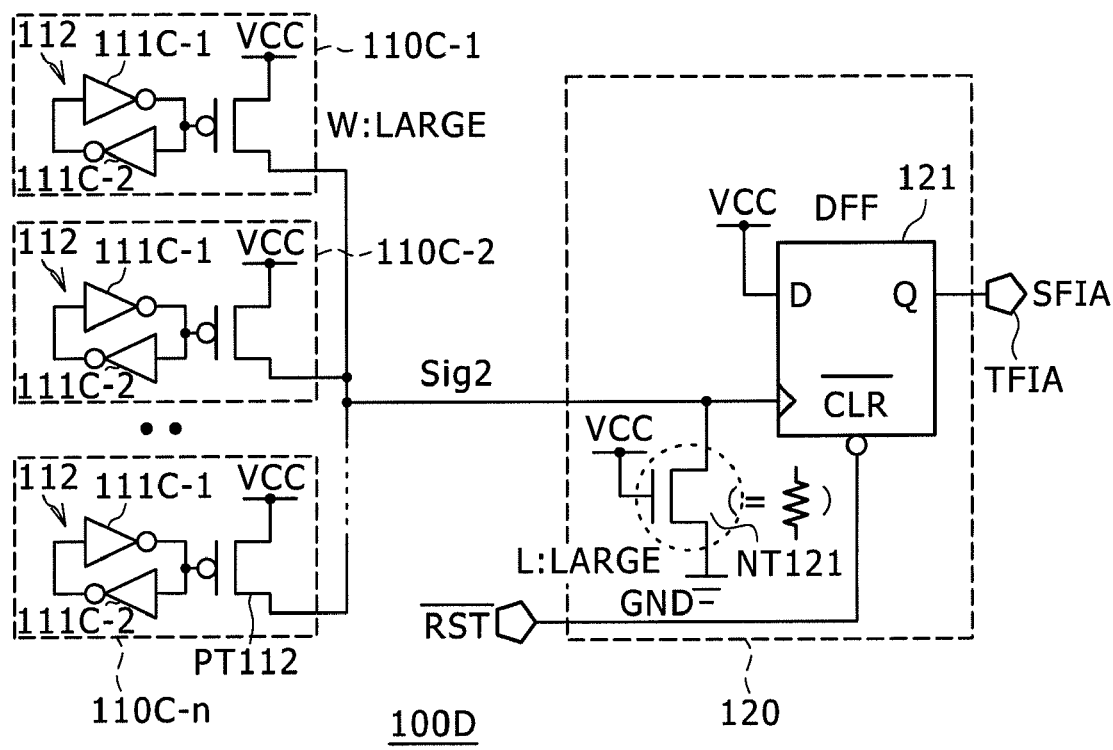
FIG. 19 is a circuit diagram showing a configuration of an FIA area detecting circuit adopting the sensor circuit in the modification of the FIA detecting circuit shown in FIG. 17.

FIG. 19 is a circuit diagram showing a configuration of an FIA area detecting circuit adopting the sensor circuit 100C shown in FIG. 17.

The FIA area detecting circuit 100D in which a plurality of sensor circuits 100C are disposed, and outputs of the plurality of sensor circuits 100C are connected to one another, thereby obtaining the clock input signal Sig2 to the DFF circuit 121 can be configured in such a manner.

FIG. 19 shows the cases where the FIA area detecting circuit 100D includes n sensor circuits 110C-1, 110C-2, . . . , 110-n as an example.

In this case, the drain voltage of the NMOS transistor NT121 of the intermediate voltage detecting circuit 120 becomes large as the sum of the currents of the PMOS transistors PT112 becomes larger.

Therefore, even when a quantity of light reaching each of the sensor circuits 110C-1, 110C-2, . . . , 110C-n is less through one shot of the laser beam, the threshold value of the clock input signal Sig2 to the DFF circuit 121 is exceeded, thereby making it possible to change the output from the DFF circuit 121 from the Low level to the High level. As a result, the sensitivity is enhanced.

Figure 20A:
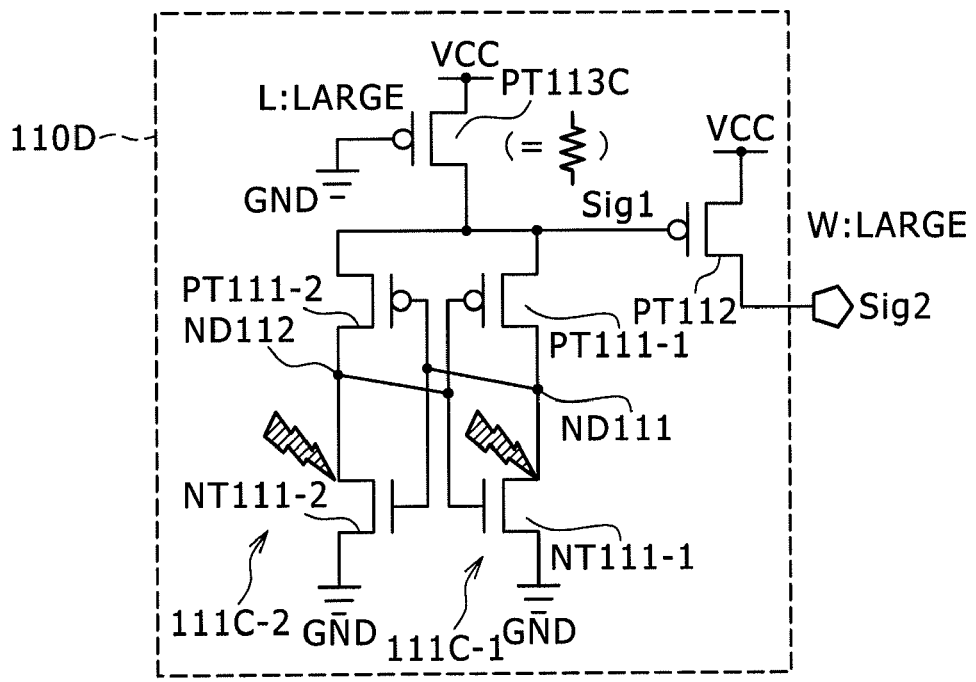
FIGS. 20A and 20B are respectively circuit diagrams showing other configurations of the sensor circuit in the modification the FIA detecting circuit shown in FIG. 17.
Figure 20B:
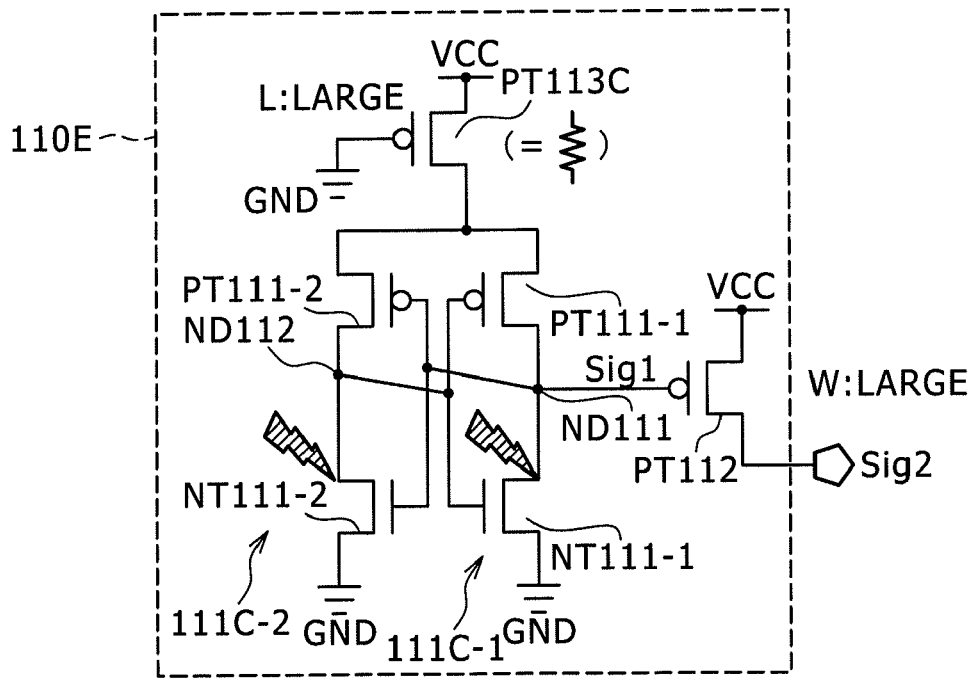

FIGS. 20A and 20B are respectively circuit diagrams showing other configurations of the sensor circuit in the change of the FIA detecting circuit shown in FIG. 17 according to the first embodiment of the present invention.

A method of using any of the configurations as shown in FIGS. 20A and 20B, respectively, in the sensor circuit can be adopted as another method of enhancing the sensitivity.

Each of the sensor circuits 110D and 110E shown in FIGS. 20A and 20B, respectively, has such a configuration that a PMOS transistor PT113C having a gate grounded to the power source side, a long channel length L, and a large channel resistance is inserted into the sensor circuit 110C shown in FIG. 17.

A gate of the PMOS transistor PT112 disposed on the output side, in the sensor circuit 110D shown in FIG. 20A, is connected to each of a drain of the PMOS transistor PT113C thus added, and sources of the PMOS transistors PT111-1 and PT111-2.

In the sensor circuit 110E shown in FIG. 20B, the gate of the PMOS transistor PT112 disposed on the output side is connected to an output node ND111 as the connection point between the drain of the PMOS transistor PT111, and the drain of the NMOS transistor NT111.

When the configuration using any of the sensor circuits 110D and 110E shown in FIGS. 20A and 20B, respectively, instead is adopted, the sensitivity is enhanced.

Since in the phase of the normal use, the value stored in the register 112 is merely set as the High level in the phase of the initialization of the CPU 210, and after that, the value in the register 112 is not changed, the signal at the VCC level is outputted as the output signal Sig1. As a result, there is no problem because the open-drain type PMOS transistor PT112 is held in the OFF state.

When the laser beam is radiated to the register 112, as described with respect to the operation with reference to FIG. 17, both the inputs to the intervals 111C-1 and 111C-2 become the intermediate potentials, and thus the through currents are caused to flow through the PMOS transistors PT112 on the outside, respectively. As a result, in each of the sensor circuits 110D and 110E, the voltage of the signal Sig1 drops.

The current becomes more than that in the case of the configuration that the PMOS transistor 113 is added to any of the inverters 111 of FIGS. 14A and 14B, and the voltage drop in the signal Sig1 becomes large, all the more because both the inputs to the inverters 111C-1 and 111C-2 become the intermediate potentials, and thus the through currents are caused to flow through the output transistors, respectively.

As a result, the current of the open-drain type PMOS transistor PT112 becomes much. Thus, the possibility that the voltage of the signal Sig2 becomes higher than that in the case where any of the configurations shown in FIGS. 14A and 14B is used, and thus the threshold value of the clock input to the DFF circuit 121 is exceeded becomes high.

Figure 21:
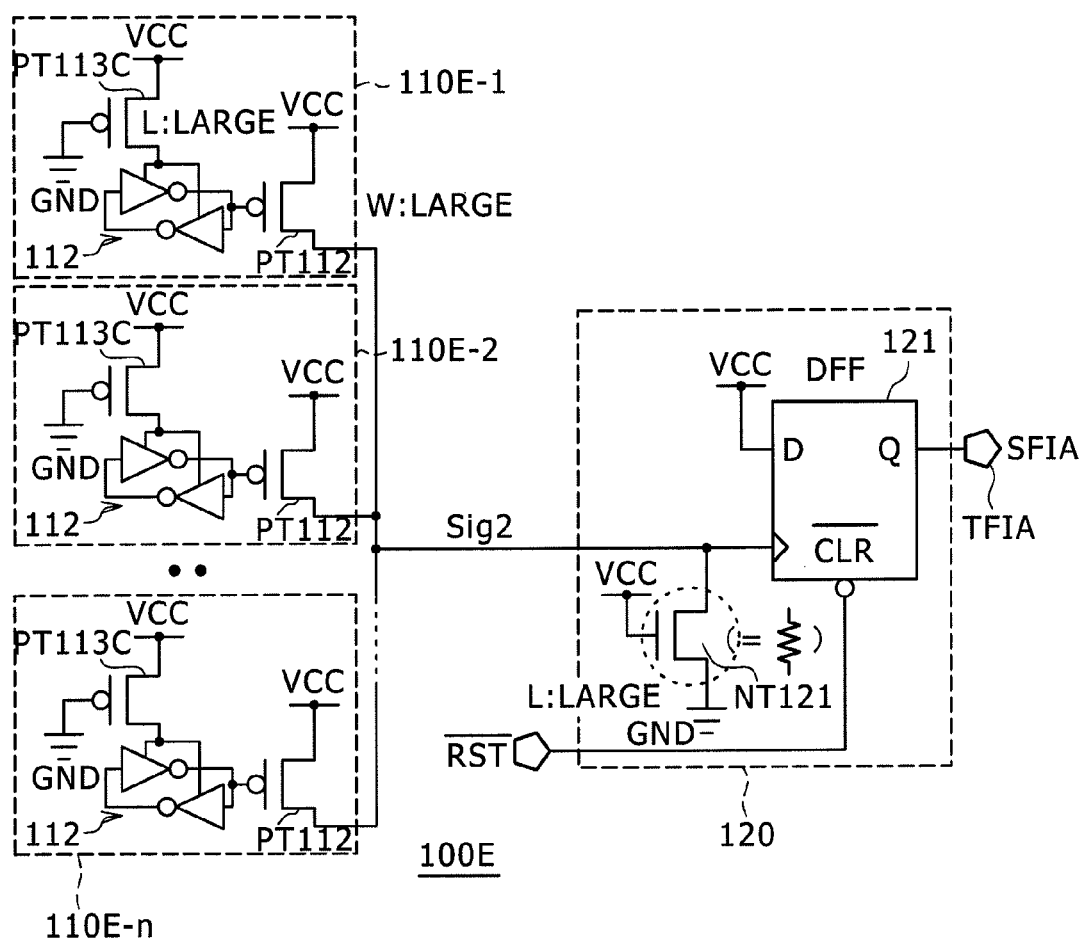
FIG. 21 is a circuit diagram showing a configuration of an FIA area detecting circuit adopting the sensor circuit shown in FIG. 20B.

FIG. 21 is a circuit diagram showing a configuration of an FIA area detecting circuit adopting the sensor circuit shown in FIG. 20B.

The FIA area detecting circuit 100F adopts the sensor circuit 110E shown in FIG. 20B, and thus the sensitivity is further enhanced as compared with the case of the configuration of the FIA area detecting circuit 100D shown in FIG. 19.

With the method described above, even when the laser beam is radiated multiple times, the FIA attack is detected in accordance with the intensity of the laser beam thus radiated which is received by either each of or a plurality of sensor circuits.

Even when the weak laser beam is radiated to the same portion multiple times, if each of the radiation intensities of the laser beam is weak, no FIA attack is detected.

A method of solving this problem will now be described with reference to circuit diagrams shown in FIG. 22, and FIGS. 25 to 27, respectively, and timing charts shown in FIGS. 23 and 24, respectively.

Firstly, the principles of this method will now be described with reference to FIG. 22.

Figure 22:
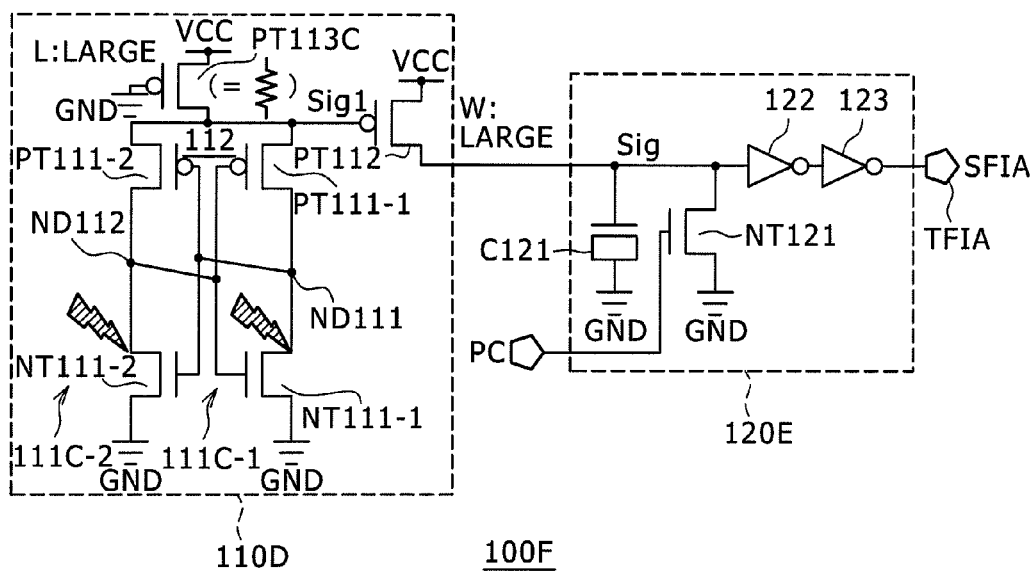
FIG. 22 is a circuit diagram showing a configuration of another modification of the FIA detecting circuit according to the first embodiment of the present invention.

FIG. 22 is a circuit diagram showing another configuration of the FIA detecting circuit according to the first embodiment of the present invention.

Figure 23:
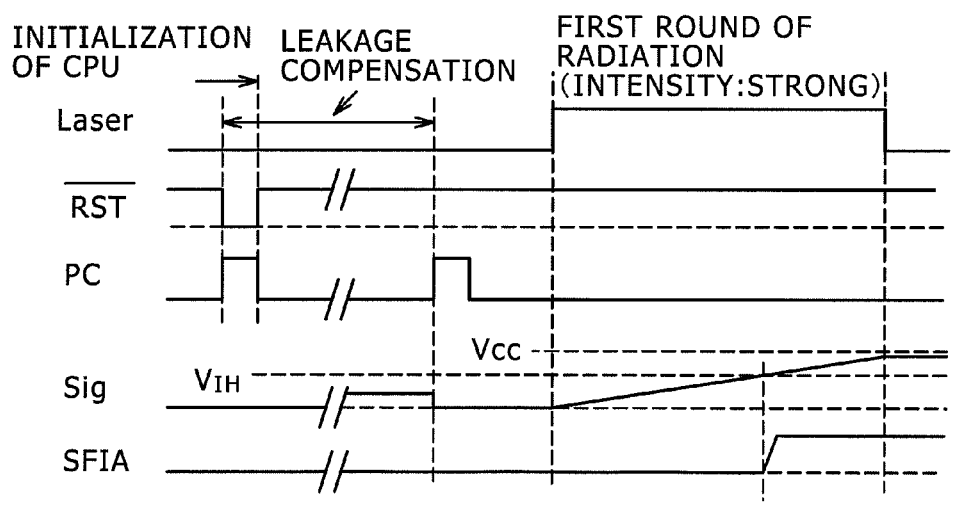
FIG. 23 is a timing chart showing an operation timing, in a phase of a radiation of a strong laser beam, in the FIA detecting circuit shown in FIG. 22.

FIG. 23 is a timing chart showing an operation timing in a phase of a radiation of a strong laser beam in the FIA detecting circuit shown in FIG. 22.

Figure 24:
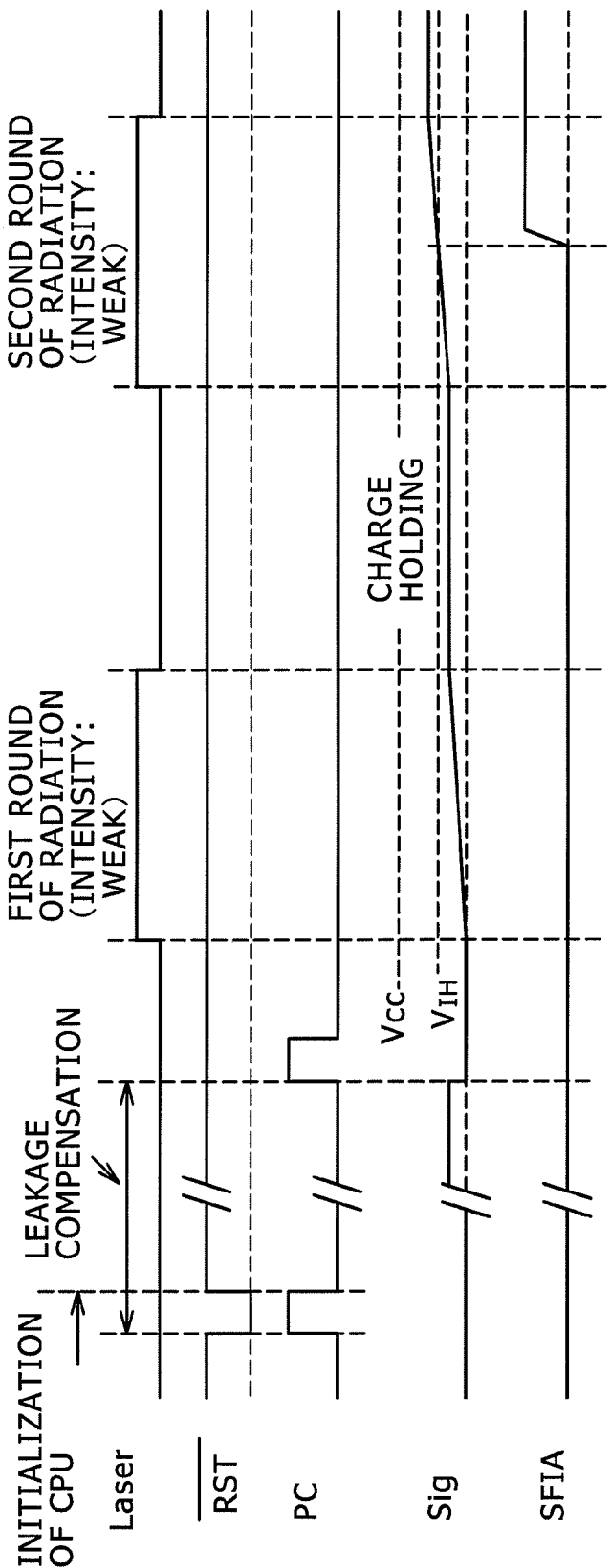
FIG. 24 is a timing chart showing an operation timing, in a phase of multiple radiations of a weak laser beam, in the FIA detecting circuit shown in FIG. 22.

FIG. 24 is a timing chart showing an operation timing when a weak laser beam is radiated multiple times in the FIA detecting circuit shown in FIG. 22.

The FIA detecting circuit 100F shown in FIG. 22 adopts the sensor circuit 100D shown in FIG. 20A as the sensor circuit.

Also, the FIA detecting circuit 100F is different from each of the FIA detecting circuits 100 and 100C and FIA area detecting circuits 100A, 100B and 100D described above in a configuration of an intermediate voltage detecting circuit 120E.

In the sensor circuit 110D, a connection point between the register 112 and the resistor is connected to the gate of the PMOS transistor PT112.

In the sensor circuit 110D, the value stored in the register 112 may be any of the Low level or the High level, and thus it is unnecessary to set the value stored in the register 112 in the phase of the activation of the power source. In addition, the value stored in the register 112 is inverted by the noises or the like, which exerts no influence on the detection result.

The intermediate voltage detecting circuit 120E is composed of a capacitor C121 as a hold capacitor composed of an NMOS transistor having a capacitor or a drain/source grounded, an NMOS transistor NT122 for precharge, and two inverters 122 and 123.

The reason that the DFF circuit is removed from the intermediate voltage detecting circuit 120E is because the capacitor C121 holds therein information on the radiation of the laser beam.

Also, a control signal PC is changed from the Low level to the High level in the phase of the initialization of the CPU 210 at the time of the activation of the power source, and at predetermined intervals to turn ON the NMOS transistor NT122, thereby setting the signal line Sig at the Low level. At this time, the output signal SFIA is held at the Low level.

Here, when, for example, as shown in FIG. 23, the laser beam having the strong intensity is radiated to the sensor circuit 110D, the PMOS transistor PT112 on the output side of the sensor circuit 110D is turned ON in accordance with the voltage drop due to the through current in the register 112, thereby charging the capacitor C121 with the electricity.

Also, when the potential of the capacitor C121 exceeds a circuit threshold value VIH on the High level side of the inverter 122, a potential at an output terminal TFIA of the detection circuit 120E transits from the Low level to the High level to request the CPU 210 to execute predetermined processing.

Also, since no voltage of the capacitor C121 is changed until completion of the predetermined processing, the signal at the High level continues to be outputted as the output signal SFIA.

In the case where the radiation intensity of the laser beam is weak, when the gate voltage of the PMOS transistor PT112 on the output side of the sensor circuit 110D has the level higher than that equal to lower than (VCC−Vth), the PMOS transistor PT112 on the output side of the sensor circuit 110D is turned ON to cause the current to flow through the PMOS transistor PT112, thereby charging the capacitor C121 with the electricity.

However, when the potential of the capacitor C121 does not exceed the threshold value VIH of the inverter 122 in one shot of the laser beam, the potential at the output terminal TFIA of the detection circuit 120E is held at the Low level.

Also, even after completion of the radiation of the laser beam, the electric charges accumulated in the capacitor C121 are held as they are. When the laser beam is radiated to the same sensor circuit 110D again, the charging is started from the potential of the capacitor C121 right after the last radiation of the laser beam.

Also, when the voltage of the capacitor C121 originating from the total charged electric charges exceeds the circuit threshold value VIH, on the High level side, of the inverter 122, the potential at the output terminal TFIA of the detection circuit 120E is changed from the Low level to the High level to request the CPU 210 to execute predetermined processing.

As described above, even in the case of the radiation of the weak laser beam, the output signal SFIA can be set by carrying out the radiation of the weak laser beam multiple times.

Figure 25:
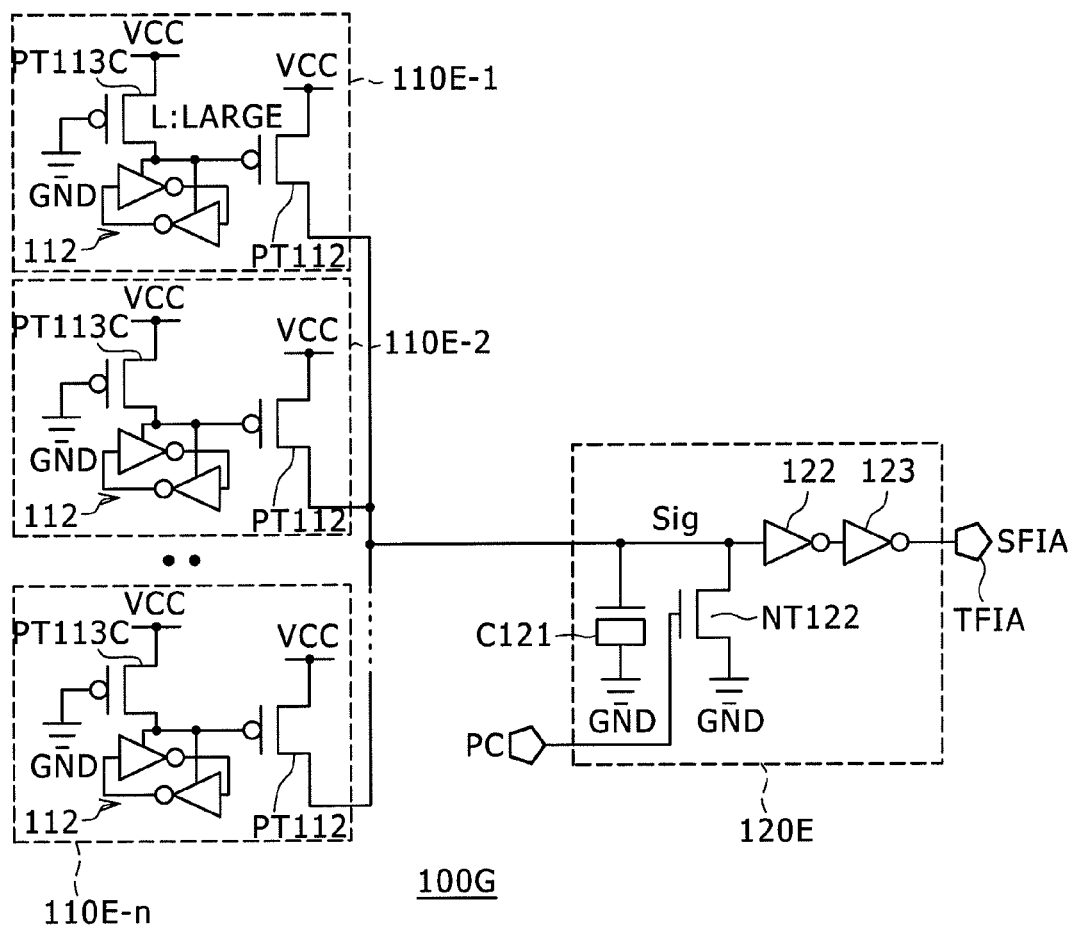
FIG. 25 is a circuit diagram showing a configuration of an FIA area detecting circuit adopting the FIA detecting circuit shown in FIG. 22.

FIG. 25 is a circuit diagram showing a configuration of an FIA area detecting circuit adopting the FIA detecting circuit shown in FIG. 22.

The FIA area detecting circuit 100G adopts the FIA detecting circuit 120E shown in FIG. 22, and thus the sensitivity is further enhanced as compared with the case of the configuration shown in FIG. 22.

In the case where this configuration shown in FIG. 25 is adopted, even when the intensity of the laser beam which is received by each of the sensor circuits 110E-1 to 110E-n is weak, the output signal SFIA can be set by the sum of output currents from the sensor circuits 110E-1 to 110E-n.

Figure 26:
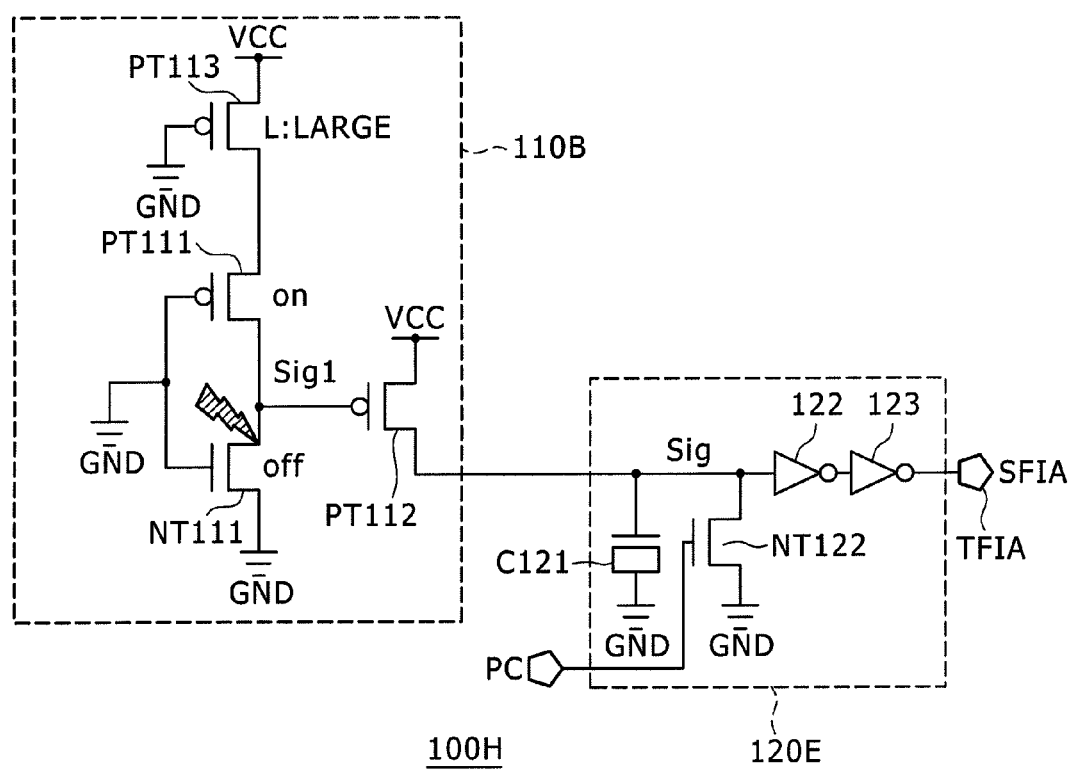
FIG. 26 is a circuit diagram showing a configuration of still another modification of the FIA detecting circuit, different in configuration from that shown in FIG. 22, according to the first embodiment of the present invention.

FIG. 26 is a circuit diagram showing another configuration of the FIA detecting circuit different in configuration from the FIA detecting circuit shown in FIG. 22 in accordance with the first embodiment of the present invention.

In the FIA detecting circuit 100H shown in FIG. 26, the sensor circuit 110B shown in FIG. 14B is adopted as the sensor circuit.

Other configuration points of the FIA detecting circuit 100H are the same as those of the FIA detecting circuit 100F shown in FIG. 22.

Figure 27:
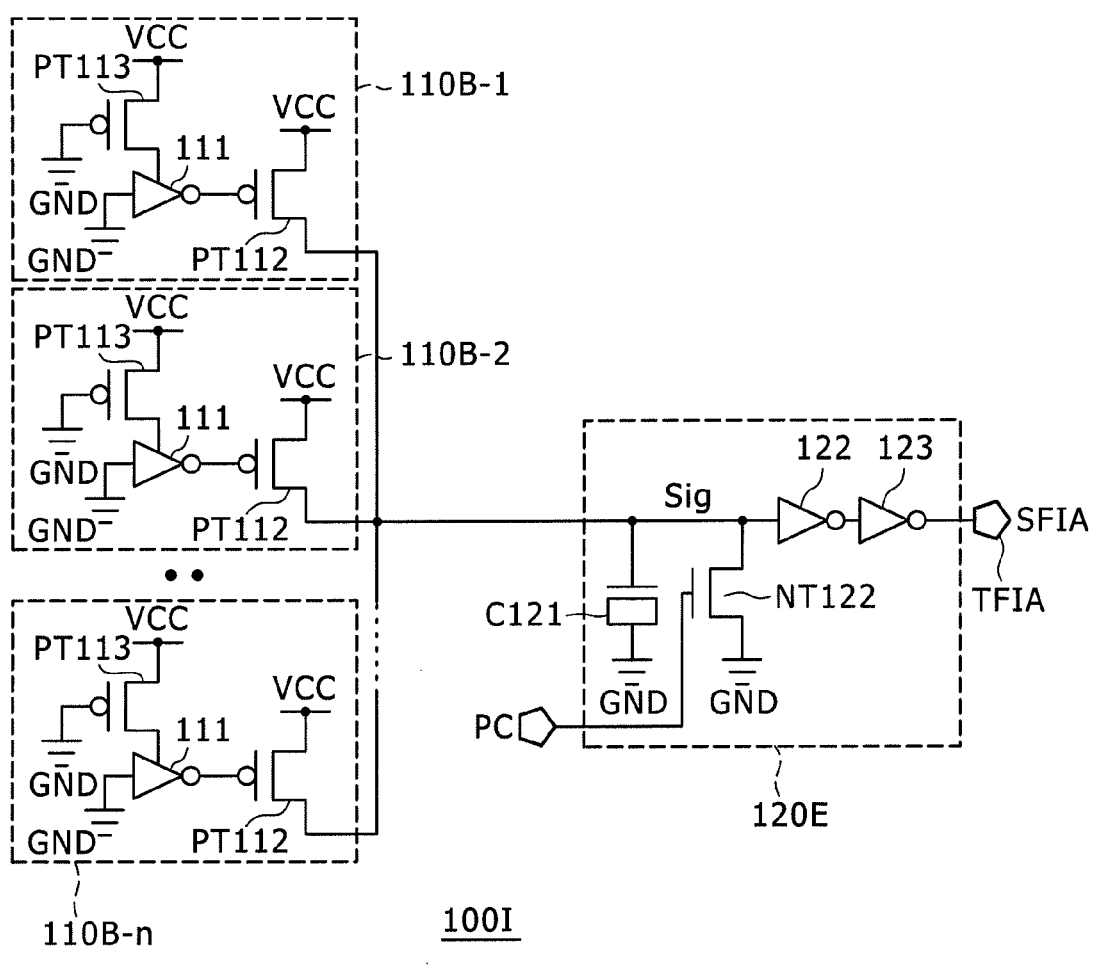
FIG. 27 is a circuit diagram showing a configuration of an FIA area detecting circuit adopting the FIA detecting circuit shown in FIG. 26.

FIG. 27 is a circuit diagram showing a configuration of an FIA area detecting circuit adopting the FIA detecting circuit shown in FIG. 26.

In the FIA area detecting circuit 100I, the sensitivity is further enhanced as compared with the case of the configuration of the FIA detecting circuit 100H shown in FIG. 26.

As described above, the same concept can be applied to the configuration as well that the logic circuit which outputs the signal at the High level as the output signal is used as the sensor, and thus any of the configurations shown in FIGS. 26 and 27, respectively, is adopted.

2. Second Embodiment

Next, a description will be given with respect to an FIA detecting circuit, in which a photodiode is applied to a sensor circuit, according to a second embodiment of the present invention.

Figures 28A, 28B:
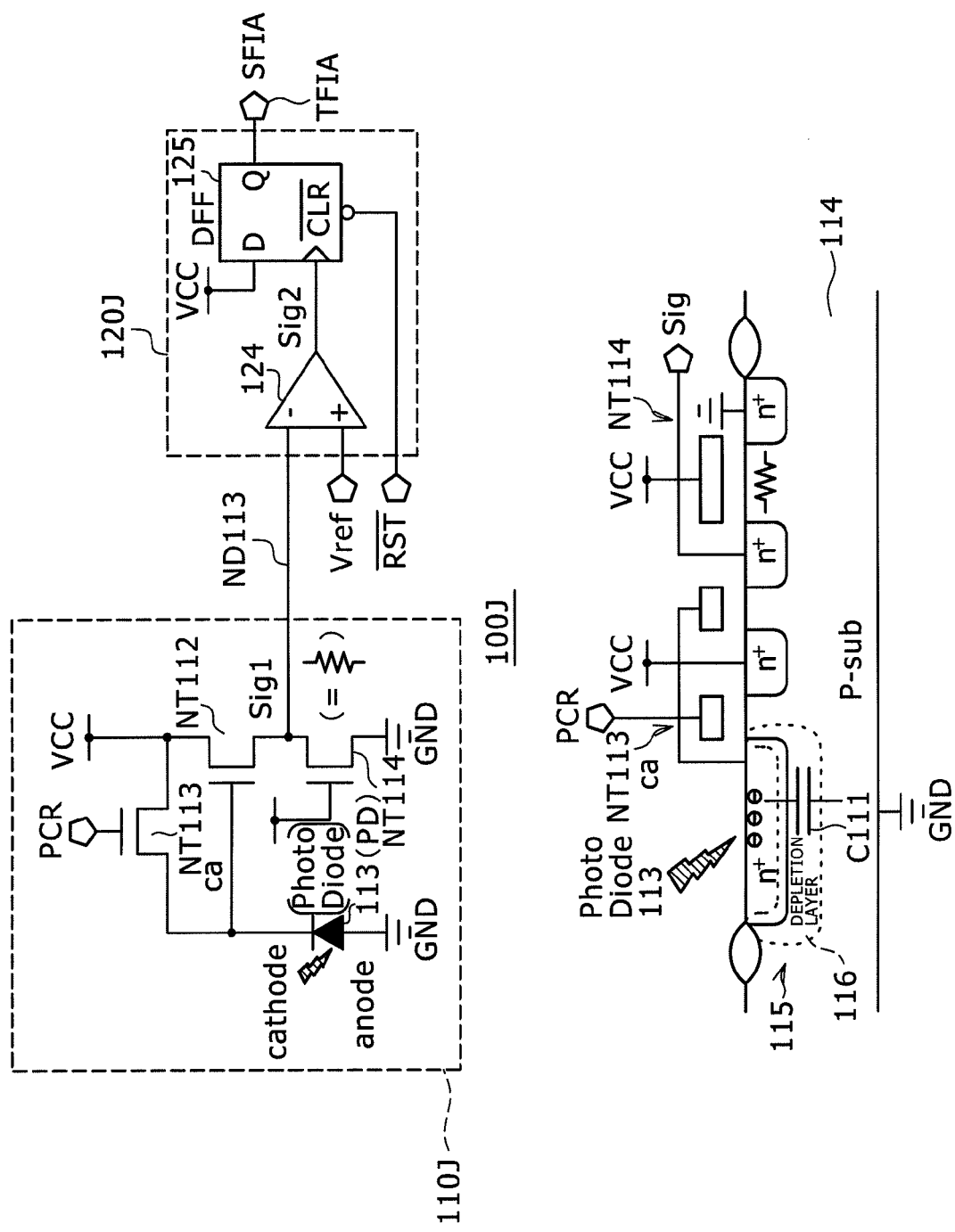
FIGS. 28A and 28B are respectively a circuit diagram showing a configuration of an FIA detecting circuit according to a second embodiment of the present invention, and a schematic cross sectional view showing a structure of a sensor circuit in the FIA detecting circuit shown in FIG. 28A.

FIGS. 28A and 28B are respectively a circuit diagram showing a configuration of the FIA detecting circuit according to the second embodiment of the present invention, and a schematic cross sectional view showing a structure of a sensor circuit in the FIA detecting circuit shown in FIG. 28A. Here, FIG. 28A shows the circuit configuration of the FIA detecting circuit, and FIG. 28B shows the schematic process cross sectional view of the sensor circuit.

The FIA detecting circuit 100J according to the second embodiment of the present invention adopts such a configuration that a photodiode (PD) 113 is used in a sensor circuit 110J, and the electric charges accumulated in the photodiode 113 are detected by using the NMOS transistors NT112, NT113 and NT114.

The photodiode 113 is composed of a PN junction having a cathode of an $n^+$-type diffusion layer, and an anode of either a P-type substrate or a p-type well region 114. In this case, the anode is grounded, and the cathode, ca, of the photodiode 113 is connected to a power source line through the NMOS transistor NT113 which is controlled in accordance with a control signal PCR.

A cathode signal is inputted to a gate of the NMOS transistor NT112 having a drain connected to the power source line, and a source connected to a node ND113 through which an output signal Sig1 is outputted.

Also, a region called a depletion layer 116 in which no electric charge exists is generated in a PN junction portion 115, and this region serves as a capacitor C111 to accumulate therein the electric charges.

The free electrons generated in accordance with the internal photoelectric effect caused by the radiation of the laser beam are also accumulated in this region to charge the charged electric charges, thereby changing a value of a current caused to flow through the NMOS transistor NT112 on the output side.

In addition, the output signal Sig1 is supplied to a drain of the NMOS transistor NT114 having a gate connected to the power source VCC, and a long channel length L, and used as a pull-down resistor. Also, the sensor circuit 110J is composed of the NMOS transistors NT112, NT113 and NT114, and the photodiode 113.

A detection circuit 120J includes a comparator circuit 124 and a DFF circuit 125.

The output signal Sig1 from the sensor circuit 110J is compared with a reference voltage Vref in the comparator circuit 124, and a comparison result Sig2 is inputted to a clock of the DFF circuit 125.

In the phase of the initialization of the CPU 210, a control signal /RST is changed from the High level to the Low level, thereby initializing the DFF circuit 125. Also, the output signal SFIA is set at the Low level.

Also, when the output signal Sig2 from the comparator circuit 124 is changed from the Low level to the High level, the output signal SFIA from the DFF circuit 125 is also changed from the Low level to the High level, thereby informing the CPU 210 of the FIA attack by the radiation of the laser beam.

Figure 29:
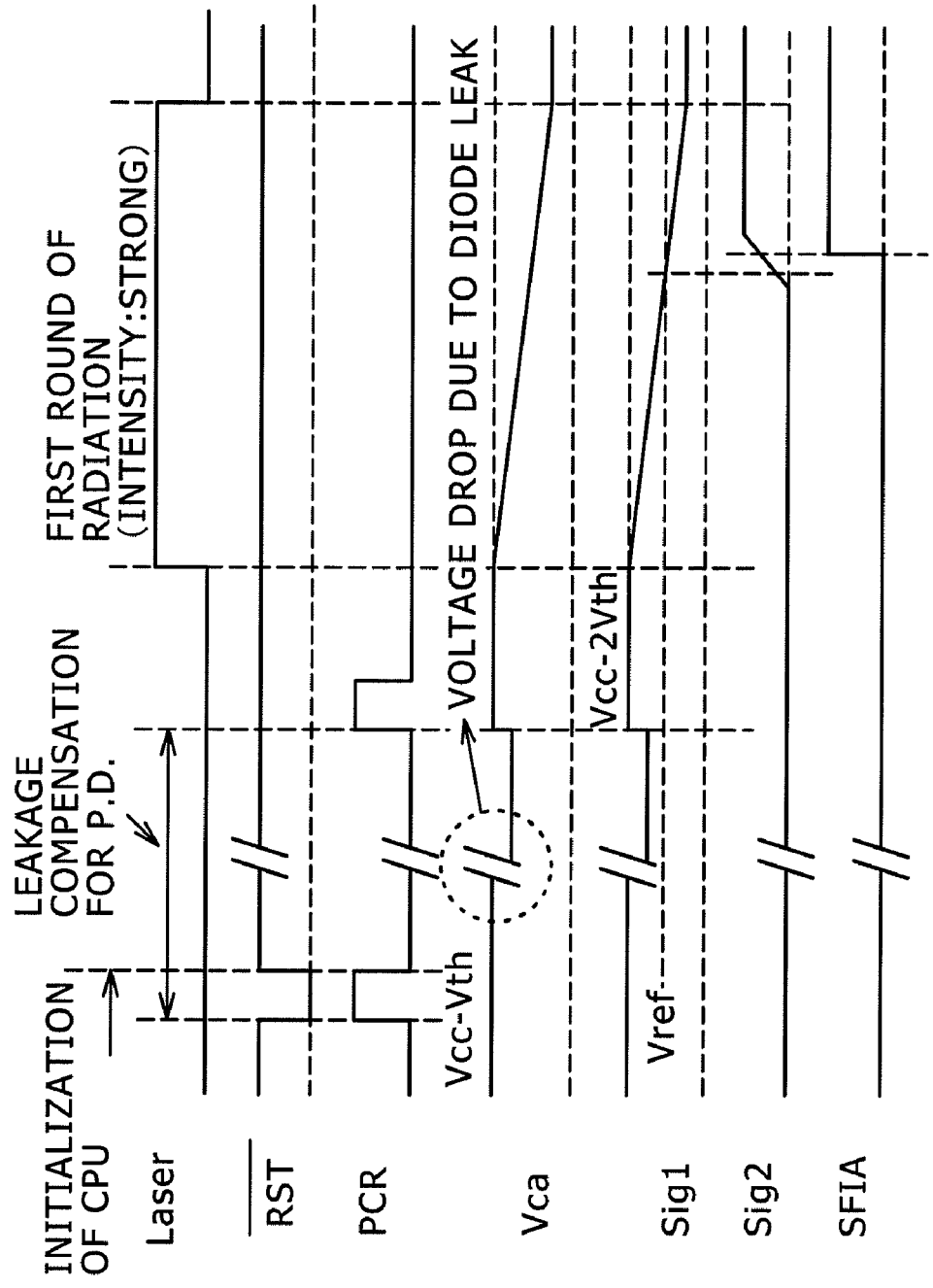
FIG. 29 is a timing chart showing an operation timing, in a phase of a radiation of a strong laser beam, in the FIA detecting circuit shown in FIG. 28A.

FIG. 29 is a timing chart showing an operation timing, in the phase of the radiation of the strong laser beam, in the FIA detecting circuit shown in FIG. 28A.

Figure 30:
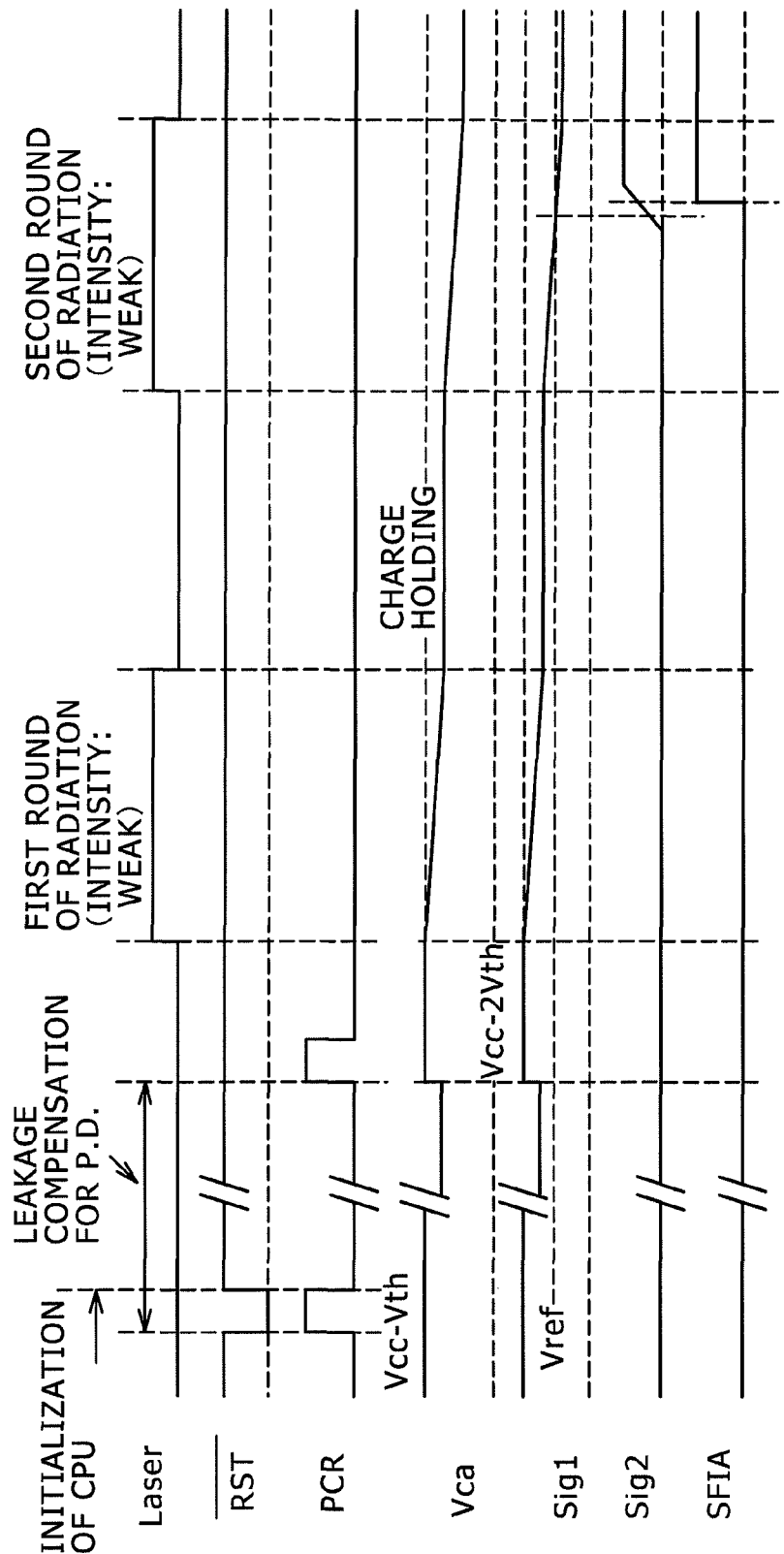
FIG. 30 is a timing chart showing an operation timing, in a phase of multiple radiations of a weak laser beam, in the FIA detecting circuit shown in FIG. 28A.

FIG. 30 is a timing chart showing an operation timing, in the phase of the multiple radiations of the weak laser beam, of the FIA detecting circuit shown in FIG. 28A.

In the phase of the initialization of the CPU 210, the control signal /RST is changed from the High level to the Low level, and the output signal SFIA from the DFF circuit 125 of the detection circuit 120J is set at the Low level. In parallel with this operation, the control signal PCR is held at the High level for a given period of time, thereby precharging the cathode voltage, Vca, of the photodiode 113 at (VCC−Vthp).

Also, the output voltage Sig1 becomes (VCC−2Vth) by the cathode voltage, and is then inputted to an inverting input terminal of the comparator circuit 124.

In setting a value of the reference voltage Vref in a non-inverting input terminal of the comparator circuit 124, the radiation of the laser beam is evaluated in advance. In this case, such a voltage as to invert the output signal SFIA from the DFF circuit 125 at the same time that the malfunction is caused in the IC circuit 200 is obtained in the sensor circuit 110J as well.

The reference voltage Vref is set at a higher voltage than that voltage in advance. As a result, the predetermined processing can be executed before any of the circuits in the IC circuit 200 malfunctions.

When the laser beam having the energy equal to or larger than the band gap of silicon is radiated to the $n^+$-type diffusion layer of the photodiode 113, the electrons as the majority carriers within the $n^+$-type diffusion layer get the energy of the laser beam, being free from the chains of the atomic nuclei of the impurities in accordance with the internal photoelectric effect to become the free electrons, thereby causing the signal line voltage to drop.

On the other hand, when no laser beam is radiated to the $n^+$-type diffusion layer, the cathode voltage, Vca, drops due to a reverse leakage current in the photodiode 113. However, by carrying out the periodical precharge, the output signal Sig1 from the sensor circuit 110J does not fall below the reference voltage Vref, and thus the output signal SFIA from the DFF circuit 125 is held at the Low level.

When the laser beam is radiated to the photodiode 113, the free electrons are generated in accordance with the internal photoelectric effect, thereby causing the cathode voltage (at the node), Vca, to drop. The cathode voltage Vca thus dropped is inputted to the gate of the NMOS transistor NT112 to turn OFF the NMOS transistor NT112, and as a result, the operating current decreases, and the voltage of the output signal Sig1 drops by the NMOS transistor NT114 as the pull-down resistor.

Also, when the voltage of the output signal Sig1 falls below the reference voltage Vref, the output signal Sig2 from the comparator 124 is changed from the Low level to the High level, and thus the output signal SFIA from the DFF circuit 125 is inverted from the Low level to the High level.

Next, a description will be given with respect to the case where the intensity of the laser beam is weak.

With the FIA attack, the sensor circuit 110J is scanned every distance of about the beam diameter of the laser beam, and the portion in which the error is generated is scanned the smaller distance by the smaller distance, thereby collecting the error data useful for the analysis.

The weak laser beam is radiated to an area which is out of the beam diameter, but which the laser beam reaches by the diffraction, the internal reflection and the like multiple times.

In this case, although the radiation intensity is weak in one shot of the laser beam, the cathode voltage Vca drops due to the presence of the free electrons generated in accordance with the internal photoelectric effect, and the voltage level of the output signal Sig1 also drops so as to follow the drop of the cathode voltage Vca.

However, when the voltage level of the output voltage Sig1 is higher than the comparison reference voltage Vref, the output signal Sig2 from the comparator 124 is held at the Low level, and thus the output signal SFIA from the DFF circuit 125 is also held at the Low level.

Also, after completion of the first round of the radiation of the laser beam, the free electrons generated in the cathode of the photodiode 113 are held in the capacitor C111 as they are.

Therefore, the cathode voltage Vca, and the voltage of the output signal Sig1 are held at those, respectively, right after completion of the first round of the radiation of the laser beam.

Also, when the second round of the radiation of the weak laser beam is subsequently carried out, the free electrons are generated again in accordance with the internal photoelectric effect, and thus the cathode voltage Vca becomes the voltage originating from the sum of the electric charges generated by the first round of the radiation, and the electric charges generated by the second round of the radiation. The voltage level of the output signal Sig1 also drops from the voltage at the time of completion of the first round of the radiation of the laser beam in accordance with an amount of free electrons generated in the cathode of the photodiode 113.

Also, when the voltage level of the output signal Sig1 falls below the reference voltage Vref by the second round of the radiation of the laser beam, the output signal Sig1 is changed from the Low level to the High level, and thus the output signal SFIA from the DFF circuit 125 is also changed from the Low level to the High level.

The intensity of the laser beam radiated to such an area that the output signal SFIA from the DFF circuit 125 is inverted from the Low level to the High level multiple times of the radiation is weak. Thus, even when the laser beam having the same intensity is radiated to the original logic circuit or register circuit, none of the inversion of the logic and the inversion of the value stored in the register is caused.

Figures 31A, 31B:
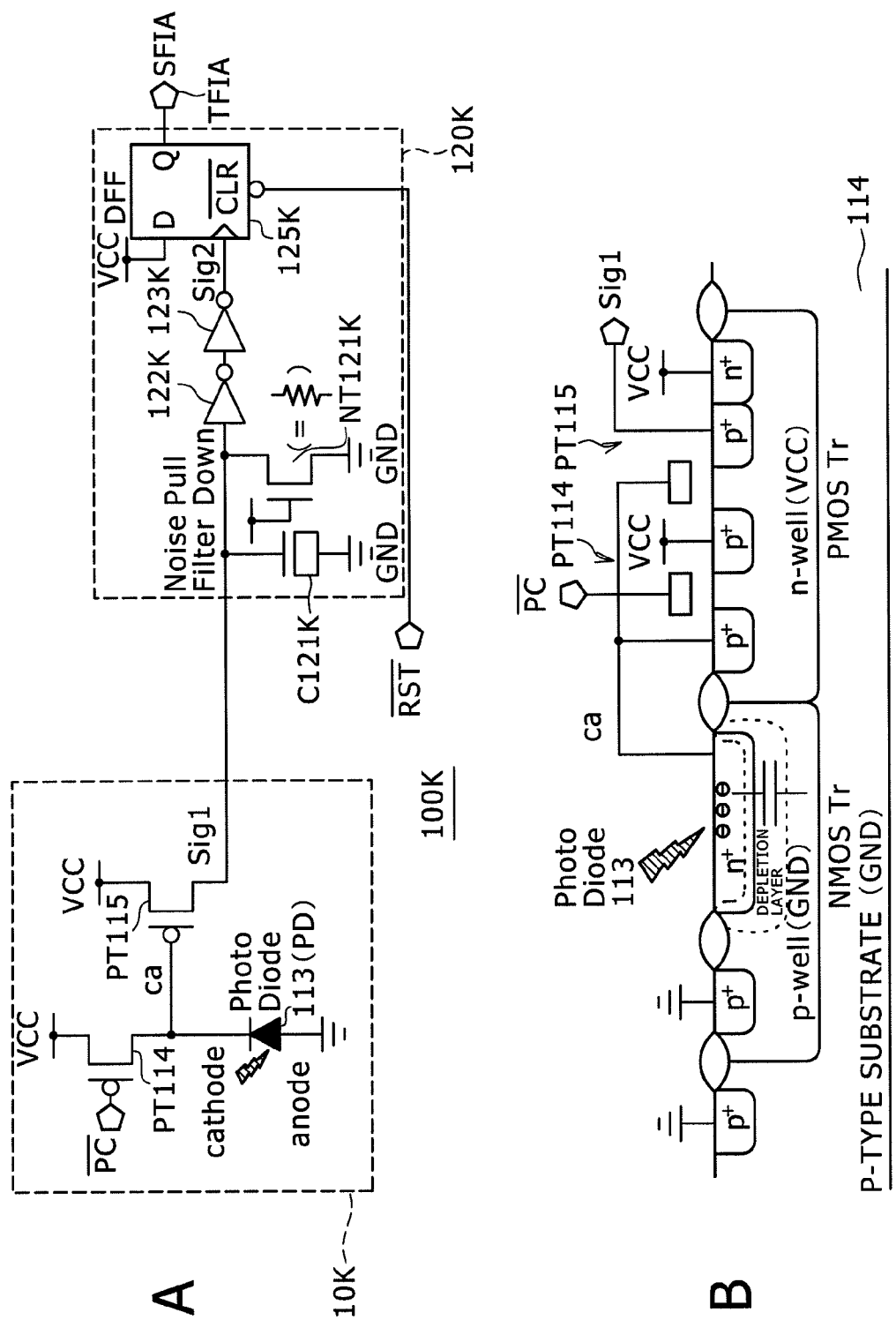
FIGS. 31A and 31B are respectively a circuit diagram showing a configuration of a modification of the FIA detecting circuit according to the second embodiment of the present invention, and a schematic cross sectional view showing a structure of a sensor circuit in the modification of the FIA detecting circuit shown in FIG. 31A.

FIGS. 31A and 31B are respectively a circuit diagram showing a configuration of the FIA detecting circuit according to the second embodiment of the present invention, and a schematic cross sectional view showing a structure of a sensor circuit in the change of the FIA detecting circuit shown in FIG. 31A.

Figure 32:
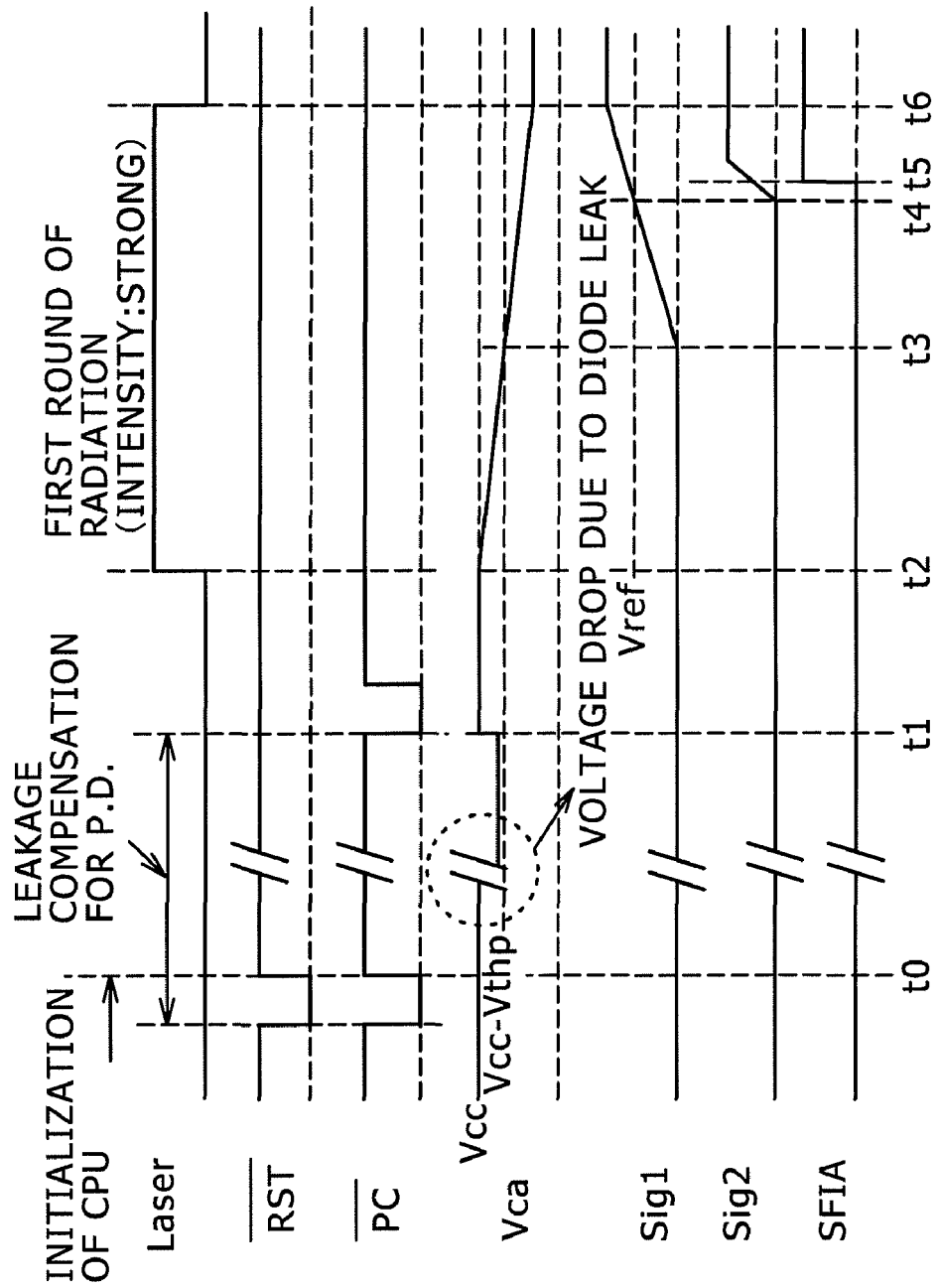
FIG. 32 is a timing chart showing an operation timing, in a phase of a radiation of a strong laser beam, in the FIA detecting circuit shown in FIG. 31A.

FIG. 32 is a timing chart showing an operation timing, in the phase of the radiation of the strong laser beam, in the FIA detecting circuit shown in FIG. 31A.

Figure 33:
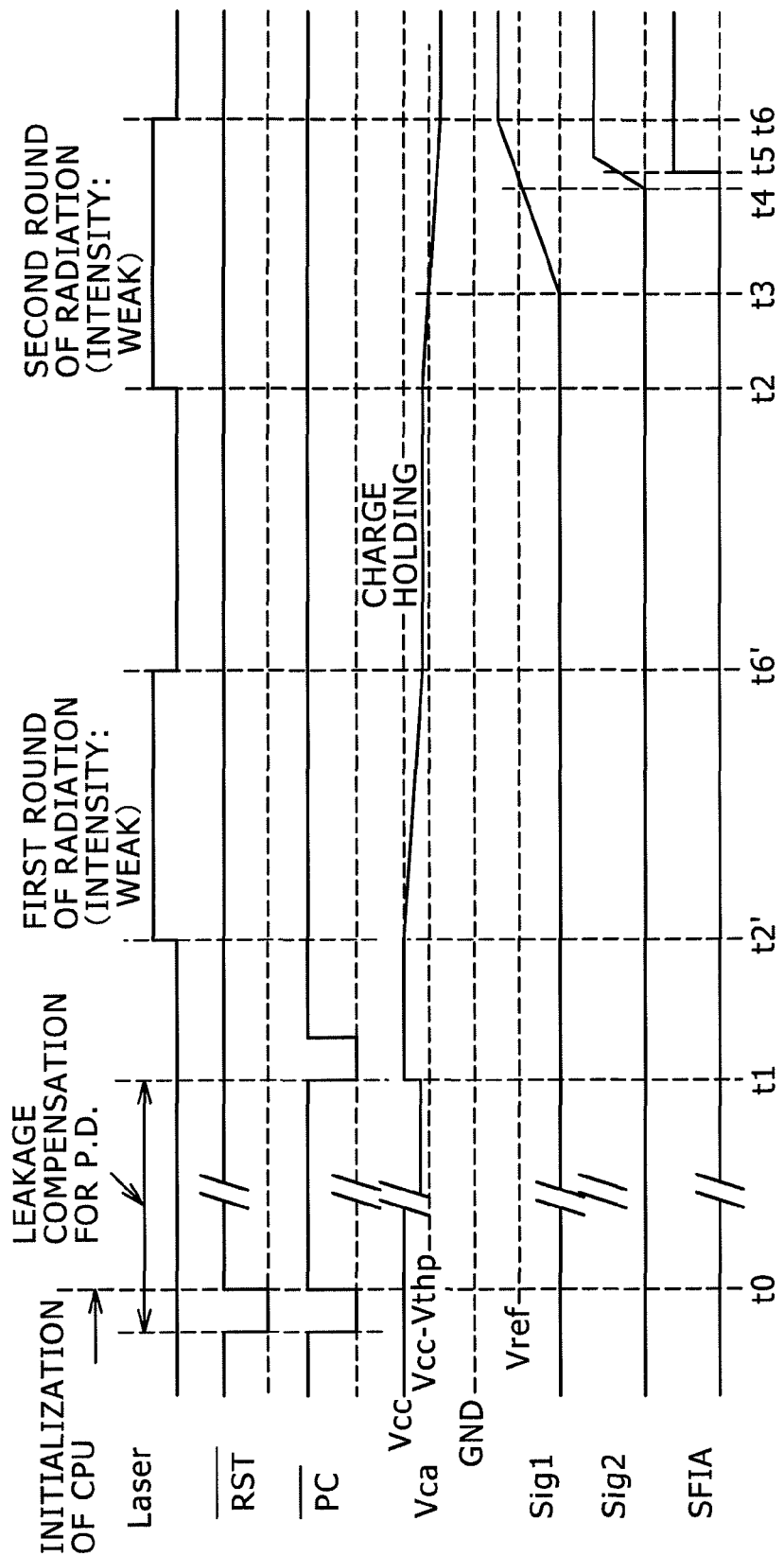
FIG. 33 is a timing chart showing an operation timing, in a phase of multiple radiations of a weak laser beam, in the FIA detecting circuit shown in FIG. 31A.

FIG. 33 is a timing chart showing an operation timing, in the phase of the multiple radiations of the weak laser beam, of the FIA detecting circuit shown in FIG. 31A.

In the FIA detecting circuit 100K, a photodiode (PD) 113 is used as a sensor circuit 110K, and PMOS transistors PT114 and PT115 are used as transistors.

In the case of this configuration, a cathode of an $n^+$-type diffusion layer of the photodiode 113 is connected to a drain of the PMOS transistor PT114 for precharge. Here, a source of the PMOS transistor PT114 for precharge is connected to a power source terminal, and the PMOS transistor PT114 for precharge is controlled in accordance with a control signal /PC inputted to a gate thereof. In addition, the cathode of the photodiode 113 is connected to a gate of the PMOS transistor PT115 on the output side of the sensor circuit 110K. Also, a source of the PMOS transistor PT115 is connected to the power source terminal, and a drain of the PMOS transistor PT115 is open as an output terminal.

Also, in the detection circuit 120K, a capacitor C121K as a noise filter, and an NMOS transistor NT121K having a long channel length L and used as a pull-down resistor are each connected to a signal line through which the signal Sig1 is supplied. The signal Sig1 is supplied to a clock input of a DFF circuit 125K after passing through two stages of inverters 122K and 123K.

With respect to the circuit operation, firstly, in the phase of the initialization of the CPU 210, the control signal /RST is changed from the High level to the Low level to initialize the register. At the same time, the control signal /PC is changed from the High level to the Low level to charge the cathode of the photodiode 113 at the power source voltage VCC.

At this time, the open-drain type PMOS transistor PT115 on the output side is held on the OFF state, and thus the output signal Sig1 is held at the ground level by the NMOS transistor NT121K as the pull-down resistor of the detection circuit 120K. At this time, the clock input Sig2 to the DFF circuit 125K is also held at the ground level.

In the case where in this state, the strong laser beam is radiated to the cathode of the photodiode 113 (refer to FIG. 32), when the cathode voltage of the photodiode 113 drops by the presence of the free electrons generated in accordance with the internal photoelectric effect so as to become equal to or lower than (VCC−Vthp), the open-drain type PMOS transistor PT115 is turned ON, so that the voltage of the output signal Sig1 rises.

Also, when the voltage of the output signal Sig1 exceeds a threshold value of the inverter 122K in the first stage, the clock input to the DFF circuit 125K rises to the High level, and thus the output signal SFIA from the DFF circuit 125K is outputted as the signal at the High level.

When the intensity of the laser beam is weak (refer to FIG. 33), the free electrons are generated in the cathode of the photodiode 113 in accordance with the internal photoelectric effect to reduce the cathode voltage. However, when, for example, no cathode voltage is reduced to become equal to or lower than (VCC−Vthp), the PMOS transistor PT115 on the output side is held in the OFF state. As a result, the output signal Sig1 is held at the ground level by the pull-down type NMOS transistor NT121K of the detection circuit 120K.

After completion of the first round of the radiation of the laser beam, the free electrons accumulated in the cathode of the photodiode 113 are held as they are. In the phase of the second round of the radiation of the weak laser beam, the free electrons newly generated are added to the electric charges accumulated in the cathode of the photodiode 113, and thus the cathode voltage restarts to drop along with the addition of the free electrons newly generated.

Also, when the cathode voltage falls below (VCC−Vthp), the PMOS transistor PT115 on the output side is turned ON, so that the voltage of the output signal Sig1 gradually rises.

Also, in a stage in which the voltage of the output signal Sig1 exceeds a threshold value of the inverter 122K in the first stage, the output from the inverter 122K is inverted, the voltage of the clock input signal Sig2 to the DFF circuit 125K rises, and the output signal SFIA from the DFF circuit 125K is outputted as the signal at the High level.

Even with the radiation of the weak laser beam, the free electrons generated by the radiation of the weak laser beam are accumulated in the cathode of the photodiode 113 in such a manner. When the cathode voltage of the photodiode 113 falls below (VCC−Vthp) by the multiple radiations of the laser beam, the PMOS transistor PT115 on the output side is turned ON. In a stage in which the free electrons are further accumulated in the cathode of the photodiode 113, and thus the voltage of the output signal Sig1 exceeds the threshold value of the inverter 122K in the first stage, the output signal SFIA from the DFF circuit 125K is outputted as the signal at the High level.

Figure 34:
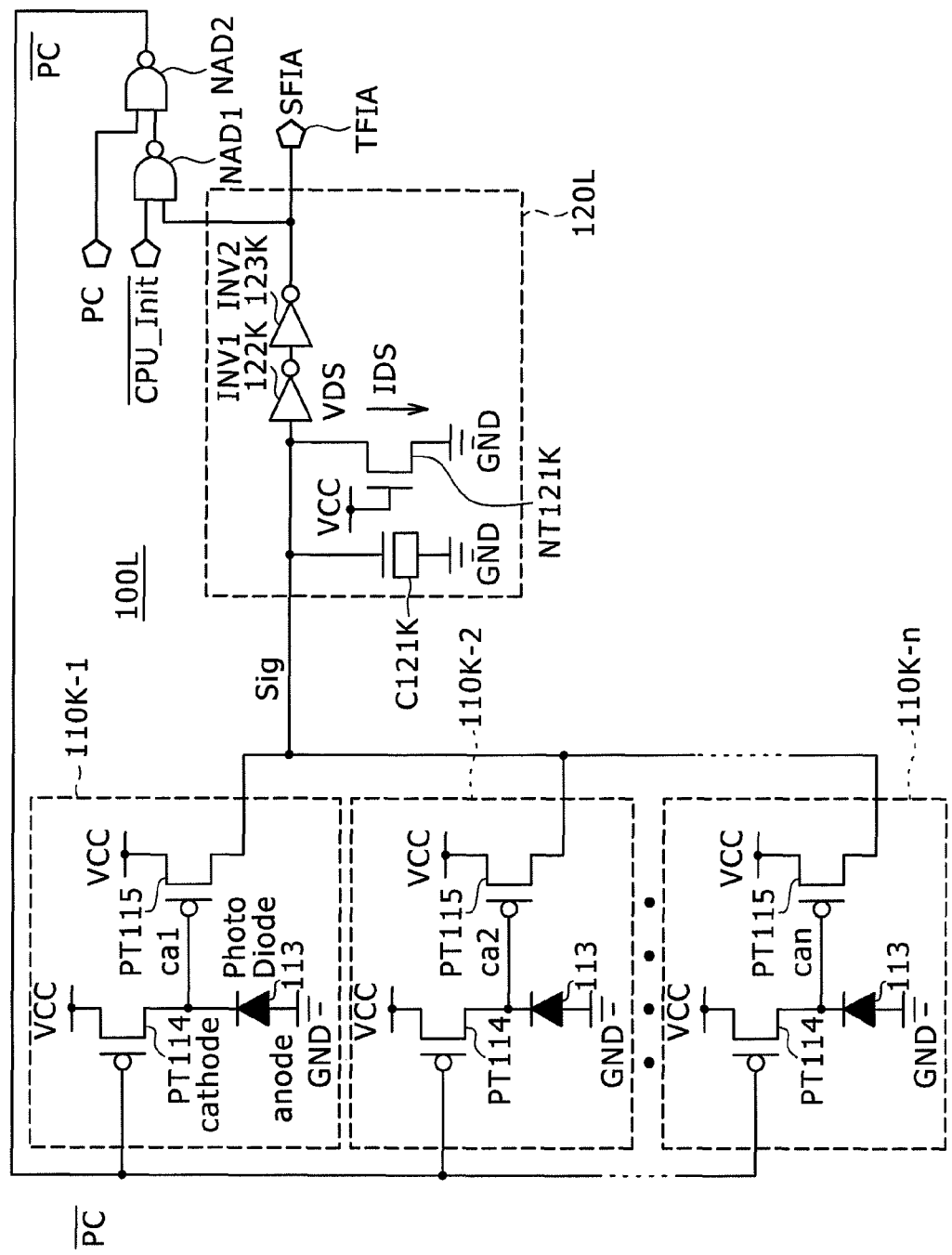
FIG. 34 is a circuit diagram showing a configuration of an FIA area detecting circuit adopting the FIA detecting circuit shown in FIG. 31A.

FIG. 34 is a circuit diagram showing a configuration of an FIA area detecting circuit adopting the FIA detecting circuit shown in FIG. 31A.

Figure 35:
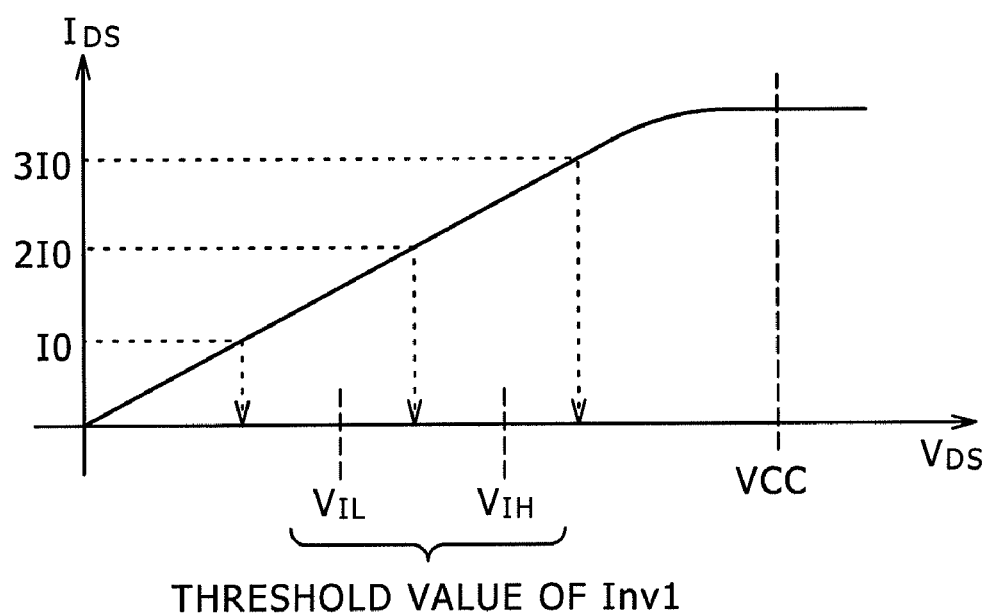
FIG. 35 is a graphical representation showing a relationship between static characteristics of a pull-down resistor, and threshold values of an inverter.

FIG. 35 is a graphical representation showing a relationship between static characteristics of a pull-down resistor, and threshold values of an inverter.

In a sensor circuit 110K using PMOS transistors, when the cathode voltage of the photodiode 113 becomes equal to or higher than (VCC−Vthp), the PMOS transistor PT115 on the output side is turned OFF. On the other hand, when the cathode voltage of the photodiode 113 becomes lower than (VCC−Vthp), the PMOS transistor PT115 on the output side is turned ON.

Since the configuration that the current corresponding to the cathode voltage is caused to flow through the sensor circuit 110K is adopted, it is possible to adopt such a configuration that as shown in FIG. 34, outputs of a plurality of sensor circuits 110K-1 to 110K-n are connected to one another, and a resulting output signal is inputted to one detection circuit 120L.

In addition, in the detection circuit 120L, no DFF circuit is disposed in the final stage.

In the case where either the inverter or the register is used in the sensor as with the first embodiment, when the radiation of the laser beam is stopped, the output from the inverter returns back to the original state, and the output from the register returns back to the original state approximately with a half probability. For this reason, the first embodiment adopts the configuration that the detection result is held in the DFF circuit disposed in the final stage.

However, in the case where the photodiode 113 is used as with the second embodiment, the free electrons generated by the internal photoelectric effect are held in the capacitor C111 composed of the photodiode 113. For this reason, there is adopted such a configuration that even after the radiation of the laser beam is stopped, the signal corresponding to the detection result is outputted.

Therefore, in this case, a description will now be given by using the configuration that no DFF circuit is disposed in the final stage. Also, for the precharge control for the photodiode for the leakage compensation, a logic between a signal /CPU_Init and an output signal SFIA from a detection circuit 120L is obtained in a NAND1, and a logic between a signal PC and an output signal from the NAND1 is obtained in a NAND2.

When the radiation of the laser beam is detected and thus the output signal SFIA becomes the High level, the control that no precharge is carried out, and the electric charges in the cathode of the photodiode are held is added.

When with this configuration, the weak laser beam is radiated to each of a plurality of sensor circuits 110K-1 to 110K-n, the free electrons are generated in each of the cathodes of the photodiodes 113 in a plurality of sensor circuits 110K-1 to 110K-n to be accumulated in each of capacitors C111, so that each of the cathode voltages of the photodiodes 113 drops.

Also, when the cathode voltage becomes lower than (VCC−Vthp), the PMOS transistor PT115 on the output side is turned ON to cause a current to flow through the corresponding one of a plurality of sensor circuits 110K-1 to 110K-n. As a result, the drain voltage of the NMOS transistor NT121K in a detection circuit 120L rises by the total sum of currents.

Static characteristics of the NMOS transistor NT121K serving as the pull-down resistor, for example, is supposed to be shown in FIG. 35.

Also, for the sake of simplicity, when the laser beams having approximately the same intensity are radiated to the three sensor circuits 110K-1 to 110K-3, respectively, the output current caused to flow through one sensor circuit with this radiation intensity is set to be "$I_0$."

At this time, the current "$3I_0$" is caused to flow from the three sensor circuits 110K-1 to 110K-3, and the output signal Sig has a voltage value proportional to the output current $3I_0$ from the three sensor circuits 110K-1 to 110K-3.

When the voltage of the output signal Sig exceeds the threshold value VIH on the High level side of the inverter 122K in the detection circuit 120L, the voltage of the output signal Sig is judged to be the High level. As a result, the output signal SFIA from the detection circuit 120L is outputted as the signal at the High level representing the radiation of the laser beam.

In the case where the laser beams are radiated to a plurality of sensor circuits 110K-1 to 110K-n, respectively, at the same time, and the sum of the outputs from a plurality of sensor circuits 110K-1 to 110K-n is inputted to one detection circuit, even when the radiation intensity of the laser beam which each of a plurality of sensor circuits 110K-1 to 110K-n receives is weak, the radiation of the laser beam can be recognized.

Figure 36:
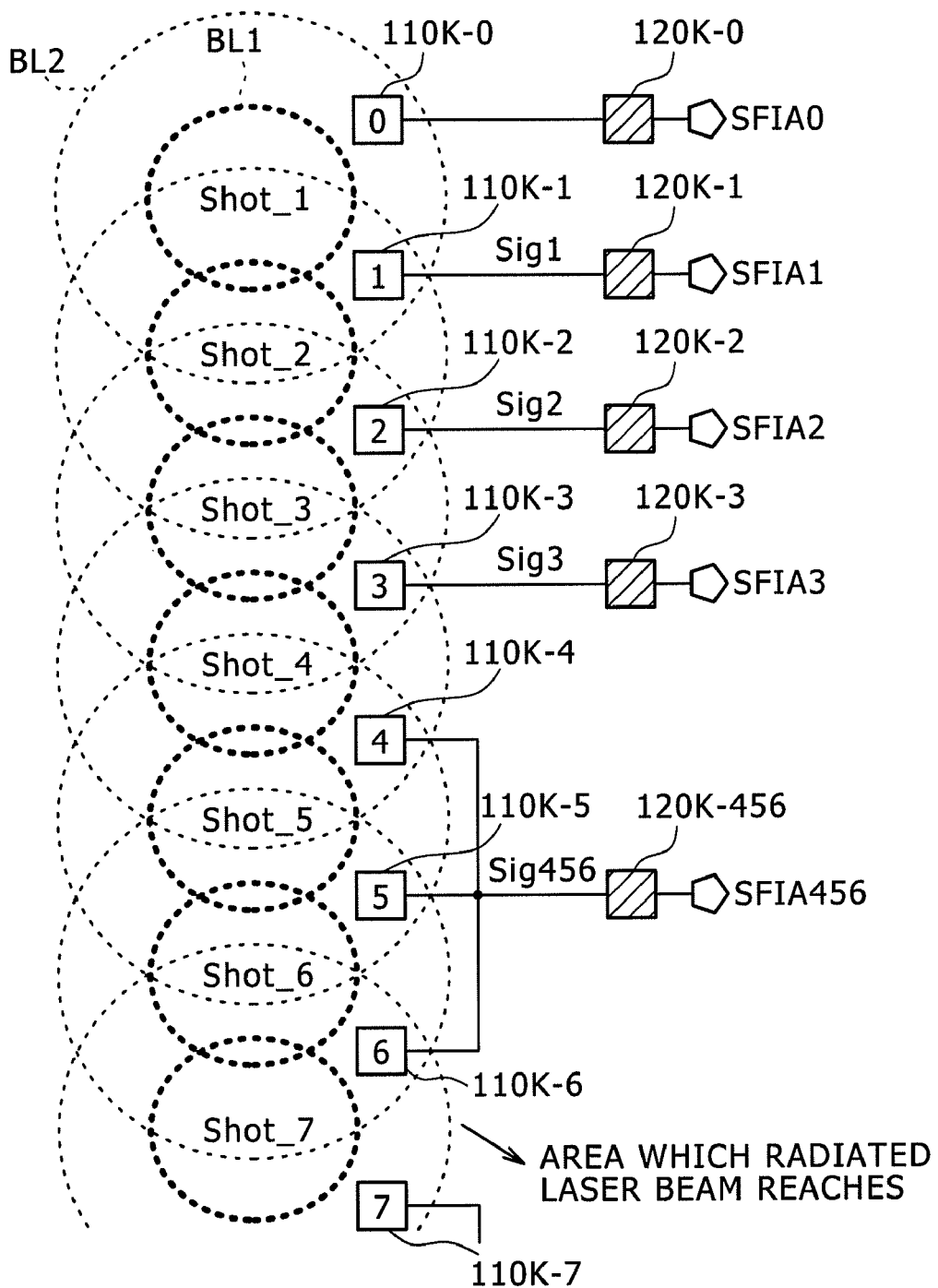
FIG. 36 is a schematic diagram showing the case where a configuration in which in the FIA detecting circuit according to the second embodiment of the present invention, a plurality of sensor circuits are disposed at given intervals, and detection circuits are connected to the sensor circuits, respectively, is combined with a configuration in which one detection circuit is connected to a plurality of sensor circuits.

FIG. 36 is a diagram schematically showing the case where a configuration in which in the FIA detecting circuit according to the second embodiment of the present invention, a plurality of sensor circuits are disposed at given intervals, and detection circuits are connected to the sensor circuits, respectively, is combined with a configuration in which one detection circuit is connected to a plurality of sensor circuits.

Figure 37:
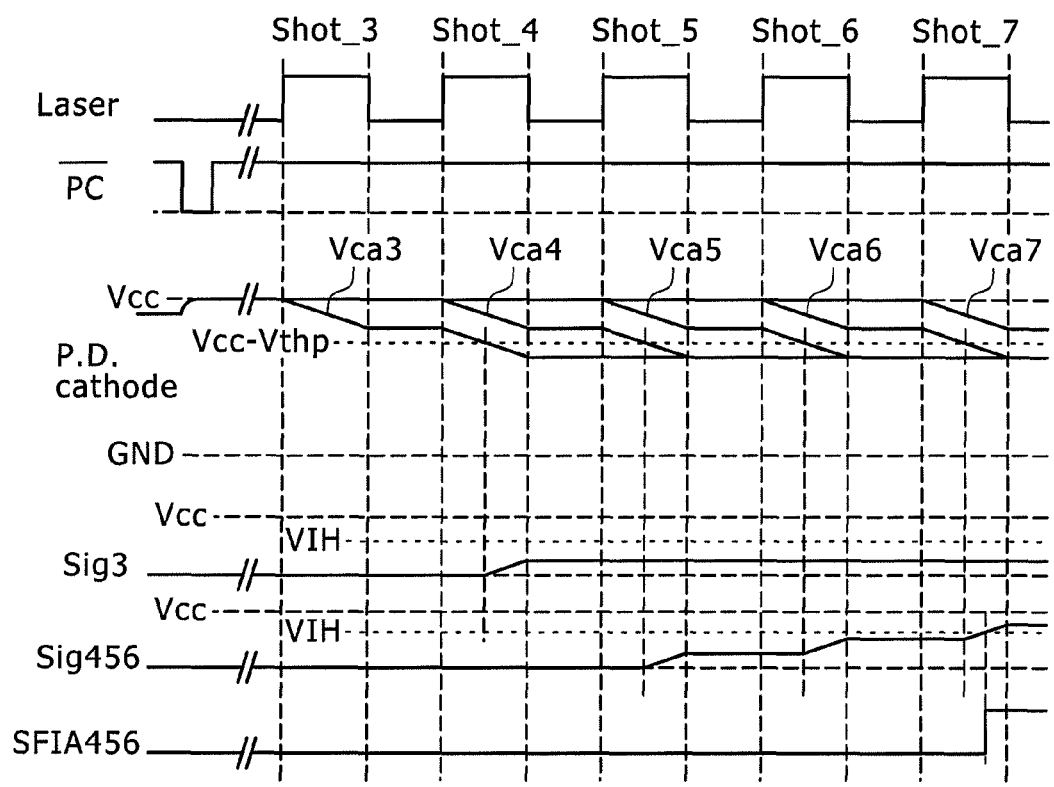
FIG. 37 is a timing chart showing an operation timing in the case of the configuration shown in FIG. 36.

FIG. 37 is a timing chart showing an operation timing in the case of the configuration shown in FIG. 36.

Sensor circuits 110K-0 to 110K-7, as shown in FIG. 36, are disposed at given intervals.

Here, the case where four detection circuits 120K-0 to 120K-3 are disposed so as to correspond to four sensor circuits 110K-0 to 110K-3, respectively, and outputs of the next three sensor circuits 110K-4 to 110K-6 are connected to one another to be connected to one detection circuit 120K-456 will now be described as an example.

This example is given for the purpose of comparing the case where one output from the sensor circuit 110K is inputted to one detection circuit 120K, and the case where a plurality of outputs from a plurality of sensor circuits 110K are inputted to one detection circuit 120K with each other.

Also, the laser beam is scanned along the arrangement of the sensor circuits 110K-0 to 110K-7 from an upper side to a lower side of the drawing. A heavy broken line BL1 represents a beam diameter of the laser beam, and a light broken line BL2 represents an area which the laser beam reaches by the diffraction, the reflection and the like. That is to say, the sensor circuit 110K is out of the beam diameter of the radiated laser beam, and thus the intensity of the laser beam radiated to the sensor circuit 110K is weak. An operation timing at this time is shown in FIG. 37.

Now, paying attention to the sensor circuit 110K-3, the sensor circuit 110K-3 receives the radiation of the weak laser beam in each of Shot_3 and Shot_4.

In the cathode of the photodiode 113, the voltage drop is caused by the radiation of Shot_3. However, the cathode voltage of the photodiode 113 does not become equal to or lower than (VCC−Vthp), and thus the PMOS transistor PT115 on the output side is held in the OFF state.

After completion of the radiation of Shot_3, the cathode voltage of the photodiode 113 is held as it is, and in the subsequent radiation of Shot_4, the cathode voltage of the photodiode 113 starts to drop from the voltage at the time of end of the radiation of Shot_3.

Also, when the cathode voltage of the photodiode 113 falls below (VCC−Vthp), the PMOS transistor PT115 on the output side is turned ON, and the voltage level of the signal Sig3 rises due to the output current.

However, since the voltage level of the signal Sig3 does not exceed the threshold value of the inverter 122K in the stage of the radiation of Shot_4, the output signal SFIA456 is held at the Low level.

On the other hand, in the next three sensor circuits, the sensor circuits 110K_4, 110K_5 and 110K_6 receive the radiation of the weak laser beams in Shot_4 and Shot_5, Shot_5 and Shot_6, and Shot_6 and Shot_7, respectively.

Firstly, in Shot_4, the sensor circuit 110K_4 receives the radiation of the weak laser beam, and thus a cathode voltage Vca4 of the photodiode 113 drops. However, since the cathode voltage Vca4 of the photodiode 113 does not become equal to or lower than (VCC−Vthp), the PMOS transistor PT115 on the output side is held in the OFF state.

Next, in Shot_5, each of the sensor circuits 110K-4 and 110K-5 receives the radiation of the weak laser beam.

In the sensor circuit 110K-4, the cathode voltage Vca4 of the photodiode 113 drops to become equal to or lower than (VCC−Vthp), and thus the PMOS transistor PT115 on the output side is turned ON. As a result, the current $I_0$ is caused to flow through the sensor circuit 110K-4, and thus the voltage level of the output signal Sig456 rises.

However, since the voltage level of the output signal Sig456 does not exceed the threshold value of the inverter 122K, the output signal SFIA456 from the detection circuit 120K-456 is held at the Low level. In the sensor circuit 110K-5, a cathode voltage Vca5 of the photodiode 113 drops. However, since the cathode voltage Vca5 of the photodiode 113 does not drop to become equal to or lower than (VCC−Vthp), the PMOS transistor PT115 on the output side is held in the OFF state.

Also, in Shot_6, each of the sensor circuits 110K-5 and 115K-6 receives the radiation of the weak laser beam. At this time, although the sensor circuit 110K-4 does not receive the radiation of the weak laser beam, due to the radiations of the weak laser beam until now, the current $I_0$ is caused to flow from the PMOS transistor PT115 on the output side.

Also, in the sensor circuit 110K-5, a cathode voltage Vca5 of the photodiode 113 drops to become equal to or lower than (VCC−Vthp), and thus the PMOS transistor PT115 on the output side is turned ON to cause the current $I_0$ to flow from the PMOS transistor PT115 on the output side.

Also, the current $2I_0$ as the sum of the current of the sensor circuit 110K-4 and the current of the sensor circuit 110K-5 is caused to flow. However, since the voltage level of the output signal Sig456 does not exceed the threshold value of the inverter 122K, the output signal SFIA456 from the detection circuit 120K-456 is held at the Low level.

At the same time, in the sensor circuit 110K-6, a cathode voltage Vca6 of the photodiode 113 drops. However, since the cathode voltage Vca6 of the photodiode 113 does not drop below (VCC−Vthp), the PMOS transistor PT115 on the output side is held in the OFF state.

In Shot_7, each of the sensor circuits 110K-6 and 110K-7 receives the radiation of the weak laser beam. At this time, none of the sensor circuits 110K-4 and 110K-5 receives the radiation of the weak laser beam. However, due to the radiations of the weak laser beam until now, the current $I_0$ is caused to flow from each of the PMOS transistors PT115 on the output side of the sensor circuits 110K-4 and 110K-5.

Also, in the sensor circuit 110K-6, the cathode voltage Vca6 of the photodiode 113 drops to become equal to or lower than (VCC−Vthp), and thus the PMOS transistor PT115 on the output side is turned ON to cause the current $I_0$ to flow from the PMOS transistor PT115 on the output side. As a result, the current $3I_0$ as the sum of the current of the sensor circuit 110K-6, and the currents of the sensor circuits 110K-4 and 110K-5 is caused to flow.

Also, the voltage level of the output signal Sig456 exceeds the threshold value of the inverter 122K, and the output signal SFIA456 from the detection circuit 120K-456 is inverted from the Low level to the High level.

In the sensor circuit 110K-7, a cathode voltage Vca7 of the photodiode 113 drops. However, since the cathode voltage Vca7 of the photodiode 113 does not drop to become equal to or lower than (VCC−Vthp), the PMOS transistor PT115 on the output side is held in the OFF state.

As described above, even with the radiation of the laser beam having the weak intensity such that none of the logic circuit and the register circuit malfunctions, the radiation of the laser beam can be detected, thereby outputting the signal representing the abnormality.

That is to say, when the configuration that a plurality of sensor circuits are connected to one detection circuit is adopted, and a plurality of sensor circuits receives the radiation of the laser beam at the same time, or each of the individual sensor circuits receives the multiple radiations of the laser beams, the radiation of the laser beam can be detected, thereby outputting the signal representing the abnormality.

Next, a description will now be given with respect to a method of disabling an IC for use hereinafter when an FIA is detected.

Normally, the IC is encapsulated with the mold, and thus the laser beam does not impinge on any of semiconductor elements of the IC in the normal use.

The FIA attack becomes possible when as shown in FIG. 5, the surfaces of the semiconductor elements of the IC are exposed by removing the mold. Since this is clearly the improper use for the attack, there is no problem even if the IC is disabled for use hereinafter when the malfunction of the IC caused by the radiation of the laser beam is detected. Heretofore, for example, the register circuit was used as the sensor circuit, and the attack was detected in accordance with the change in the value stored in the register circuit.

On the other hand, in the case of a non-contact IC card equipped with an RF module and the like, an antenna is connected to an IC and the resulting card is enclosed with a card. Thus, the non-contact IC card is made close to a source of generation of magnetic lines, whereby the magnetism is detected by the antenna to be converted into an electric power, thereby operating the IC.

The electric power generated in the IC is inversely proportional to a square of a distance. Thus, the electric power continues to be supplied to the circuits in the IC while the conversion voltage is held equal to or higher than a predetermined voltage.

When the IC card is made close to the source of generation of magnetic lines, and the conversion voltage becomes the predetermined voltage value, the IC starts to operate. The electric power continues to be supplied to the circuits in the IC until the IC card is made away from the source of generation of the magnetic lines, and thus the conversion voltage becomes equal to or lower than the predetermined voltage.

When in a state such that the supplied voltage is slightly higher than the predetermined voltage, the contents held in the register circuit used as the sensor circuit for the laser beam are inverted by the noises or the like, since this state is the normal state, it is a problem that the IC is afterward disabled for use.

In the second embodiment, in the case shown in FIGS. 31A and 31B, or FIG. 34, the photodiode 113 is used as the capacitor C111, and the sensor circuit is composed of the photodiode 113, and the two transistors, i.e., the PMOS transistor PT114 for the precharge use and the PMOS transistor PT115 for the amplification use.

Also, since the information on the attack is stored in the cathode portion of the photodiode 113 forming the capacitor C111, this configuration is resistant to the noises.

When the detection circuit, for example, has the configuration shown in FIG. 34, the noises to the detection circuit 120L are blocked by the capacitor C121 for the noise filter use.

Other circuits are composed of the NMOS transistor NT121K as the pull-down resistor, the two inverters 122K and 123K, and the two NAND circuits NAD1 and NAD2. Thus, the detection circuit 120L also has the configuration which is resistant to the noises.

Therefore, there is really very little chance that the FIA detection signal SFIA is changed from the Low level to the High level by the noises. Therefore, when the detection output signal SFIA is changed from the Low level to the High level, there is no problem even when the IC concerned is afterward disabled for use.

The following configuration can be adopted for a method of disabling the IC hereinafter when the FIA is detected.

The flag bit for the FIA is stored in the non-volatile memory, and the flag bit is set at the value in the reset state in the phase of shipping of the products.

Also, there is adopted such a specification that the CPU 210 (refer to FIG. 10) reads out the FIA flag bit in the phase of the initialization at the time of the activation of the power source, and when the value of the FIA flag bit is set at the value in the reset state, the normal initialization operation is carried out, while when the value of the FIA flag bit is set at the value in the set state, it is reset either immediately or after completion of the initialization operation.

Also, there is adopted such a specification that when the FIA is detected and the FIA detection signal SFIA is changed from the Low level to the High level after completion of the initialization operation of CPU 210, the FIA flag bit is set. As a result, since the FIA flag bit is set even when the power source is afterward activated, the reset is made before start of the normal operation, and thus the disabling state is virtually provided.

A method using an in-fuse as described in Japanese Patent Laid-Open No. 2003-59283 is known as a method of carrying out the flag set without using the non-volatile memory.

Figure 38:
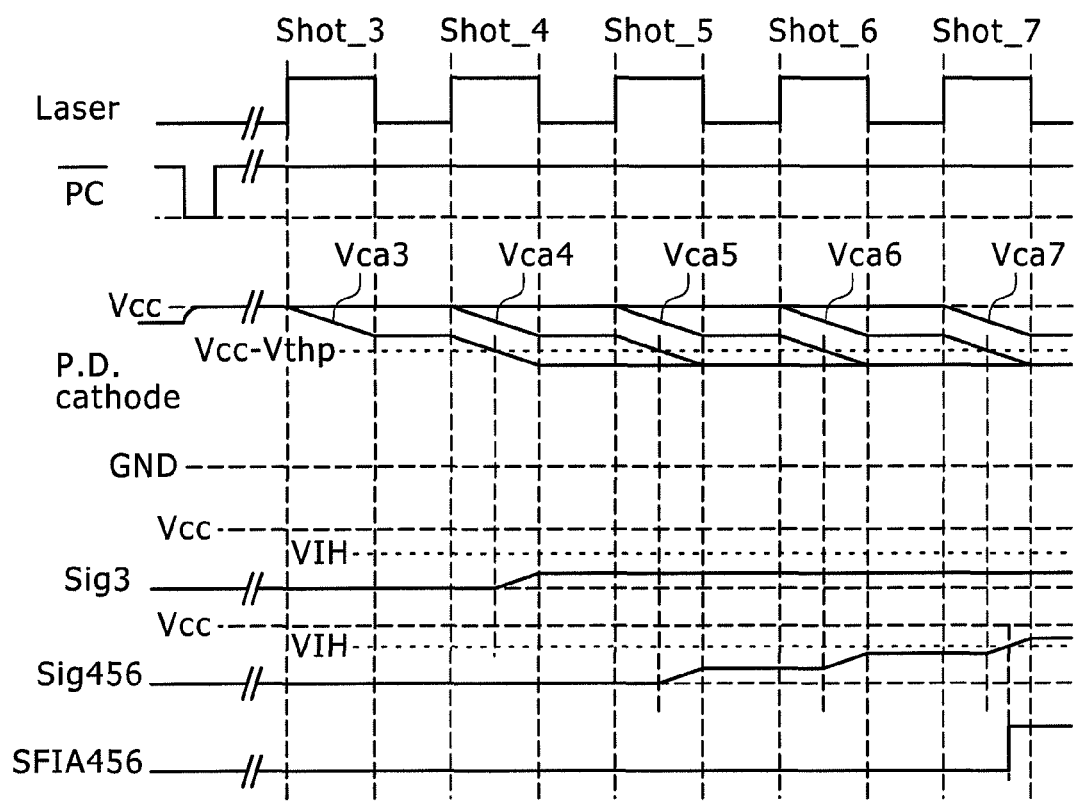
FIG. 38 is a circuit diagram showing a configuration of a fuse circuit adopting a method using an in-fuse as a method of disabling an IC hereinafter when an FIA is detected.

FIG. 38 is a circuit diagram showing a configuration of a fuse circuit adopting a method using the in-fuse as the method of disabling an IC hereinafter when the FIA is detected.

Figure 39:
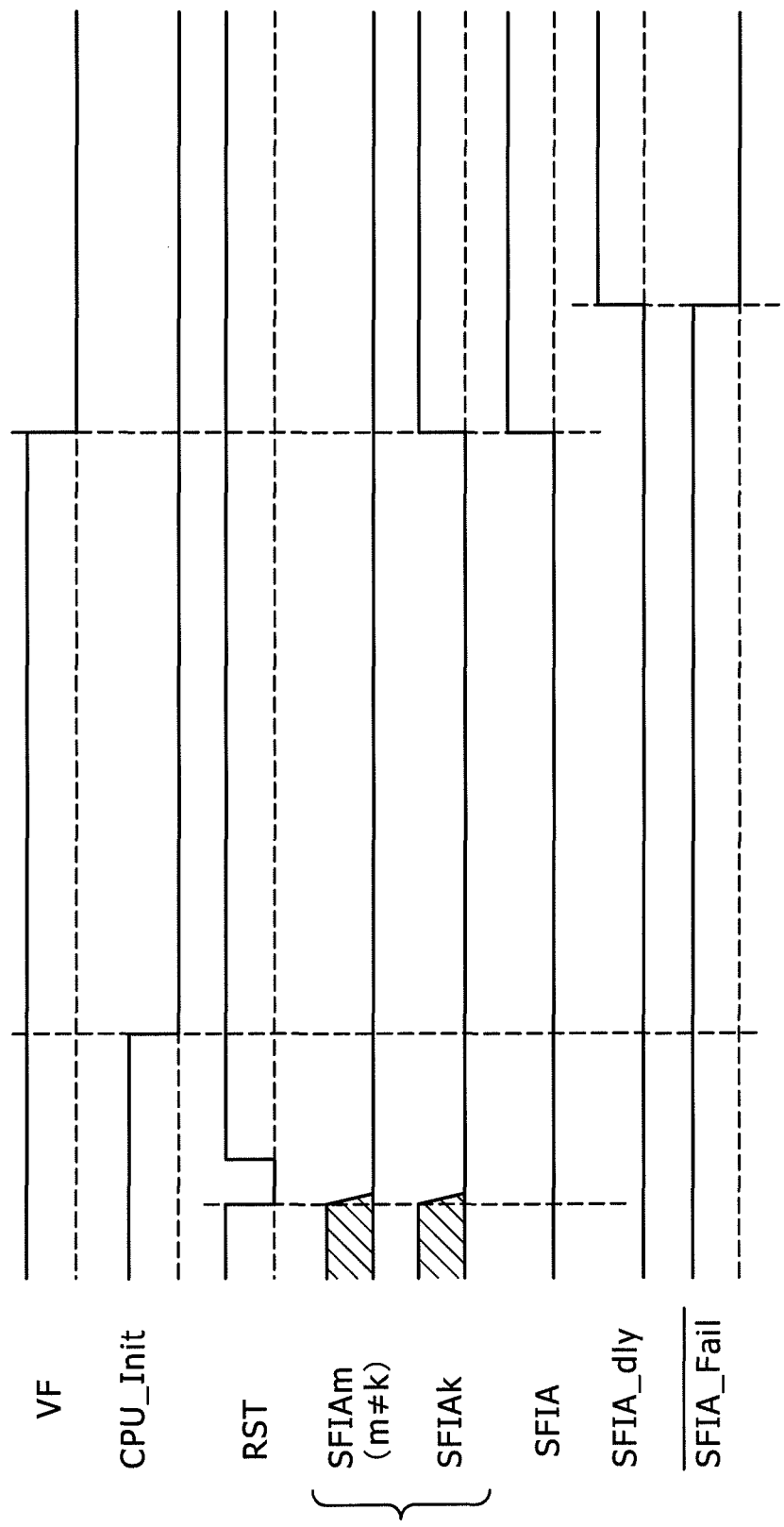
FIG. 39 is a timing chart showing an operation timing in the fuse circuit shown in FIG. 38.

FIG. 39 is a timing chart showing an operation timing in the fuse circuit shown in FIG. 38.

The fuse circuit 300 shown in FIG. 38 includes an (n+1)-input NOR circuit 301, a 2-input NOR circuit 302, a delay circuit 303, a 2-input AND circuit 304, 2-input NOR circuits 305 and 306, an NMOS transistor NT 301, a pull-down resistor 8301, and a fuse F301.

The fuse circuit 300 adopts such a configuration that the pull-down resistor R301 and the NMOS transistor NT301 are connected in parallel between the ground and one terminal of the fuse F301, and a node VF as a connection point between the pull-down resistor R301 and the NMOS transistor NT301 is connected to a power source VCC through the fuse F301.

Also, in the phase of the normal operation, a gate input SFIA to the NMOS transistor NT301 is held at the Low level, and thus the NMOS transistor NT301 is held in the OFF state.

A potential at the node VF held at the High level is outputted when the fuse F301 either is not cut or does not has a high resistance, while the potential at the node VF held at the Low level is outputted when the fuse F301 is cut.

After NOR among output signals SFIAk from a plurality of FIA detecting circuits is obtained in the NOR circuit 301, NOR between an output signal from the NOR circuit 301, and a signal CPU_Init is obtained in the NOR circuit 302, thereby obtaining the output signal SFIA.

In addition, a logic among the output signal SFIA, a signal SFIA_dly which has passed through the delay circuit 303 for generating a time necessary for meltdown of the fuse F301, and an output signal SVF from the fuse F301 is obtained through the 2-input AND circuit 306, thereby creating an output signal /SFIA_Fail.

The signal CPU_Init is a signal which is held at the High level in the phase of the initialization of the CPU 210 to be outputted. Also, for a period of time for which the signal CPU_Init is held at the High level to be outputted, the NMOS transistor NT301 of the fuse circuit 300 is held in the OFF state in accordance with the signal CPU_Init.

When the radiation of the laser beam is detected and even one of the input signals SFIAk is inverted from the Low level to the High level after completion of the initialization of the CPU 210, the input signal SFIA to the NMOS transistor NT301 is changed from the Low level to the High level. As a result, the NMOS transistor NT301 is turned ON, and thus the potential at the node VF as one terminal of the fuse F301 becomes the ground level.

As a result, the power source voltage VCC is applied across the opposite terminals of the fuse F301, and for a shorter period of time than a delay time of the delay circuit 303, the fuse F301 either is molten or has the high resistance.

Also, after a lapse of the delay time of the delay circuit 303, the output signal /SFIA_Fail is changed from the High level to the Low level, thereby informing the CPU 210 of the FIA attack.

After either the meltdown or the high resistance of the fuse F301, since the node VF usually indicates the Low level after the activation of the power source, the output signal /SFIA_Fail is changed from the High level to the Low level to request the reset. As a result, the CPU 210 is disabled for the normal operation.

In addition, with any of the configurations shown in FIGS. 22 and 25, respectively, the FIA attack can be detected irrespective of the inversion, of the value stored in the register circuit, caused by the noises or the like.

That is to say, there is no possibility that even when the power source is in an unstable state, it is recognized by mistake that the FIA attack is caused by the noises or the like.

Therefore, the method can be applied to the configuration as well described above.

As set forth hereinabove, according to the first and second embodiments of the present invention, the following effects can be obtained.

None of the increase in the circuit scale, and the increase in the arithmetic operation time is provided for the encryption arithmetic operation circuit.

Since the sensitivity of the sensor circuit is high, before the logic circuits and the register circuits of the CPU circuit and the encryption processing circuit malfunction, the attack can be detected, thereby executing the predetermined processing.

Due to the self-destructive operation of the IC, a large number of ICs may be required for the attack, and thus the difficulty level against the attack increases.

The present invention contains subject matter related to Japanese Priority Patent Application JP 2009-132544 filed in the Japan Patent Office on Jun. 1, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A circuit for detecting a malfunction generation attack, comprising:
    at least one sensor circuit adapted to detect a radiation of a light; and
    a detection circuit for detecting an intermediate voltage between a voltage corresponding to a High level and a voltage corresponding to a Low level in accordance with an output from said at least one sensor circuit, and outputting a detection signal;
    wherein said at least one sensor circuit has an output node a level at which is changed in accordance with the radiation of the light, and outputs a signal corresponding to the level at said output node which is changed in accordance with the radiation of the light, and
    said detection circuit outputs the detection signal when a level of the output signal from said at least one sensor circuit reaches a level previously set.

2. The circuit for detecting a malfunction generation attack according to claim 1, wherein the light is a laser beam, and said at least one sensor and said detection circuit are disposed separately at a distance at which said at least one sensor circuit and said detection circuit are not simultaneously influenced by one shot of the laser beam from each other.

3. The circuit for detecting a malfunction generation attack according to claim 1, wherein said at least one sensor circuit includes:
    a logic circuit an input to which is fixed so as to output a signal at the High level through said output node, and the level at said output node of which is changed in accordance with the radiation of the light; and
    a transistor for outputting a signal corresponding to the change in the level at said output node of said logic circuit.

4. The circuit for detecting a malfunction generation attack according to claim 3, wherein in said logic circuit, a power source portion is connected to a power source through a resistor, and either a connection portion between said power source portion and said power source, or said output node is connected to a control terminal of said transistor.

5. The circuit for detecting a malfunction generation attack according to claim 1, wherein said at least one sensor circuit includes:
    a register in which a signal at the High level is set in advance, the level at said output node of said register being changed in accordance with the radiation of the light; and
    a transistor for outputting a signal corresponding to the change in the level at said output node of said register.

6. The circuit for detecting a malfunction generation attack according to claim 5, wherein in said register, a power source portion is connected to a power source through a resistor, and either a connection portion between said power source portion and said power source, or said output node is connected to a control terminal of said transistor.

7. The circuit for detecting a malfunction generation attack according to claim 1, wherein said at least one sensor circuit includes:
- an optical sensor portion having at least
    - a photoelectric conversion element,
    - an output transistor for outputting a signal corresponding to electric charges accumulated in said photoelectric conversion element, and
    - a precharge transistor for precharging a node for the accumulation of the electric charges of said photoelectric conversion element; and
- a transistor for outputting a signal corresponding to the output signal from said output transistor.

8. The circuit for detecting a malfunction generation attack according to claim 1, wherein said detection circuit compares a voltage of an output signal from said at least one sensor circuit with a reference voltage, and outputs the detection signal when the voltage of the output signal from said at least one sensor circuit is lower than the reference voltage.

9. The circuit for detecting a malfunction generation attack according to claim 1, wherein said detection circuit pulls down the output signal from said at least one sensor circuit, and outputs the detection signal when the voltage of the output signal is at the High level.

10. The circuit for detecting a malfunction generation attack according to claim 1, wherein said circuit for detecting a malfunction generation attack includes the plurality of sensor circuits, and outputs of the plurality of sensor circuits are commonly connected to an input of said detection circuit.

11. The circuit for detecting a malfunction generation attack according to claim 1, further comprising:
- a control system for executing predetermined processing in response to the detection signal from said detection circuit,
- wherein said control system has a function of checking to see if a flag is set in a phase of initialization, and carrying out a normal operation when no flag is set, and carrying out system reset when the flag is set, and
- when receiving the detection signal from said electric circuit, said control system executes predetermined processing after the flag is set.

12. An integrated circuit, comprising at least:
- a control system; and
- a malfunction generation attack detecting circuit for detecting a malfunction generation attack, said control system and said malfunction generation attack detecting circuit for detecting a malfunction generation attack being integrated in said integrated circuit,
- wherein said malfunction generation attack detecting circuit for detecting a malfunction generation attack includes
- at least one sensor circuit adapted to detect a radiation of a light, and
- a detection circuit for detecting an intermediate voltage between a voltage corresponding to a High level and a voltage corresponding to a Low level in accordance with an output from said at least one sensor circuit, and outputting a detection signal,
    - said at least one sensor circuit has an output node a level at which is changed in accordance with the radiation of the light, and outputs a signal corresponding to the level at said output node which is changed in accordance with the radiation of the light, and
    - said detection circuit outputs the detection signal to said control system when a level of the output signal from said at least one sensor circuit reaches a level previously set.

13. The integrated circuit according to claim 12, wherein said control system has a function of checking to see if a flag is set in a phase of initialization, and carrying out a normal operation when no flag is set, and carrying out system reset when the flag is set, and
- said control system executes predetermined processing in receiving the detection signal from said detection circuit after the flag is set.

\* \* \* \* \*